«12» United States Patent
Sakakibara

«10» Patent No.: US 10,773,623 B2
«45» Date of Patent: Sep. 15, 2020

«54» VEHICLE SEAT MEMBER AND METHOD OF MANUFACTURING SAME

«71» Applicant: SEKISUI PLASTICS CO., LTD., Osaka (JP)

«72» Inventor: Yushi Sakakibara, Nara (JP)

«73» Assignee: SEKISUI PLASTICS CO., LTD., Osaka (JP)

«*» Notice: Subject to any disclaimer, the term of this patent is extended or adjusted under 35 U.S.C. 154(b) by 0 days.

«21» Appl. No.: 16/324,371

«22» PCT Filed: Aug. 9, 2017

«86» PCT No.: PCT/JP2017/028984
§ 371 (c)(1),
(2) Date: Feb. 8, 2019

«87» PCT Pub. No.: WO2018/030484
PCT Pub. Date: Feb. 15, 2018

«65» Prior Publication Data
US 2019/0217759 A1   Jul. 18, 2019

«30» Foreign Application Priority Data

Aug. 10, 2016  (JP) .................................. 2016-157925
Aug. 17, 2016  (JP) .................................. 2016-160230
(Continued)

«51» Int. Cl.
*B60N 2/70*  (2006.01)
*B29C 33/12*  (2006.01)
(Continued)

«52» U.S. Cl.
CPC ............ *B60N 2/7017* (2013.01); *B29C 33/12* (2013.01); *B29C 39/10* (2013.01); *B29C 39/26* (2013.01);
(Continued)

«58» Field of Classification Search
CPC ........ B60N 2/7017; B60N 2/682; B60N 2/68; B60N 2/015; A47C 27/14; A47C 7/20;
(Continued)

«56» References Cited

U.S. PATENT DOCUMENTS 3,941,418 A * 3/1976 Bernard ................... A47C 5/06
                                                         297/452.17
4,738,809 A * 4/1988 Storch .................. B29C 33/126
                                                            249/91
(Continued)

FOREIGN PATENT DOCUMENTS

JP    2001-161508    6/2001
JP    2007-296903   11/2007
(Continued)

OTHER PUBLICATIONS

International Search Report dated Sep. 12, 2017 in corresponding International Application No. PCT/JP2017/028984.

*Primary Examiner* — Milton Nelson, Jr.
«74» *Attorney, Agent, or Firm* — Wenderoth, Lind & Ponack, L.L.P.

«57» ABSTRACT

Provided is a method for suppressing deformation by contraction after molding of a vehicle seat member comprising a foamed resin molded body embedding a frame member. The method manufactures a vehicle seat member (1) including a foamed resin molded body (100) and a frame member (200) at least a part of which is embedded therein in which the frame member (200) includes frameworks (250), (260) extending inside the foamed resin molded body (100) along an outer shape (400) of the vehicle seat member (1) in plan view. The method comprises forming gaps (101), (101), (102), (102) along an extending direction of the frameworks (250), (260) between at least a part of the frameworks (250), (260) and a part of the foamed resin molded body (100)

(Continued)

located on an outer side of the at least a part of the frameworks (250), (260).

20 Claims, 40 Drawing Sheets

(30) Foreign Application Priority Data

Aug. 25, 2016 (JP) .................................. 2016-165049
Aug. 29, 2016 (JP) .................................. 2016-167108

(51) Int. Cl.
*B29C 39/10* (2006.01)
*B29C 39/26* (2006.01)
*B29C 44/12* (2006.01)
*B60N 2/68* (2006.01)
*B29K 25/00* (2006.01)
*B29K 105/04* (2006.01)
*B29L 31/30* (2006.01)
*B29L 31/00* (2006.01)

(52) U.S. Cl.
CPC .......... *B29C 44/1271* (2013.01); *B60N 2/682* (2013.01); *B29K 2025/06* (2013.01); *B29K 2105/04* (2013.01); *B29L 2031/3005* (2013.01); *B29L 2031/771* (2013.01)

(58) Field of Classification Search
CPC ......... B29C 33/12; B29C 39/10; B29C 39/26; B29C 44/1271; B29K 2025/06; B29K 2105/04; B29K 2705/12; B29L 2031/3005; B29L 2031/771; B29L 2031/58
USPC ............ 297/DIG. 2, DIG. 1, 452.53, 452.18; 264/46.4
See application file for complete search history.

(56) References Cited

U.S. PATENT DOCUMENTS

| | | | |
|---|---|---|---|
| 5,165,754 A * | 11/1992 | Louys | .................... B60N 2/809 297/391 |
| 6,571,411 B1 | 6/2003 | Ebe | |
| 2015/0150381 A1* | 6/2015 | Lee | .......................... A47C 7/46 297/452.18 |
| 2017/0057130 A1 | 3/2017 | Sameshima et al. | |
| 2017/0252952 A1 | 9/2017 | Takayama et al. | |

FOREIGN PATENT DOCUMENTS

| | | |
|---|---|---|
| JP | 2014-69532 | 4/2014 |
| WO | 2015/159691 | 10/2015 |
| WO | 2016/042759 | 3/2016 |

\* cited by examiner

VEHICLE SEAT MEMBER AND METHOD OF MANUFACTURING SAME

TECHNICAL FIELD

A first invention, a second invention, a third invention, and a fourth invention relate to a vehicle seat member and a method of manufacturing the same.

BACKGROUND ART

As a core material of a seat of a vehicle such as an automobile, a vehicle seat member in which a frame member is integrally molded on a foamed resin molded body is known (Patent Literatures 1, 2, and the like).

Patent Literature 3 discloses a method of manufacturing a vehicle seat core material by embedding a locking fixture to be fixed to a vehicle and a connecting member for connecting it in a thermoplastic resin foamed particle molded body and integrally molding them. The connecting member is embedded on a front side of the foamed particle molded body along a longitudinal direction of the seat core material. Patent Literature 3 discloses that outward in the longitudinal direction of the seat core material of the foamed particle molded body part in which a column part of the locking fixture is embedded, a space or a notch going outward from the column part in the seat core material longitudinal direction is formed.

CITATION LIST

Patent Literature

Patent Literature 1: JP 2001-161508 A
Patent Literature 2: WO2015/159691
Patent Literature 3: WO2016/042759

SUMMARY OF INVENTION

Technical Problem

Problem to be Solved by First Invention

As described above, in a vehicle seat in a form described in Patent Literatures 1 to 3, a frame member is integrally molded inside a foamed resin molded body constituting a vehicle seat member. Usually, the foamed resin molded body has a property of slightly contracting after releasing from the mold. A degree of contraction after the releasing from the mold is different between the foamed resin molded body and the frame member partially embedded in the foamed resin molded body and thus, the foamed resin molded body or the frame member is deformed after foam molding in some cases. In current vehicles, particularly in automobiles, high dimension accuracy is required for the seat member, and improvement of dimension accuracy after foam molding of the seat member is desirable in order to improve assembling accuracy.

Problem to be Solved by Second Invention

As described above, in the vehicle seat in the form described in Patent Literatures 1 to 3, the frame member is integrally molded inside the foamed resin molded body constituting the vehicle seat member. Since a material of the frame member and a material of the foamed resin molded body are different kinds of materials, individual thermal expansion coefficients are different.

Since the foamed resin constituting the foamed resin molded body has a large difference in an extension amount or a contraction amount due to heat release at the time of the die removal of the foamed resin molded body after the molding or heat input into the vehicle seat member, the frame member can be easily deformed with the foamed resin molded body.

In Patent Literature 3, a locking fixture for fixing the seat to the vehicle is located on both ends on a front side of the seat core material, and if the locking fixture is connected by a connecting member embedded in the molded body along a seat longitudinal direction, contraction of the seat core material in the seat longitudinal direction is large and thus, such a problem is described that a dimensional error of the locking fixture is large. As a means for solving this problem, Patent Literature 3 proposes that while a pair of locking fixtures disposed on the both ends on the front side of the seat core material is connected by the connecting member, a space or a notch is formed in a part located on an outer side in the longitudinal direction of a column part of the locking fixture in the foamed resin molded body, % hereby a difference in contraction amounts between the foamed resin molded body and the frame member is absorbed. However, only by providing a space in the vicinity of the column part of the locking fixture, the difference in the contraction amounts between the foamed resin molded body and the frame member cannot be sufficiently absorbed. Moreover, it is likely that the connecting member connecting the locking fixtures to each other is deformed.

Problem to be Solved by Third Invention

As described above, in the vehicle seat in the form described in Patent Literatures 1 to 3, the frame member is integrally molded inside the foamed resin molded body constituting the vehicle seat member. Since the materials of the frame member and the foamed resin molded body are different, the thermal expansion coefficients are different. Thus, degrees of thermal expansion and thermal contraction are different between the part of the foamed resin where there is no frame member and a part of the foamed resin in which the frame member is embedded in the foamed resin molded body.

Therefore, the part of the foamed resin where there is no frame member in the foamed resin molded body is assumed to be slightly deformed from a predetermined shape due to heat release at the time of the die removal of the foamed resin molded body after the molding or heat input into the vehicle seat member, for example.

Problem to be Solved by Fourth Invention

As described above, in the vehicle seat in the form described in Patent Literatures 1 to 3, the frame member is integrally molded inside the foamed resin molded body constituting the vehicle seat member. Since the materials of the frame member and the foamed resin molded body are different, the thermal expansion coefficients are different. Thus, degrees of thermal expansion and thermal contraction are different between the part of the foamed resin where there is no frame member and a part of the foamed resin in which the frame member is embedded in the foamed resin molded body.

Therefore, the part of the foamed resin where there is no frame member in the foamed resin molded body is assumed to be slightly deformed from a predetermined shape due to heat release at the time of the die removal of the foamed resin molded body after the molding or heat input into the vehicle seat member, for example.

Solution to Problem

<First Invention>

A first invention disclosed in the description in order to solve the problems relates to a method of manufacturing a vehicle seat member comprising a foamed resin molded body and a frame member at least a part of which is embedded in the foamed resin molded body, in which the frame member includes a framework extending along a outer shape of the vehicle seat member in plan view, the method of manufacturing a vehicle seat member comprising:

a placing step of placing the frame member in a molding die so that the framework extends along the outer shape of the vehicle seat member in plan view:

a molding step of molding the foamed resin molded body in the molding die so that at least a part of the frame member is embedded, and a gap forming step of forming a gap between at least a part of the framework and a part of the foamed resin molded body located closer to an outer side and/or an inner side of the vehicle seat member in plan view than the at least a part of the framework, the gap extending along the extending direction of the framework, the gap forming step being performed in the molding step or after the molding step. In this description, the "part of the foamed resin molded body located closer to an outer side and/or an inner side of the vehicle seat member in plan view than the at least a part of the framework" means a "part of the foamed resin molded body opposed to the at least a part of the framework and located closer to the outer side and/or the inner side of the vehicle seat member in plan view than the at least a part of the framework". In other words, in this description, the part of the foamed resin molded body located closer to the outer side of the vehicle seat member in plan view than the predetermined part of the framework is a part of the foamed resin molded body opposed to the predetermined part and located closer to the outer side of the vehicle seat member in plan view than the predetermined part, and the part of the foamed resin molded body located closer to the inner side of the vehicle seat member in plan view than the predetermined part of the framework is a part of the foamed resin molded body opposed to the predetermined part and located closer to the inner side of the vehicle seat member in plan view than the predetermined part.

Since the materials of the frame member and the foamed resin molded body are different, the thermal expansion coefficients are different. In the vehicle seat member in which the foamed resin molded body is integrally molded so that the frame member is embedded, in heat release after the molding of the foamed resin molded body, the degrees of thermal expansion and thermal contraction are different between the part of the frame member and the part of the foamed resin molded body. Particularly, the difference in the degrees of expansion and contraction between the part of the frame member and the part of the foamed resin molded body is usually larger in a width direction in plan view than a thickness direction of the vehicle seat member. Thus, in the case of the vehicle seat member in which the entire framework of the frame member is embedded in contact with the foamed resin molded body, deformation can occur in the foamed resin molded body and the frame member by heat release after the molding of the foamed resin molded body.

Particularly, when the framework of the frame member is disposed so as to extend along the outer shape of the vehicle seat member in plan view, influences of the contraction or expansion in the width direction of the foamed resin molded body in plan view on the framework is large. In the method of manufacturing of the first invention, the gap formed between the at least a part of the framework and the part of the foamed resin molded body located at the outer side and/or the inner side of the vehicle seat member in plan view than the at least a part of the framework along the extending direction of the framework can suppress deformation of the foamed resin molded body and the frame member, and a vehicle seat member with excellent dimensional accuracy can be manufactured.

In the method of manufacturing of the first invention, to form the gap "along the extending direction" of the framework of the frame member refers to formation of the gap so as to have a shape extended along the extending direction, and the formed gap has a dimension in the extending direction (length) larger than a dimension in a direction (width) perpendicular to the extending direction.

In a preferable aspect of the method of manufacturing of the first invention, the framework of the frame member includes a pair of framework opposed parts disposed in the vicinity of a pair of opposed edges in the outer shape of the vehicle seat member so as to oppose to each other and connected to each other; and the gap forming step includes formation of the gap between each of the framework opposed parts and the part of the foamed resin molded body located closer to the outer side of the vehicle seat member in plan view than each of the framework opposed parts.

In the foamed resin molded body, portions constituting a pair of opposed edges on the outer shape of the vehicle seat member tend to contract inward, respectively, after the molding. Thus, a pair of framework opposed parts disposed in the vicinity of the pair of edges and fixed to each other are pressed by the inward contraction of the foamed resin molded body in the periphery, respectively, and the contraction of the foamed resin molded body in the periphery of each of the framework opposed parts tends to be non-uniform, and particularly the foamed resin molded body and the frame member are deformed easily. This problem can occur particularly remarkably when the outer shape of the vehicle seat member has a shape having a transverse direction and a longitudinal direction and the extending direction of each of the framework opposed parts crosses the longitudinal direction. In this preferable aspect of the method of manufacturing of the first invention, the problem is solved by forming a gap on the outer side of each of the framework opposed parts, and the gap can suppress deformation of the foamed resin molded body and the frame member.

In another preferable aspect of the method of manufacturing of the first invention, the gap forming step includes formation of the gap on the entire periphery of the framework on a section perpendicular to the extending direction of the framework (or the gap forming step includes formation of the gap between the framework and a part of the foamed resin molded body surrounding the entire periphery of the framework on the section perpendicular to the extending direction of the framework).

On the framework disposed in the foamed resin molded body, a force associated with the contraction of the foamed resin molded body after molding can act from each direction in the periphery. Particularly if the outer shape of the vehicle seat member has a shape having a transverse direction and a longitudinal direction and the extending direction of the framework is a direction along the longitudinal direction, a shearing force by the large contraction of the foamed resin molded body in the longitudinal direction acts on the framework of the frame member. In this preferable aspect of the method of manufacturing of the first invention, the gap formed in the part surrounding the entire periphery of the framework of the frame member on the section can effectively reduce the contraction of the foamed resin molded body after molding which may affect the framework of the frame member.

In another preferable aspect of the method of manufacturing of the first invention, the outer shape of the vehicle seat member has a rectangular shape;

the framework of the frame member includes two or more framework corner parts connected to each other and extending along each of two or more corners selected from four corners of the outer shape, wherein the two or more corners are selected so as to constitute one or more pairs of corners opposed in a direction of any one side of the outer shape; and the gap forming step includes formation of the gap along the extending direction of each of the framework corner parts between each of the framework corner parts and a part of the foamed resin molded body located closer to an outer side and/or an inner side of the vehicle seat member in plan view than each of the framework corner parts, the gap forming step being performed during molding or after molding of the foamed resin molded body.

In the vehicle seat member including the frame member including the framework corner part having a structure as above and the foamed resin molded body, since degrees of thermal expansion and thermal contraction are different between the part of the frame member and the part of the foamed resin molded body in heat release after molding of the foamed resin molded body, forces are applied from various directions to each of the framework corner parts disposed along each of the sides of the frame member, and the contraction or expansion of the foamed resin molded body becomes non-uniform in the vicinity of each of the framework corner parts, which causes deformation of the frame member and the foamed resin molded body. In this preferable aspect of the method of manufacturing of the first invention, a gap formed between each of the framework corner part and the foamed resin molded body can reduce the action of the force by the contraction or expansion of the foamed resin molded body after molding in a width direction in plan view to each of the framework corner part.

In another preferable aspect of the method of manufacturing of the first invention, the vehicle seat member further includes a tubular body embedded in the foamed resin molded body in a state where at least a part of the framework of the frame member is inserted through the tubular body:

the placing step includes placing the frame member and the tubular body in the molding die in a state where at least a part of the framework of the frame member is inserted through the tubular body so that a gap is formed between at least a part of the framework of the frame member and an inner peripheral surface of the tubular body; and the gap forming step includes molding of the foamed resin molded body in the molding die in the molding step.

According to this preferable aspect of the method of manufacturing of the first invention, a gap can be formed easily between at least a part of the framework of the frame member and the inner peripheral surface of the tubular body. Moreover, positions and the number of the gaps can be easily controlled. Moreover, according to this preferable aspect of the method of manufacturing of the first invention, since the gap is formed in the periphery of the framework of the frame member without losing mechanical strength of the foamed resin molded body, the vehicle seat member with high mechanical strength can be manufactured.

In another preferable aspect of the method of manufacturing of the first invention, the frame member further includes a locking portion fixed to the framework and having a distal end part protruding to an outside from the foamed resin molded body; and in the vehicle seat member, the entire periphery of a base end part of the locking portion of the frame member is embedded in the foamed resin molded body.

The vehicle seat member manufactured in this preferable aspect of the method of manufacturing of the first invention has high resistance to the force in a direction in which the locking portion is pulled out of the foamed resin molded body since the entire periphery of the base end part of the locking portion used for fixation to the vehicle is embedded in the foamed resin molded body.

In another preferable aspect of the method of manufacturing of the first invention, the foamed resin molded body is a molded body containing a foamed polystyrene-based resin or a foamed composite resin comprising a polystyrene-based resin and a polyolefin-based resin.

The foamed polystyrene-based resin or the foamed composite resin comprising the polystyrene-based resin and the polyolefin-based resin has small degrees of thermal expansion and thermal contraction, and thus, this aspect is particularly preferable from a viewpoint of suppressing the deformation of the vehicle seat member.

In another preferable aspect of the method of manufacturing of the first invention.

in the vehicle seat member, at least a part of the framework is disposed in the vicinity of one of end surfaces of the foamed resin molded body in a thickness direction; and the gap forming step is a step of forming a groove with a bottom in the foamed resin molded body, wherein the groove extends along the at least a part of the framework, is opened to the one of end surface and accommodates the at least a part of the framework.

According to this aspect of the method of manufacturing of the first invention, since the gap is formed in the periphery of the framework of the frame member without losing the mechanical strength of the foamed resin molded body, the vehicle seat member having high mechanical strength can be manufactured.

The first invention disclosed in the description in order to solve the problem further relates to a vehicle seat member including:

a foamed resin molded body and a frame member at least a part of which is embedded in the foamed resin molded body, in which the frame member includes a framework extending inside the foamed resin molded body along the outer shape of the vehicle seat member in plan view; and a gap is formed along the extending direction of the framework between at least a part of the framework and a part of the foamed resin molded body located closer to an outer side and/or an inner side of the vehicle seat member in plan view than the at least apart of the framework.

When a heat is input into the vehicle seat member in which the foamed resin molded body is integrally molded so that the frame member is embedded (or when the input heat is released), degrees of thermal expansion and thermal contraction are different between the part of the frame member and the part of the foamed resin molded body, and the frame member and the foamed resin molded body can be deformed. Particularly, a difference in the degrees of expansion and contraction between the part of the frame member and the part of the foamed resin molded body is usually larger in the width direction in plan view than in the thickness direction of the vehicle seat member. In the vehicle seat member of the first invention, since the gap is formed between at least a part of the framework of the frame member and the part of the foamed resin molded body located closer to the outer side and/or the inner side of the vehicle seat member in plan view than the at least a part of the framework, the foamed resin molded body and the frame member are not deformed easily when the heat is input (or when the input heat is released), and dimensional accuracy is excellent.

In the vehicle seat member of the first invention, the gap formed "along the extending direction" of the framework of the frame member has a shape extending along the extending direction, and a dimension in the extending direction (length) is larger than a dimension in a direction (width) perpendicular to the extending direction.

In the preferable aspect of the vehicle seat member of the first invention, the framework of the frame member includes a pair of framework opposed parts disposed in the vicinity of a pair of opposed edges of the outer shape of the vehicle seat member so as to oppose to each other and connected to each other; and the gap is formed between each of the framework opposed parts and the part of the foamed resin molded body located closer to the outer side of the vehicle seat member in plan view than each of the framework opposed parts.

In the preferable aspect of the vehicle seat member of the first invention, since the gap is formed on the outer side of each of the pair of framework opposed parts embedded in the foamed resin molded body, the foamed resin molded body and the frame member are not deformed easily. This effect is particularly remarkable when the outer shape of the vehicle seat member has the transverse direction and the longitudinal direction, and the extending direction of each of the framework opposed parts crosses the longitudinal direction.

In another preferable aspect of the vehicle seat member of the first invention, on a section perpendicular to the extending direction of the framework, the gap is formed on the entire periphery of the framework (or the gap is formed between the framework and the part of the foamed resin molded body surrounding the entire periphery of the framework on a section perpendicular to the extending direction of the framework).

In this preferable aspect of the vehicle seat member of the first invention, since the gap is formed on the entire part surrounding the framework of the frame member on the section, an influence of the contraction or expansion of the foamed resin molded body on the framework of the frame member is effectively reduced, and deformation of the foamed resin molded body and the frame member is particularly small. Particularly, if the outer shape of the vehicle seat member has a shape having the transverse direction and the longitudinal direction and the extending direction of the framework follows the longitudinal direction, an action of the shearing force by large contraction or expansion along the longitudinal direction on the framework in the foamed resin molded body is suppressed, which is preferable.

In another preferable aspect of the vehicle seat member of the first invention the outer shape of the vehicle seat member has a rectangular shape, the framework of the frame member includes two or more framework corner parts connected to each other and extending along each of two or more corners selected from four corners of the outer shape, wherein the two or more corners are selected so as to constitute one or more pairs of corners opposed in a direction of any one side of the outer shape; and the gap is formed, along the extending direction of each of the framework corner parts between each of the framework corner parts and a part of the foamed resin molded body located closer to an outer side and/or an inner side of the vehicle seat member in plan view than each of the framework corner parts.

In this preferable aspect of the vehicle seat member of the first invention, since the gap is formed between each of the framework corner parts and the part of the foamed resin molded body located closer to an outer side and/or an inner side of the vehicle seat member in plan view than each of the framework corner parts, an influence of the force by the contraction or expansion of the foamed resin molded body in the width direction in plan view in the foamed resin molded body on the framework corner part is small, and the foamed resin molded body and the frame body are not deformed easily.

In another preferable aspect of the vehicle seat member of the first invention, the vehicle seat member further includes a tubular body embedded in the foamed resin molded body in a state where at least a part of the framework of the frame member is inserted through the tubular body: and the gap is formed between at least a part of the framework of the frame member and an inner peripheral surface of the tubular body.

In this preferable aspect of the vehicle seat member of the first invention, since the foamed resin molded body and the framework are separated by the gap formed in the tubular body, the foamed resin molded body and the frame member are not deformed easily, and dimensional accuracy is excellent. Moreover, in this preferable aspect of the vehicle seat member of the first invention, since the gap is formed in the periphery of the framework of the frame member without losing mechanical strength of the foamed resin molded body, the mechanical strength is high, which is preferable.

In another preferable aspect of the vehicle seat member of the first invention, the frame member further includes a locking portion fixed to the framework and having a distal end part protruding to the outside from the foamed resin molded body, and the entire periphery of a base end part of the locking portion is embedded in the foamed resin molded body.

In this preferable aspect of the vehicle seat member of the first invention, since the entire periphery of the base end part of the locking portion used for fixation to the vehicle is embedded in the foamed resin molded body, resistance to the force in a direction in which the locking portion is pulled out of the foamed resin molded body is high.

In another preferable aspect of the vehicle seat member of the first invention, the foamed resin molded body is a molded body containing a foamed polystyrene-based resin or a foamed composite resin comprising a polystyrene-based resin and a polyolefin-based resin.

The foamed polystyrene-based resin or the foamed composite resin comprising the polystyrene-based resin and the polyolefin-based resin have small degrees of thermal expansion and thermal contraction, and thus, this aspect is particularly preferable from a viewpoint of suppressing the deformation of the vehicle seat member.

In another preferable aspect of the vehicle seat member of the first invention, at least a part of the framework is disposed in the vicinity of one of end surfaces of the foamed resin molded body in a thickness direction; and the gap is a space in a groove with a bottom formed in the foamed resin molded body so as to extend along at least a part of the framework, to be opened to the one of end surface and to accommodate the at least a part of the framework.

According to this aspect of the vehicle seat member of the first invention, since the gap is formed in the periphery of the framework of the frame member without losing the mechanical strength of the foamed resin molded body, the mechanical strength is high, which is preferable.

<Second Invention>

One or more embodiments of a second invention disclosed in the description in order to solve the problems to be solved by the second invention include the following (2-1):

(2-1)

A method of manufacturing a vehicle seat member including a frame member and a foamed resin molded body in which the frame member is embedded, the method of manufacturing a vehicle seat member including:

a placing step of placing the frame member in a molding die so that the frame member extends along an outer shape of the vehicle seat member in plan view of the vehicle seat member; and a molding step of molding the foamed resin molded body in which the frame member is embedded in the molding die, in which the frame member includes a linear framework disposed along the outer shape and a first locking fixture and a second locking fixture fixed to different positions in the extending direction in which the framework is extended;

at least one of sections sandwiched by the first locking fixture and the second locking fixture in the framework is separated to a first part extending such that the first locking fixture is fixed to one end side and another end is located between the first locking fixture and the second locking fixture and a second part extending such that the second locking fixture is fixed to the one end side and another end is located between the first locking fixture and the second locking fixture; and the first locking fixture and the second locking fixture in the frame member include a part embedded in the foamed resin molded body and a part protruding outward from the foamed resin molded body, respectively.

Since the materials of the foamed resin of the foamed resin molded body and the frame member embedded in the foamed resin molded body constituting the vehicle seat member have different thermal expansion coefficients, this difference in the thermal expansion coefficients can appear easily as a difference in contraction amounts between the foamed resin molded body and the frame member during cooling after the molding step. Particularly, in the vehicle seat member in which the frame member having a plurality of locking fixtures for fixation to the vehicle partially protruding to the outside of the foamed resin molded body fixed to the linear framework is embedded in the foamed resin molded body, structures of a pair of the locking fixtures and a section of the framework sandwiched by them in the frame member is complicated. Due to this complexity, thermal contraction or thermal expansion does not occur uniformly in the foamed resin molded body in which it is embedded. Thus, deformation of the pair of locking fixtures and the section of the framework sandwiched by them in the frame member and/or the foamed resin molded body in which they are embedded is particularly remarkable.

Thus, in the second invention, in the linear framework in the frame member, at least one of the sections sandwiched by the first locking fixture and the second locking fixture is separated to the first part extending such that the first locking fixture is fixed to the one end side and the other end is located between the first locking fixture and the second locking fixture and the second part extending such that the second locking fixture is fixed to the one end side and the other end is located between the first locking fixture and the second locking fixture. The other end side of the first part and the other end side of the second part are not connected. By using the frame member having this constitution, a difference in the contraction between the foamed resin molded body and the frame member can be absorbed between the other end side of the first part and the other end side of the second part. As a result, when a heat during molding of the foamed resin molded body is released, deformation of the frame member and/or the foamed resin molded body caused by the thermal contraction can be suppressed, and the entire shape of the vehicle seat member can be kept to a predetermined shape.

A more preferable aspect of the method of the second invention includes the following (2-2):

(2-2)

The method of manufacturing a vehicle seat member described in (2-1), using the frame member in which the other end of the first part is located at a position closer to the first locking fixture than the other end of the second part in the extending direction as the frame member.

In the frame member used in this aspect, the other end of the first part and the other end of the second part in the framework are separated in the extending direction. Thus, in this aspect of the method of the second invention, the difference in the contraction amounts between the foamed resin molded body and the frame member can be absorbed by the separation part between the other end of the first part and the other end of the second part.

A more preferable aspect of the method of the second invention includes the following (2-3):

(2-3)

The method of manufacturing a vehicle seat member described in (2-1), using the frame member in which the other end of the first part is located at a position closer to the second locking fixture than the other end of the second part in the extending direction as the frame member: and the other end side of the first part and the other end side of the second part are disposed so as to be juxtaposed in a direction perpendicular to the extending direction.

In the frame member used in this aspect, the other end side of the first part and the other end side of the second part in the framework are disposed so as to be juxtaposed in the direction perpendicular to the extending direction, and thus, the first part and the second part are disposed without disconnection in the extending direction between the first locking fixture and the second locking fixture, and thus, in the vehicle seat member in which this frame member is embedded in the foamed resin molded body, mechanical strength is given to a part between the first locking fixture and the second locking fixture of the foamed resin molded body. Moreover, in the framework, at least one of the sections sandwiched by the first locking fixture and the second locking fixture is separated to the first part and the second part. Thus, in this aspect of the method of the invention, the difference in the contraction amounts between the foamed resin molded body and the frame member can be absorbed between the other end side of the first part and the other end side of the second part while the strength of the manufactured vehicle seat member is maintained.

A more preferable aspect of the method of the second invention includes the following (2-4):

(2-4)

The method of manufacturing a vehicle seat member described in any one of (2-1) to (2-3), in which an outer shape of the vehicle seat member in plan view is a shape having a transverse direction and a longitudinal direction:

in the placing step, the frame member is placed in the molding die so that at least a part of the framework follows the longitudinal direction; and the frame member used is a frame member in which the first locking fixture and the second locking fixture are fixed to different positions in the longitudinal direction on a longitudinal part of the framework which is a part extending along the longitudinal direction; and the longitudinal part includes the first part and the second part between the first locking fixture and the second locking fixture.

Here, when the frame member having a structure in which the first locking fixture and the second locking fixture are fixed to the longitudinal part of the framework extending along the longitudinal direction of the vehicle seat member is embedded in the foamed resin molded body, the thermal contraction amount of the foamed resin molded body in the longitudinal direction is particularly large, and the foamed resin molded body can be thermally contracted easily in the direction in which the first locking fixture and the second locking fixture are brought closer to each other, and a section of the framework sandwiched by the first locking fixture and the second locking fixture is deformed easily so as to be buckled. However, according to this aspect of the method of the second invention, by constituting a portion between the first locking fixture and the second locking fixture in the longitudinal part of the framework by dividing it to the first part and the second part, a difference in the contraction amounts between the foamed resin molded body and the frame member in the longitudinal direction can be absorbed between the other end side of the first part and the other end side of the second part.

A more preferable aspect of the method of the second invention includes the following (2-5):

(2-5)

The method of manufacturing the vehicle seat member described in any one of claims (2-1) to (2-4), in which the frame member is made to circle around along an outer shape of the vehicle seat member in the placing step.

According to this aspect of the second invention, since the frame member circles around along the outer shape of the vehicle seat member, strength of the vehicle seat member can be improved. Here, when the frame member circles around along the outer shape of the vehicle seat member, the frame member is restrained by the foamed resin molded body, and accordingly it may be deformed easily by thermal contraction of the foamed resin molded body. Then, in this aspect of the second invention, in the linear framework, by constituting at least one of the sections between the first locking fixture and the second locking fixture by dividing it to the first part and the second part, the difference in the contraction amounts between the foamed resin molded body and the frame member can be absorbed between the other end side of the first part and the other end side of the second part, and the deformation of the foamed resin molded body and the frame member can be suppressed.

In the present description, the vehicle seat member is further disclosed as the second invention.

The vehicle seat member according to the second invention includes the following (2-6):

(2-6)

The vehicle seat member including a frame member and a foamed resin molded body in which the frame member is embedded, in which the frame member extends along an outer shape of the vehicle seat member in plan view of the vehicle seat member;

the frame member has a linear framework disposed along the outer shape and a first locking fixture and a second locking fixture fixed to different positions in an extending direction in which the framework is extended:

at least one of sections sandwiched by the first locking fixture and the second locking fixture in the framework is separated to a first part extending such that the first locking fixture is fixed to one end side and the other end is located between the first locking fixture and the second locking fixture and a second part extended such that the second locking fixture is fixed to the one end side and the other end is located between the first locking fixture and the second locking fixture; and the first locking fixture and the second locking fixture include a part embedded in the foamed resin molded body and a part protruding outward from the foamed resin molded body, respectively.

When a heat is input into the vehicle seat member (or when the input heat is released), since the materials of the foamed resin of the foamed resin molded body and the frame member embedded in the foamed resin molded body which are materials of the vehicle seat member have different thermal expansion coefficients, this difference in the thermal expansion coefficients can appear easily as a difference in expansion amounts or contraction amounts between the foamed resin molded body (rim part) and the frame member. Particularly, in the vehicle seat member in which the frame member including a part in which a plurality of locking fixtures used for fixation to the vehicle is fixed to the linear framework is embedded in the foamed resin molded body, structures of a pair of the locking fixtures and a part of the framework sandwiched by them in the frame member are complicated. Due to this complexity, thermal contraction or thermal expansion does not occur uniformly in the foamed resin molded body in which it is embedded. Thus, deformation of the foamed resin molded body in the pair of locking fixtures and the part of the framework sandwiched by them in the frame member and/or their vicinities is particularly remarkable.

Thus, in the second invention, in the linear framework in the frame member, at least one of the sections sandwiched by the first locking fixture and the second locking fixture is separated to the first part extending such that the first locking fixture is fixed to the one end side and the other end is located between the first locking fixture and the second locking fixture and the second part extending such that the second locking fixture is fixed to the one end side and the other end is located between the first locking fixture and the second locking fixture. The other end side of the first part and the other end side of the second part are not connected. As a result, deformation of the frame member and/or the foamed resin molded body caused by the thermal contraction or thermal expansion can be suppressed, and the entire shape of the vehicle seat member can be kept to a predetermined shape.

A more preferable aspect of the vehicle seat member of the second invention includes the following (2-7):

(2-7)

The vehicle seat member described in (2-6), in which the other end of the first part is at a position closer to the first locking fixture than the other end of the second part in the extending direction.

In this aspect, since the other end of the first part and the other end of the second part in the framework are separated in the extending direction, the difference in the contraction amounts between the foamed resin molded body and the frame member can be absorbed by a separation part between the other end of the first part and the other end of the second part.

A more preferable aspect of the vehicle seat member of the second invention includes the following (2-8):

(2-8)

The vehicle seat member described in (2-6), in which the other end of the first part is at a position closer to the second locking fixture than the other end of the second part in the extending direction, and the other end side of the first part and the other end side of the second part are disposed so as to be juxtaposed in a direction perpendicular to the extending direction.

In this aspect, since the other end side of the first part and the other end side of the second part in the framework are disposed so as to be juxtaposed in the direction perpendicular to the extending direction, the first part and the second part are disposed without disconnection in the extending direction between the first locking fixture and the second locking fixture, and thus, in this vehicle seat member in which the frame member is embedded in the foamed resin molded body, mechanical strength is given to the part between the first locking fixture and the second locking fixture of the foamed resin molded body. Moreover, in the framework, at least one of the sections sandwiched by the first locking fixture and the second locking fixture is separated to the first part and the second part. Thus, in this aspect, the difference in the contraction amounts or expansion amounts between the foamed resin molded body and the frame member can be absorbed between the other end side of the first part and the other end side of the second part, while strength of the vehicle seat member to be manufactured is held.

A more preferable aspect of the vehicle seat member of the second invention includes the following (2-9):

(2-9)

The vehicle seat member described in any one of (2-6) to (2-8), in which an outer shape of the vehicle seat member in plan view has a shape having a transverse direction and a longitudinal direction, at least a part of the framework extends along the longitudinal direction.

the first locking fixture and the second locking fixture are fixed to different positions in the longitudinal direction on a longitudinal part of the framework which is a part extending along the longitudinal direction, and the longitudinal part includes the first part and the second part between the first locking fixture and the second locking fixture.

Here, if the frame member with the structure in which the first locking fixture and the second locking fixture are fixed to the longitudinal part of the framework along the longitudinal direction of the vehicle seat member is embedded in the foamed resin molded body, the thermal contraction amount of the foamed resin molded body in the longitudinal direction is particularly large, and accordingly the foamed resin molded body can be thermally contracted easily in the direction in which the first locking fixture and the second locking fixture get closer to each other, and the section of the framework sandwiched by the first locking fixture and the second locking fixture is deformed easily so as to be buckled. However, according to this aspect of the second invention, since the space between the first locking fixture and the second locking fixture in the longitudinal part of the framework is constituted to be divided into the first part and the second part, the difference in the contraction amounts or expansion amounts between the foamed resin molded body and the frame member in the longitudinal direction can be absorbed between the other end side of the first part and the other end side of the second part. Thus, the vehicle seat member of this aspect has high dimensional stability as the whole.

A more preferable aspect of the vehicle seat member of the second invention includes the following (2-10):

(2-10)

The vehicle seat member described in any one of (2-6) to (2-9), in which the frame member circles around along the outer shape of the vehicle seat member. According to this Aspect of the Second Invention, Since the Frame Member Circles around along the outer shape of the vehicle seat member, strength of the vehicle seat member can be improved. Here, if the frame member is made to circle around along the outer shape of the vehicle seat member, the frame member is restrained by the foamed resin molded body, and accordingly it is deformed easily by thermal contraction of the foamed resin molded body. Then, in this aspect of the second invention, at least one of the sections between the first locking fixture and the second locking fixture in the linear framework is constituted by the first part and the second part, and thus, the difference in the contraction amounts between the foamed resin molded body and the frame member can be absorbed between the other end side of the first part and the other end side of the second part, and the deformation of the foamed resin molded body and the frame member can be suppressed.

<Third invention>

A method of manufacturing a vehicle seat member according to a third invention disclosed in the description in order to solve the problems includes the following (3-1):

(3-1)

A method of manufacturing a vehicle seat member including a frame member and a foamed resin molded body in which at least a part of the frame member is embedded, including a placing step of placing the frame member in a molding die so that the frame member extends along an outer shape of the vehicle seat member in plan view of the vehicle seat member, and a molding step of molding the foamed resin molded body in a molding die so that the foamed resin molded body has a rim part embedding at least a part of the frame member and having an outer shape of the vehicle seat member and an extension extending inward from the rim part so as to bridge the rim part inside of the rim part, wherein in the molding step, the foamed resin molded body is molded so that the extension includes a foamed resin with a maximum point stress by bending larger than that of the foamed resin contained in a not-connecting part other than a connecting part connected to the extension in the rim part.

In the method of manufacturing the vehicle seat member, apparent thermal contraction amounts are different between the rim part of the foamed resin molded body embedding at least a part of the frame member and the extension extending inside the rim part and embedding no frame member. As a result, a compression stress and a tensile stress are non-uniformly applied as a thermal stress on the extension surrounded by the rim part, and the extension is deformed easily. The third invention can suppress such deformation.

In other words, in the third invention, by molding the foamed resin molded body so that the extension contains a foamed resin with the maximum point stress by bending larger than the foamed resin contained in the not-connecting part of the rim part, rigidity of the extension is improved more than the not-connecting part of the rim part, and deformation of the extension by the stress acting on the extension is suppressed. As a result, even if the foamed resin molded body including the rim part and the extension is thermally contracted during the molding or after the molding, deformation of the extension can be suppressed. Moreover, the maximum point stress by bending of the foamed resin can be easily controlled by a means such as changing an expansion ratio, for example. Thus, the vehicle seat member with high dimensional accuracy can be easily manufactured. As another means for suppressing deformation of the extension, increasing of the maximum point stress by bending of the entire foamed resin molded body including the extension and the rim part (referred to as "another means 1"), increasing of a thickness of the extension (referred to as "another means 2") can be considered, for example. However, according to the other means 1, there is a possibility of a weight increase of the entire foamed resin molded body, a cost increase, or other disadvantages. According to the other means 2, the design of the extension is limited and accordingly there is a possibility that the applications are limited. Since these possibilities are low in the third invention, it is remarkably advantageous as compared to the other means 1 and 2.

A preferable aspect of the method of manufacturing the vehicle seat member according to the third invention includes the following (3-2):

(3-2)

The method of manufacturing the vehicle seat member described in (3-1), in which the frame member has a continuous part including opposed parts across a space inside of the rim part, and the molding step forms the extension so as to extend between the opposed parts.

Since the frame member has the continuous part, both sides of the extension are restrained by a part of the rim part in which the continuous part is embedded. In this structure, the extension is deformed particularly easily by thermal contraction, but in this aspect of the third invention, by molding the foamed resin molded body so that the extension extends between the opposed parts of the continuous structure in the molding step, the deformation of the extension can be suppressed.

A more preferable aspect of the method of manufacturing the vehicle seat member according to the third invention includes the following (3-3):

(3-3)

The method of manufacturing the vehicle seat member described in (3-1) or (3-2), in which the outer shape of the vehicle seat member in plan view has a shape having a transverse direction and a longitudinal direction, and in the molding step, the extension includes a first extension part extending at least along the longitudinal direction between opposed parts of the rim part, and the foamed resin molded body is molded so that the first extension part contains a foamed resin with a maximum point stress by bending larger than that of the foamed resin contained in the not-connecting part in the rim part.

The first extension part formed along the longitudinal direction is deformed easily by thermal contraction, but in this aspect, by molding the foamed resin molded body so that the first extension part contains the foamed resin with the maximum point stress by bending larger than that of the foamed resin contained in the not-connecting part in the rim part, the deformation of the first extension part can be suppressed.

A further preferable aspect of the method of manufacturing the vehicle seat member according to the third invention includes the following (3-4):

(3-4)

The method of manufacturing the vehicle seat member described in any one of (3-1) to (3-3), in which in the placing step, at least a part of the frame member is made to circle around along the outer shape of the vehicle seat member.

According to this aspect, since the frame member circles around along the outer shape of the vehicle seat member, strength of the vehicle seat member can be improved. Moreover, by causing the frame member to circle around along the outer shape of the vehicle seat member, the both sides of the extension is restrained and the extension is deformed easily by thermal contraction, but according to this aspect, by molding the foamed resin molded body so that the extension contains the foamed resin with the maximum point stress by bending larger than that of the foamed resin contained in the rim part, rigidity of the extension can be improved, and deformation of the extension by the stress acting on the extension can be suppressed.

The third invention further relates to the vehicle seat member.

The vehicle seat member according to the third invention includes the following (3-5):

(3-5)

A vehicle seat member including a frame member and a foamed resin molded body in which at least a part of the frame member is embedded, in which the frame member extends along the outer shape of the vehicle seat member in plan view of the vehicle seat member, the foamed resin molded body includes a rim part embedding at least a part of the frame member and having an outer shape of the vehicle seat member and an extension extending inward from the rim part so as to bridge the rim part inside of the rim part, and in the foamed resin molded body, the extension contains a foamed resin with a maximum point stress by bending larger than that of a foamed resin contained in a not-connecting part other than a connecting part connected to the extension in the rim part.

When a heat is input into the vehicle seat member (or when the input heat is released), apparent thermal expansion amounts (or thermal contraction amounts) are different between the rim part of the foamed resin molded body embedding the frame member and the extension extending inside the rim part and embedding no frame member. As a result, a compression stress and a tensile stress are non-uniformly applied as a thermal stress on the extension surrounded by the rim part, and the extension is deformed easily. The third invention can suppress such deformation.

In other words, in the third invention, by causing the extension extending inside the rim part to contain the foamed resin with the maximum point stress by bending larger than that of the foamed resin contained in the not-connecting part in the rim part, rigidity of the extension is improved more than that of the rim part, deformation of the extension can be suppressed, and dimensional accuracy of the vehicle seat member can be ensured. As another means for suppressing deformation of the extension, the other means 1 and 2, for example, can be considered. However, according to the other means 1, there is a possibility of a weight increase of the entire foamed resin molded body, a cost increase, or other disadvantages. According to the other means 2, the design of the extension is limited and accordingly there is a possibility that the applications are limited. Since these possibilities are low in the third invention, it is remarkably advantageous as compared to the other means 1 and 2.

A more preferable aspect of the vehicle seat member according to the third invention includes the following (3-6): (3-6)

The vehicle seat member described in (3-5), in which the frame member has a continuous part including opposed parts across a space inside of the rim part, and the extension extends between the opposed parts.

Since the frame member has the continuous part, both sides of the extension are restrained by a part of the rim part in which the continuous part is embedded. When a heat is input into the vehicle seat member with this structure (or when the input heat is released), the extension is deformed particularly easily by thermal contraction, but in this aspect of the third invention, since the extension contains the foamed resin with the maximum point stress by bending larger than that of the foamed resin contained in the not-connecting part in the rim part, the extension is not deformed easily.

A more preferable aspect of the vehicle seat member according to the third invention includes the following (3-7): (3-7)

The vehicle seat member described in (3-5) or (3-6), in which the outer shape of the vehicle seat member in plan view has a shape having a transverse direction and a longitudinal direction, the extension includes a first extension part along the longitudinal direction extending between opposed parts of the rim part, and the first extension part includes a foamed resin with a maximum point stress by bending larger than that of a foamed resin contained in the not-connecting part in the rim part.

The first extension part extending along the longitudinal direction is deformed easily by thermal contraction. But according to this aspect, since the first extension part includes the foamed resin with the maximum point stress by bending larger than that of the foamed resin contained in the not-connecting part in the rim part, the first extension part is not deformed easily.

A more preferable aspect of the vehicle seat member according to the third invention includes the following (3-8): (3-8)

The vehicle seat member described in any one of (3-5) to (3-7), in which the frame member circles around along the outer shape of the vehicle seat member.

According to this aspect, since the frame member circles around along the outer shape of the vehicle seat member, strength of the vehicle seat member is high. Moreover, by causing the frame member to circle around along the outer shape of the vehicle seat member, the both sides of the extension is restrained and the extension is deformed easily by thermal contraction. But according to this aspect, since the extension contains the foamed resin with the maximum point stress by bending larger than that of the foamed resin contained in the rim part, rigidity of the extension is high, and deformation of the extension is effectively suppressed.

<Fourth Invention>

In order to solve the problem, the method of manufacturing a vehicle seat member according to a fourth invention disclosed in the description includes the following (4-1): (4-1)

A method of manufacturing a vehicle seat member including a frame member and a foamed resin molded body in which at least a part of the frame member is embedded, in which the frame member includes a framework and a reinforcing portion, the foamed resin molded body includes a rim part having an outer shape of the vehicle seat member and an extension extending inward from the rim part so as to bridge the rim part inside of the rim part, the method of manufacturing a vehicle seat member comprising a placing step of placing the frame member in a molding die so that the framework is placed at a position embedded in the rim part of the foamed resin molded body along the outer shape of the vehicle seat member in plan view and the reinforcing portion is placed at a position embedded in the extension along the extending direction of the extension of the foamed resin molded body; and a molding step of molding, in the molding die, the foamed resin molded body including the rim part in which the framework is embedded and the extension in which the reinforcing portion is embedded.

In the method of manufacturing the vehicle seat member, if the framework of the frame member is embedded in the rim part having the outer shape of the vehicle seat member and a part of the frame member is not embedded in the extension extending inside surrounded by the rim part in the foamed resin molded body, apparent thermal contraction amounts are different between the rim part and the extension of the foamed resin molded body during the molding or after the molding. As a result, a compression stress and a tensile stress non-uniformly acts as a thermal stress on the extension surrounded by the rim part, and the extension is deformed easily.

Thus, in the fourth invention, by molding the foamed resin molded body by in-mold foam molding so that the framework of the frame member is embedded in the rim part of the foamed resin molded body, and the reinforcing portion of the frame member is embedded along the extending direction of the extension in the extension of the foamed resin molded body, deformation of the extension by the stress acting on the extension is suppressed. As a result, even if the foamed resin molded body including the rim part and the extension is thermally contracted during the molding or after the molding, deformation of the extension can be suppressed. As a result, a vehicle seat member with high dimensional accuracy can be manufactured.

A preferable aspect of the method of manufacturing the vehicle seat member according to the fourth invention includes the following (4-2); (4-2)

The method described in (4-1), in which the reinforcing portion is a linear reinforcing portion having both ends linked with the framework, respectively, in the frame member.

In this aspect, since the framework is reinforced by the reinforcing portion in the frame member, rigidity of the framework is improved, and the frame member has a structure which is hard to be deflected in general. As a result, in the placing step, the frame member can be placed in the molding die easily. Particularly when the frame member is placed in the molding die by using a robot, the frame member is hard to be deflected, and thus, placement is easy.

A more preferable aspect of the method of manufacturing the vehicle seat member according to the fourth invention includes the following (4-3):

(4-3)

the method described in (4-1) or (4-2), in which the framework of the frame member has a continuous part including opposed parts across a space inside of the rim part, and the molding step includes molding such that the extension has the reinforcing portion embedded and extends between the opposed parts.

Since the framework of the frame member has the continuous part, both sides of the extension are restrained by the rim part in which the continuous part is embedded. In this structure, the extension is deformed particularly easily by thermal contraction, but in this aspect of the fourth invention, by molding the extension so as to embed the reinforcing portion of the frame member, deformation of the extension can be suppressed.

A further preferable aspect of the method of manufacturing the vehicle seat member according to the fourth invention includes the following (4-4):

(4-4)

The method of manufacturing the vehicle seat member described in any one of (4-1) to (4-3), in which the outer shape of the vehicle seat member in plan view has a shape having a transverse direction and a longitudinal direction, the extension molded in the molding step has the reinforcing portion embedded and includes a first extension part extending along at least the longitudinal direction between opposed parts of the rim part.

The first extension part formed along the longitudinal direction is deformed easily by thermal contraction, but according to this aspect, by embedding the reinforcing portion of the frame member in the first extension part, deformation of the first extension part can be suppressed.

A further preferable aspect of the method of manufacturing the vehicle seat member according to the fourth invention includes the following (4-5):

(4-5)

The method of manufacturing the vehicle seat member described in any one of (4-1) to (4-4), in which in the placing step, a part including the framework of the frame member is made to circle around along the outer shape of the vehicle seat member.

According to this aspect, since the frame member circles around along the outer shape of the vehicle seat member, strength of the vehicle seat member can be improved. Moreover, when the frame member is made to circle around along the outer shape of the vehicle seat member, both sides of the extension are restrained and the extension is easily deformed by thermal contraction, but according to this aspect, by embedding the reinforcing portion of the frame member in the extension, deformation of the extension can be suppressed.

The fourth invention further relates to a vehicle seat member.

The vehicle seat member according to the fourth invention includes the following (4-6):

(4-6)

A vehicle seat member including a frame member and a foamed resin molded body in which at least a part of the frame member is embedded, in which the frame member includes a framework and a reinforcing portion, the foamed resin molded body includes a rim part having an outer shape of the vehicle seat member and an extension extending inward from the rim part so as to bridge the rim part inside of the rim part, the framework of the frame member is disposed so as to be embedded in the rim part of the foamed resin molded body along the outer shape of the vehicle seat member in plan view, and the reinforcing portion of the frame member is disposed so as to be embedded in the extension along the extending direction of the extension of the foamed resin molded body.

In the vehicle seat member, if the framework of the frame member is embedded in the rim part having the outer shape of the vehicle seat member and a part of the frame member is not embedded in the extension extending inside surrounded by the rim part in the foamed resin molded body, when a heat is input into the vehicle seat member (or when the input heat is released), apparent thermal expansion amounts (thermal contraction amounts) are different between the rim part and the extension of the foamed resin molded body. As a result, a compression stress and a tensile stress acts non-uniformly as a thermal stress on the extension surrounded by the rim part in which the framework of the frame member is embedded, and the extension is deformed easily. But in the fourth invention, by embedding the reinforcing portion of the frame member in the extension along the extending direction of the extension, deformation of the extension can be suppressed.

A preferable aspect of the vehicle seat member according to the fourth invention includes the following (4-7):

(4-7)

The vehicle seat member described in (4-6), in which the reinforcing portion is a linear reinforcing portion having both ends connected to the framework, respectively, in the frame member.

In this aspect, since the framework is reinforced by the reinforcing portion in the frame member, rigidity of the framework is improved, and the frame member has a structure which is hard to be deflected in general. In the vehicle seat member of this aspect, even if the foamed resin molded body and the frame member are thermally expanded or thermally contracted to degrees different from each other when a heat is input (or when the input heat is released), the foamed resin molded body and the frame member are hard to be deformed particularly.

A more preferable aspect of the vehicle seat member according to the fourth invention includes the following (4-8):

(4-8)

the vehicle seat member described in (4-6) or (4-7), in which the framework of the frame member has a continuous part including opposed parts across a space inside of the rim part, and the extension of the foamed resin molded body has the reinforcing portion embedded and extends between the opposed parts.

Since the framework of the frame member has the continuous part, the both sides of the extension are restrained by a part of the rim part in which the continuous part is embedded. When a heat is input into the vehicle seat member with this structure (or when the input heat is released), the extension is deformed particularly easily by thermal contraction or thermal expansion, but in this aspect of the fourth invention, since the reinforcing portion of the frame member is embedded in the extension, the extension is hard to be deformed.

A more preferable aspect of the vehicle seat member according to the fourth invention includes the following (4-9):

(4-9)

the vehicle seat member described in any one of (4-6) to (4-8), in which the outer shape of the vehicle seat member in plan view has a shape having a transverse direction and a longitudinal direction, and the extension includes a first extension part having the reinforcing portion embedded and extending along the longitudinal direction between opposed parts of the rim part.

The first extension part formed along the longitudinal direction is deformed easily by thermal contraction or thermal expansion but according to this aspect, since the reinforcing portion of the frame member is embedded in the first extension part, the first extension part is hard to be deformed.

A more preferable aspect of the vehicle seat member according to the fourth invention includes the following (4-10):

(4-10)

The vehicle seat member described in any one of (4-6) to (4-9), in which a part including the framework of the frame member circles around along the outer shape of the vehicle seat member.

According to this aspect, since the frame member circles around along the outer shape of the vehicle seat member, strength of the vehicle seat member is high. Moreover, when the frame member is made to circle around along the outer shape of the vehicle seat member, the both sides of the extension are restrained and the extension is deformed easily by thermal contraction or thermal expansion, but according to this aspect, since the reinforcing portion of the frame member is embedded in the extension, deformation of the extension is effectively suppressed.

The present description includes disclosed contents of JP Patent Application No. 2016-157925, Japan Patent Application No. 2016-160230, JP Patent Application No. 2016-165049, and JP Patent Application No. 2016-167108 on which priority of this application is based.

Advantageous Effects of Invention

Advantageous Effects of First Invention

According to the first invention, in the method of manufacturing the vehicle seat member including the foamed resin molded body and the frame member at least a part of which is embedded therein, deformation of the foamed resin molded body and the frame member caused by contraction of the foamed resin molded body after molding can be suppressed, and the vehicle seat member with excellent dimensional accuracy can be manufactured.

Moreover, according to the vehicle seat member according to the first invention, even when a heat is input into the vehicle seat member or the input heat is released, the dimensional accuracy of the vehicle seat member can be ensured.

Advantageous Effects of Second Invention

According to the method of manufacturing the vehicle seat member according to the second invention, the vehicle seat member with high dimensional accuracy can be obtained. Moreover, according to the vehicle seat member according to the second invention, even when a heat is input into the vehicle seat member or the input heat is released, deformation caused by them can be suppressed.

Advantageous Effects of Third Invention

According to the method of manufacturing the vehicle seat member according to the third invention, the vehicle seat member with high dimensional accuracy can be obtained. Moreover, according to the vehicle seat member according to the third invention, even when a heat is input into the vehicle seat member or the input heat is released, the dimensional accuracy of the vehicle seat member can be ensured.

Advantageous Effects of Fourth Invention

According to the method of manufacturing the vehicle seat member according to the fourth invention, the vehicle seat member with high dimensional accuracy can be obtained. Moreover, according to the vehicle seat member according to the fourth invention, even when a heat is input into the vehicle seat member or the input heat is released, the dimensional accuracy of the vehicle seat member can be ensured.

BRIEF DESCRIPTION OF THE DRAWINGS

FIG. 7(A) is a sectional view of a state where pre-expanded resin particles are filled in a molding die, FIG. 7(B) is a sectional view of a state where pre-expanded resin particles are expanded from the state illustrated in FIG. 7(A), and a foamed resin molded body is molded, and FIG. 7(C) is a view illustrating a state where the foamed resin molded body is removed from the molding die from the state illustrated in FIG. 7(B).

FIG. 15(A) is a schematic sectional view of a state where pre-expanded resin particles are expanded and a foamed resin molded body is molded, and FIG. 15(B) is a schematic sectional view illustrating a state where the foamed resin molded body is removed from the molding die from the state illustrated in FIG. 15(A).

FIG. 20(a) is a sectional view of a state where pre-expanded particles are filled in a molding die, FIG. 20(b) is a sectional view of a state where the pre-expanded resin particles are expanded from the state illustrated in FIG. 19(a), and a foamed resin molded body is molded, and FIG. 20(c) is a view illustrating a state where the foamed resin molded body is removed from the molding die from the state illustrated in FIG. 20(b).

FIG. 21 are views for explaining a method of manufacturing a vehicle seat member which is a comparative example of the second invention, in which FIG. 21(a) is a sectional view of a state where pre-expanded resin particles are expanded and a foamed resin molded body is molded, and FIG. 21(b) is a view illustrating a state where the foamed resin molded body is removed from the molding die from the state illustrated in FIG. 21(a).

FIG. 28(A) is a schematic sectional view of a state where pre-expanded resin particles are filled in a molding die. FIG. 28(B) is a schematic sectional view of a state where the pre-expanded resin particles are expanded from the state illustrated in FIG. 28(A) and a foamed resin molded body is molded. FIG. 28(C) is a schematic sectional view illustrating a state where the foamed resin molded body is removed from the molding die from the state illustrated in FIG. 28(B).

FIG. 29(A) is a schematic sectional view of a state where the pre-expanded resin particles are filled in the molding die. FIG. 29(B) is a schematic sectional view of a state where the pre-expanded resin particles are expanded from the state illustrated in FIG. 29(A) and the foamed resin molded body is molded. FIG. 29(C) is a schematic sectional view illustrating a state where the foamed resin molded body is removed from the molding die from the state illustrated in FIG. 29(B).

FIG. 30(A) is a schematic sectional view of a state where pre-expanded resin particles are expanded and a foamed resin molded body is molded. FIG. 30(B) is a schematic sectional view illustrating a state where the foamed resin molded body is removed from a molding die from the state illustrated in FIG. 30(A).

FIG. 37(A) is a schematic sectional view of a state where pre-expanded particles are filled in a molding die. FIG. 37(B) is a schematic sectional view of a state where the pre-expanded particles are expanded from the state illustrated in FIG. 37(A) and a foamed resin molded body is molded. FIG. 37(C) is a schematic sectional view illustrating a state where the foamed resin molded body is removed from the molding die from the state illustrated in FIG. 37(B).

FIG. 38(A) is a schematic sectional view of a state where pre-expanded particles are expanded and a foamed resin molded body is molded. FIG. 38(B) is a schematic sectional view illustrating a state where the foamed resin molded body is removed from a molding die from the state illustrated in FIG. 38(A).

DESCRIPTION OF EMBODIMENTS

Figure 1:
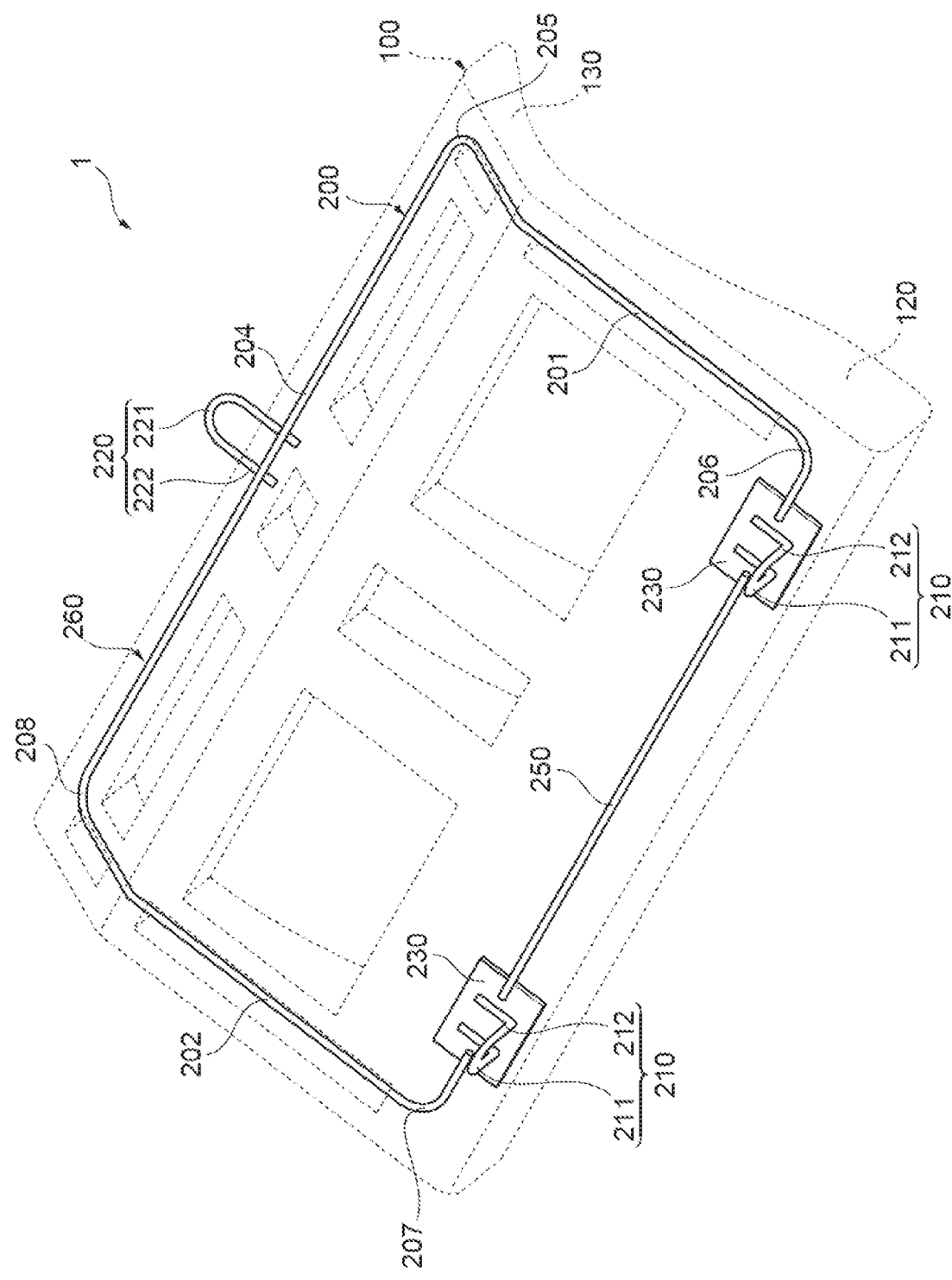
FIG. 1 is a perspective view for explaining a structure of a frame member of a vehicle seat member according to a first embodiment of a first invention.
Figure 2:
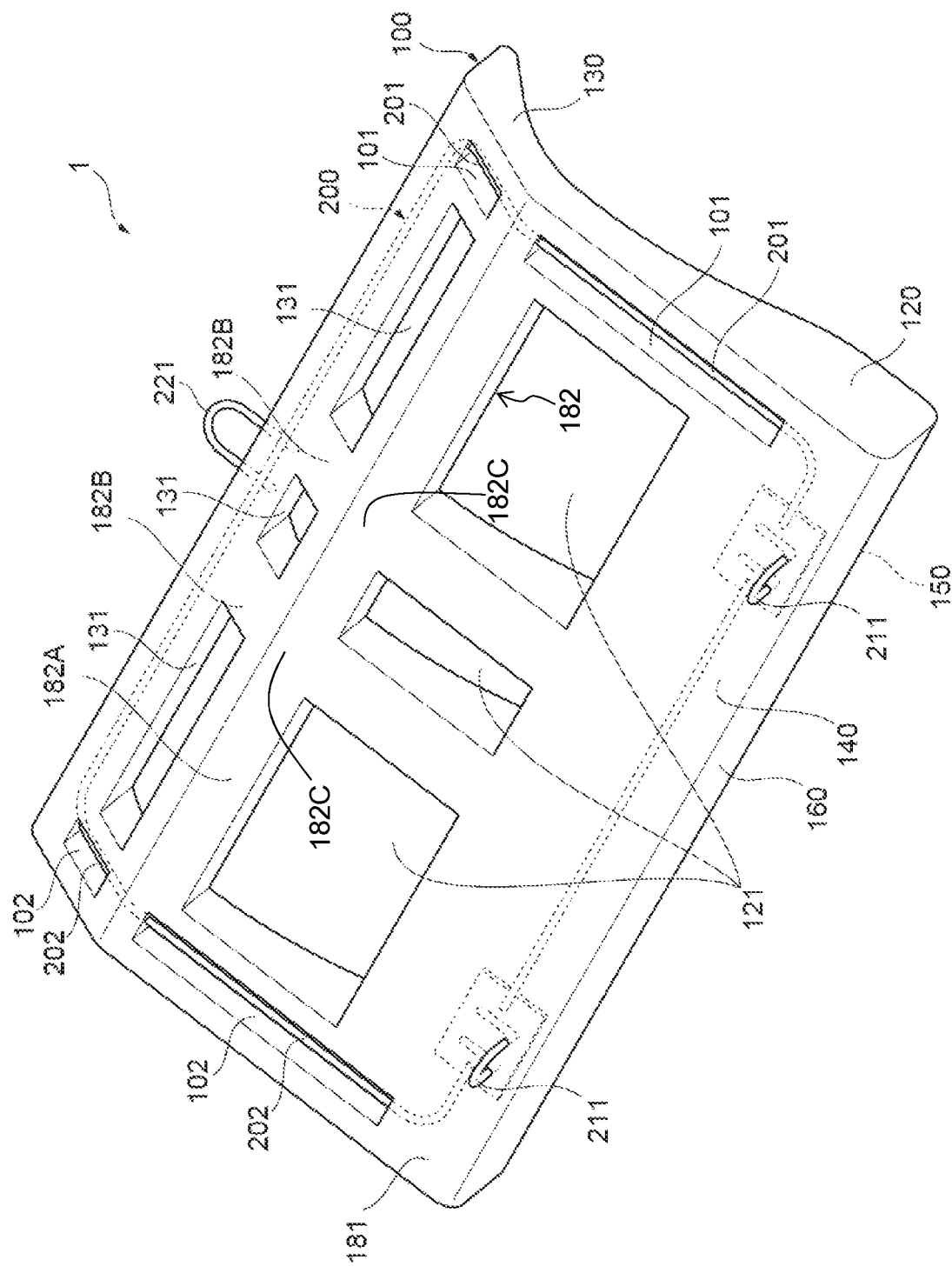
FIG. 2 is a perspective view for explaining a structure of a foamed resin molded body of the vehicle seat member according to the first embodiment of the first invention.

<Materials for Preparing Foamed Resin Molded Body>

In a first invention, a second invention, a third invention, and a fourth invention, a "foamed resin molded body" refers to a molded body in which pre-expanded resin particles obtained by being pre-expanded expandable resin particles containing a resin and a foaming agent are filled in a molding die, and the pre-expanded resin particles are refoamed in the molding die so as to be foamed/molded in the molding die.

Materials constituting each part of the foamed resin molded body are called a "foamed resin" in the first invention, the second invention, the third invention, and the fourth invention.

The "resin", the "foaming agent", the "expandable resin particles", and the "pre-expanded resin particles" will be specifically described.

(Resin)

Resins are not particularly limited, but thermoplastic resins are usually used, and a composite resin containing a polystyrene-based resin and a polyolefin-based resin, a polystyrene-based resin, a polyolefin-based resin, a polyester-based resin, and the like can be used, for example.

The expandable resin particles are the resin particles impregnated with a foaming agent, and they may be impregnated with the foaming agent at the same time as formation by polymerization of the resin or may be impregnated with the foaming agent after the polymerization of the resin.

The resin particles which can be suitably used in the first invention, the second invention, the third invention, and the fourth invention and the expandable resin particles obtained by impregnating the resin particles with the foaming agent will be described below in detail.

(Composite Resin Particles Containing Polystyrene-Based Resin and Polyolefin-Based Resin)

The composite resin particles contain the polyolefin-based resin and the polystyrene-based resin.

A shape of the composite resin particle is preferably spherical, oval spherical (egg-shaped), or columnar, for example.

Moreover, an average grain size is not particularly limited but 0.3 to 7 mm can be exemplified.

Furthermore, a ratio (L/D) between a maximum diameter L and a minimum diameter D of the composite resin particle is not particularly limited but it is preferably 1 to 1.6.

(1) Polyolefin-Based Resin

Examples of the polyolefin-based resin include a resin containing a unit derived from an olefin monomer having 2 to 10 carbon atoms such as polypropylene, polyethylene, and the like. The polyolefin-based resin may be a single polymer of an olefin monomer or may be a copolymer with another monomer which can be co-polymerized with the olefin monomer. Moreover, the polyolefin-based resin may be cross-linked. Examples of the copolymer include a copolymer of vinyl acetate and ethylene (EVA). As the polyolefin-based resin, a resin having an average mass molecular amount of 18 to 500 thousands, for example, can be used.

(2) Polystyrene-Based Resin

Examples of the polystyrene-based resin include resins derived from styrene and styrene-based monomers of substituted styrene (substituents are lower alkyl, halogen atoms (particularly chlorine atoms), and the like), for example. Examples of the substituted styrene include α-methylstyrene, p-methylstyrene, t-butylstyrene, ethylstyrene, i-propylstyrene, dimetylstyrene, vinyltoluene, chlorostyrene bromostyrene, and the like. Moreover, the polystyrene-based resin may be a copolymer of a styrene-based monomer and another monomer capable of copolymerization with the styrene-based monomer. Examples of the other monomer include acrylonitrile, (meth) alkyl acrylate ester (having approximately 1 to 8 carbon atoms of an alkyl part), divinyl benzene, mono or di (meth) acrylic ester of ethylene glycol, maleic anhydride, N-phenylmaleimide, and the like.

When another monomer is used, it is preferably used within a range of 30 mass parts or less to 100 mass parts of the styrene-based monomer.

The polystyrene-based resin is more preferably a resin derived only from styrene.

(3) Contents of Polyolefin-Based Resin and Polystyrene-Based Resin

The content of the polystyrene-based resin is 120 to 400 mass parts, for example, or preferably 150 to 250 mass parts, to 100 mass parts of the polyolefin-based resin.

(4) Other Additives

Other additives may be contained in the composite resin particles. Examples of the other additive include a nucleating agent, a coloring agent, a flame retardant, a flame retardant aid, an oxidation inhibitor, an ultraviolet ray absorber, scale-state silicates, and the like.

(5) Method of Manufacturing Composite Resin Particles

The composite resin particles may be manufactured by any method only if the polyolefin-based resin and the polystyrene-based resin can be contained in particles. For example, examples of such methods include a method in which the both resins are kneaded in an extruder and the kneaded products are cut, a method in which seed particles containing the polyolefin-based resin are impregnated with a styrene-based monomer in an aqueous medium and then, the monomers are polymerized, and the like. Among them, the latter method is preferable from a viewpoint that the both resins can be mixed more uniformly and particles closer to spheres can be obtained. Here, the composite resin particles obtained by the latter method are also called polyolefin-modified polystyrene-based resin particles or simply modified resin particles.

(6) Commercial Composite Resin Particles

As the composite resin particles containing the polystyrene-based resin and the polyolefin-based resin, commercial products can be also purchased and used. The commercial products of the composite resin particles containing the polystyrene-based resin and the polyolefin-based resin include Piocelan (registered trademark): OP-30EU, OP-30ELV by Sekisui Plastics Co., Ltd., and the like.

(Polystyrene-Based Resin Particles)

(1) Polystyrene-Based Resin

Examples of the polystyrene-based resins constituting the polystyrene-based resin particles are not particularly limited but include single polymers of styrene-based monomers such as styrene, α-methylstyrene, vinyltoluene, chlorostyrene, ethylstyrene, i-propylstyrene, dimethylstyrene, bromostyrene, and the like or their copolymers of two or more kinds of these monomers and the like, and the polystyrene-based resins having 50 mass % or more of a styrene component is preferable and polystyrene is more preferable.

Moreover, the polystyrene-based resins may be a copolymer of the styrene-based monomer as a main component and a vinyl monomer which can be copolymerized with this styrene-based monomer. Examples of such vinyl monomers include alkyl (meth) acrylates such as methyl (meth) acrylate, ethyl (meth) acrylate, butyl (meth) acrylate, cetyl (meth) acrylate, and the like and bifunctional monomers such as (meth) acrylonitrile, dimethylmaleate, dimethylfumarate, diethylfumarate, ethylfumarate, and the like, and divinyl benzene, alkylene glycol dimethacrylate, and the like.

Moreover, in the polystyrene-based resin, other additives listed in (4) of the aforementioned (composite resin particles containing polystyrene-based resin and polyolefin-based resin) may be contained.

The shape of the polystyrene-based resin particles used for the first invention, the second invention, the third invention, and the fourth invention is not particularly limited, but a spherical shape is preferable, and a particle diameter is preferably 0.3 to 2.0 mm or 0.3 to 1.4 mm from a viewpoint of filling easiness of polystyrene-based resin pre-expanded particles into a molding die which will be described later. Moreover, if the shape is columnar, a volume preferably corresponds to the aforementioned a preferred grain size. Furthermore, a styrene-converted weight average molecular amount (Mw) of the polystyrene-based resin can be within a range of 120 thousands to 600 thousands.

(2) Method of Manufacturing Polystyrene-Based Resin Particles

The manufacturing methods of the polystyrene-based resin particles which are materials of the foamed polystyrene-based resin particles are not particularly limited and include a method of manufacturing the polystyrene-based resin particles in which the polystyrene-based resin is supplied to an extruder and molten and kneaded, then extruded in a strand shape from the extruder, cooled, and then cut into a predetermined length each (strand cutting method), a method of manufacturing the polystyrene-based resin particles in which it is extruded into water through a hole of a mouth mounted at a tip end of the extruder and at the same time cut and cooled (under-water hot-cut method), and the like. Moreover, the scale-state silicates or metal oxides are diffused in a resin in this extruder and then, the resin is cut into the predetermined length each so as to have the polystyrene-based resin particles. Moreover, such a method may be employed that the polystyrene-based resin particles are manufactured by a seed polymerization method in which the styrene-based monomer is impregnated with the polystyrene-based resin seed particles in an underwater suspension with the polystyrene-based resin particles obtained as above as seed particles and then, a foaming agent is added to the manufactured polystyrene-based resin particles.

(3) Commercial Polystyrene-Based Resin Particles

Commercial products can be also purchased and used as the polystyrene-based resin particles. Examples of the commercial products containing the polystyrene-based resin particles include Eslen-beads: FDK-40LV, ESDK by Sekisui Plastics Co., Ltd., and the like.

(Other Resin Particles)

For other resin particles, the composite resin particles containing the polystyrene-based resin and the polyolefin-based resin described above in detail or the resin particle having a shape similar to the polystyrene-based resin particle can be used, and similar other additives can be contained as appropriate.

Examples of the other resin particles include the polyolefin-based resin particles and polyester-based resin particles. Examples of the polyolefin-based resin particles include the particles of the aforementioned polyolefin-based resin as a component contained in the composite resin particles containing the polystyrene-based resin and the polyolefin-based resin. Examples of the polyester-based resin constituting the polyester-based resin particle includes polyethylene terephthalate.

As methods of manufacturing particles containing these other resins, a general method is used similarly to the composite resin particles containing the polystyrene-based resin and the polyolefin-based resin described above in detail or the polystyrene-based resin particles.

Commercial products may be purchased and used also for the particles containing the other resins.

(Expandable Resin Particles)

The foaming agent contained in the expandable resin particles is not particularly limited and any well-known agent can be used. Particularly, organic compounds which have a boiling point at a softening point or less of the used resin and are in a gas-state or a liquid-state at a normal pressure are suitable. Examples of the foaming agent include hydrocarbons such as propane, n-butane, isobutene, n-pentane, isopentane, neopentane, cyclopentane, cyclopentadiene, n-hexane, petroleum ether, and the like. These foaming agents may be used singularly or two or more kinds may be used at the same time. As the foaming agent, hydrocarbon is preferable and propane, n-butane, isobutane, n-pentane, isopentane, and the like are more preferable.

A content of the foaming agent in the expandable resin particles is not particularly limited but typically, it is 5 to 25 mass parts to 100 mass parts of the expandable resin particles. The content of the foaming agent in the expandable resin particles is measured after being left for five days in a thermostatic chamber at 13° C. immediately after the manufacture.

(Method of Manufacturing Expandable Resin Particles)

The impregnation of the foaming agent into the resin particles may be performed into the particles after polymerization of the resin or into the particles in the middle of the polymerization. The impregnation in the middle of the polymerization can be performed by a method of impregnation in an aqueous medium (wet impregnation method). The impregnation after the polymerization can be performed by the wet impregnation method or by a method of impregnation under absence of a medium (dry impregnation method). The impregnation in the middle of the polymerization is usually performed in a second half of the polymerization preferably. The second half of polymerization is preferably after 70 mass % of a constituent monomer has been polymerized. Moreover, after 99 mass % of the constituent monomer has polymerized, the foaming agent can be impregnated subsequently to the polymerization.

An impregnation temperature of the foaming agent can be set to 50 to 140° C.

The impregnation of the foaming agent may be performed under presence of a foaming aid. Examples of the foaming aids include solvents such as toluene, xylene, ethylbenzene, cyclohexane, and plasticizers such as di-isobutyl adipate, diacetylated monolaurate, coconut oil, and the like (high-boiling solvent). An added amount of the foaming aid is preferably 0.2 to 2.5 mass parts to 100 mass parts of the resin particles.

Surface treatment agents (binding inhibitors, fusion promoters, anti-static agents, spreaders, and the like) may be added into a system in impregnation of the foaming agent as necessary. Examples of added amounts (total value) of these surface treatment agents include 0.01 to 2 mass parts to 100 mass parts of the resin particles.

(Pre-Expanded Resin Particles)

The expandable resin particles are made into pre-expanded resin particles (referred to also simply as foamed resin particles) having a large number of pores by being foamed (pre-expanding) by using steam or other means in a foaming apparatus (pre-expanding apparatus).

Bulk expansion ratio of the pre-expanded resin particles can be adjusted in accordance with an expansion ratio of a targeted foamed resin.

(In-Mold Foam Molding)

Conditions of in-mold foam molding will be described in description of the following embodiments of each of the inventions.

<First Invention>

Hereinafter, a vehicle seat member according to the first invention and embodiments of the vehicle seat will be described by referring to the drawings. However, a range of the first invention is not limited to individual embodiments.

First Invention First Embodiment

A first embodiment of a vehicle seat member and a method of manufacturing the same will be described on the basis of FIGS. 1 to 7.

A vehicle seat member 1 includes a foamed resin molded body 100 and a frame member 200 a part of which is embedded in the foamed resin molded body 100 as a basic constitution.

An entire shape of the vehicle seat member 1 is not particularly limited but an outer shape 400 of the vehicle seat member 1 in plan view is generally a rectangular shape. In the description, a rectangle refers to a square such as a rectangle, a regular square, and the like, and not only the rectangle or the regular square, it may be a shape such as a trapezoid or a parallelogram. In the description, the rectangle also includes a substantial rectangle, and corner parts may be rounded or a part or the whole of a side constituting the rectangle may be a bent side, for example.

The illustrated foamed resin molded body 100 has a bottom surface 140 which is a side fastened to a vehicle and an upper surface 150 which is a side on which a user of the vehicle is seated. The illustrated foamed resin molded body 100 is constituted by a front part 120 and a rear part 130 formed to be continuously connected to a rear end portion 122 of the front part 120 and to extend diagonally upward from the rear end portion 122. When being assembled in the vehicle, the front part 120 of the foamed resin molded body 100 supports a thigh part of a user, while the rear part 130 supports a buttock part of the user. The upper surface 150 of the foamed resin molded body 100 is formed so as to hold the thigh part and the buttock part of the user by being a curved surface dented to a vehicle side so that a vicinity of the rear end portion 122 of the front part 120 becomes a deepest part in the illustrated embodiment. However, the shape and a thickness of the foamed resin molded body 100 can be changed in various ways in accordance with a shape of a vehicle body side on which the vehicle seat member 1 is mounted and are not limited to the illustrated embodiment. The upper surface 150 of the foamed resin molded body 100 may be substantially a flat shape, for example.

The foamed resin molded body 100 is an in-mold foamed molded body of a foamed resin. The foamed resin is not particularly limited but a foamed thermoplastic resin is usually used. For example, a foamed polystyrene-based resin, a foamed composite resin containing a polystyrene-based resin and a polyolefin-based resin, a foamed polyolefin-based resin, and the like are suitably used, and the foamed polystyrene-based resin or the foamed composite resin containing the polystyrene-based resin and the polyolefin-based resin is particularly preferable. The foamed polystyrene-based resin or the foamed composite resin containing the polystyrene-based resin and the polyolefin-based resin have small degrees of thermal expansion and thermal contraction and thus, they are particularly preferable from a viewpoint that deformation of the foamed resin molded body and the frame member is suppressed. An expansion ratio can be adjusted as appropriate in accordance with a type of the foamed resin, but it is approximately 10 to 50 times in general or approximately 20 to 40 times typically.

The foamed resin molded body 100 includes a rim part 181 defining the outer shape 400 of the vehicle seat member 1 and an extension 182 extending inward from the rim part 181 so as to bridge the rim part 181 inside of the rim part 181. More specifically, the extension 182 has a first extension part 182A extending in a longitudinal direction and two second extension parts 182B, 182B extending in a transverse direction, and the first extension part 182A and the two second extension parts 182B, 182B are linked by crossing at a linking portion 182C. In this embodiment, the frame member 200 has a second framework 260 (continuous part) where a second framework right part 201 and a second framework left part 202 which are a pair of framework opposed parts opposed to each other across a space inside the rim part 181 continue to each other, and the first extension part 182A in the extension 182 is formed so as to extend between the second framework right part 201 and the second framework left part 202.

By providing the first extension part 182A and the second extension parts 182B crossing each other inside the rim part 181, the vehicle seat member 1 can be reinforced. By forming the extension 182 in the space inside the rim part 181, hollow portions 121, 131 are formed in the front part 120 and the rear part 130 of the foamed resin molded body 100, respectively. The hollow portions 121, 131 are provided for the purpose of reducing the weight of the foamed resin molded body 100 and of accommodating the other members (a cushion material which is elastically deformed more easily than the foamed resin molded body 100, a member of a console box, and the like) constituting the vehicle seat.

In the first invention, the foamed resin molded body is not limited to the illustrated form but may be a shape in which the hollow portion is not formed.

The outer shape 400 of the vehicle seat member 1 in plan view is a rectangle and includes a right edge 401, a left edge 402, a front edge 403, and a rear edge 404 as four sides and includes a first corner 405, a second corner 406, a third corner 407, and a fourth corner 408 as four corners.

The frame member 200 is embedded in order to apply required shape retaining properties and strength to the foamed resin molded body 100. The frame member 200 is usually constituted by a material whose dimensions are not substantially changed as compared to the foamed resin molded body 100 under a condition that the foamed resin molded body 100 is molded or a metal material such as steel, for example. As the frame member 200, a wire rod (wire) made of steel having a diameter of approximately 3 to 6 mm is used in general, but it may be a thin-plate shaped steel material.

The frame member 200 includes the first framework 250 and a second framework 260 extending inside the foamed resin molded body 100 along the outer shape 400 of the vehicle seat member 1 in plan view and a pair of bases 230 connected to end portions of the first framework 250 and the second framework 260.

The frame member 200 further includes a front locking portion 210 mounted on each of the bases 230 and a rear locking portion 220 mounted on the second framework 260. In this embodiment, for the first framework 250, the second framework 260, the front locking portion 210, and the rear locking portion 220, a wire rod (wire) made of steel or aluminum having a diameter of approximately 3 to 6 mm or the like is used, for example, but it may be a band-shaped or tubular steel material made of metal, for example. The first framework 250 and the second framework 260 correspond to the "framework" referred to in the first invention. The "linear" framework is not limited to a wire rod such as a wire but may be the aforementioned band-shaped, tubular, or the like and is not particularly limited as long as it extends along one line.

The first framework 250 of the frame member 200 extends along a part of a center of the front edge 403 in its vicinity, and the second framework 260 extends along a part of both sides of the front edge 403, the right edge 401, the left edge 402, the rear edge 404, the first corner 405, the second corner 406, the third corner 407, and the fourth corner 408 in their vicinities. The frame member 200 is embedded in a spot slightly inward from an outer peripheral surface 160 of the foamed resin molded body 100 defining the outer shape 400 so as to follow the outer shape 400 of the vehicle seat member 1.

As described above, the frame member 200 continuously circles around along the outer shape 400 of the vehicle seat member 1 by the first framework 250, the second framework 260, and the pair of bases 230, 230 connecting them. In this embodiment, the frame member 200 continuously circles around along the outer shape 400 of the vehicle seat member 1, but the frame member 200 may intermittently circle around along the outer shape 400 of the vehicle seat member 1, for example. That is, the framework may be disposed, not limited to this form, only on a part along the outer shape 400. For example, the frame member 200 may be constituted by the first framework 250 having the bases 230, 230 connected to both ends and disposed along the front edge 403, without presence of the second framework 260. Moreover, the number of frameworks constituting the frame member 200 is not limited to two, but the number may be one, or three or more.

The first framework 250 extends along the front edge 403 in the vicinity of the front edge 403 in plan view of the vehicle seat member 1 and their both ends are connected to the pair of bases 230, 230. The second framework 260 includes a second framework right part 201 disposed along the right edge 401, a second framework left part 202 disposed along the left edge 402, a second framework rear part 204 disposed along the rear edge 404, a second framework first corner part 205 disposed along the first corner 405 and connecting the second framework rear part 204 and the second framework right part 201, a second framework second corner part 206 disposed along the second corner 406 and connecting the base 230 in the vicinity of the right edge 401 and the second framework right part 201, a second framework third corner part 207 disposed along the third corner 407 and connecting the base 230 in the vicinity of the left edge 402 and the second framework left part 202, and a second framework fourth corner part 208 disposed along the fourth corner 408 and connecting the second framework left part 202 and the second framework rear part 204.

Figure 4:
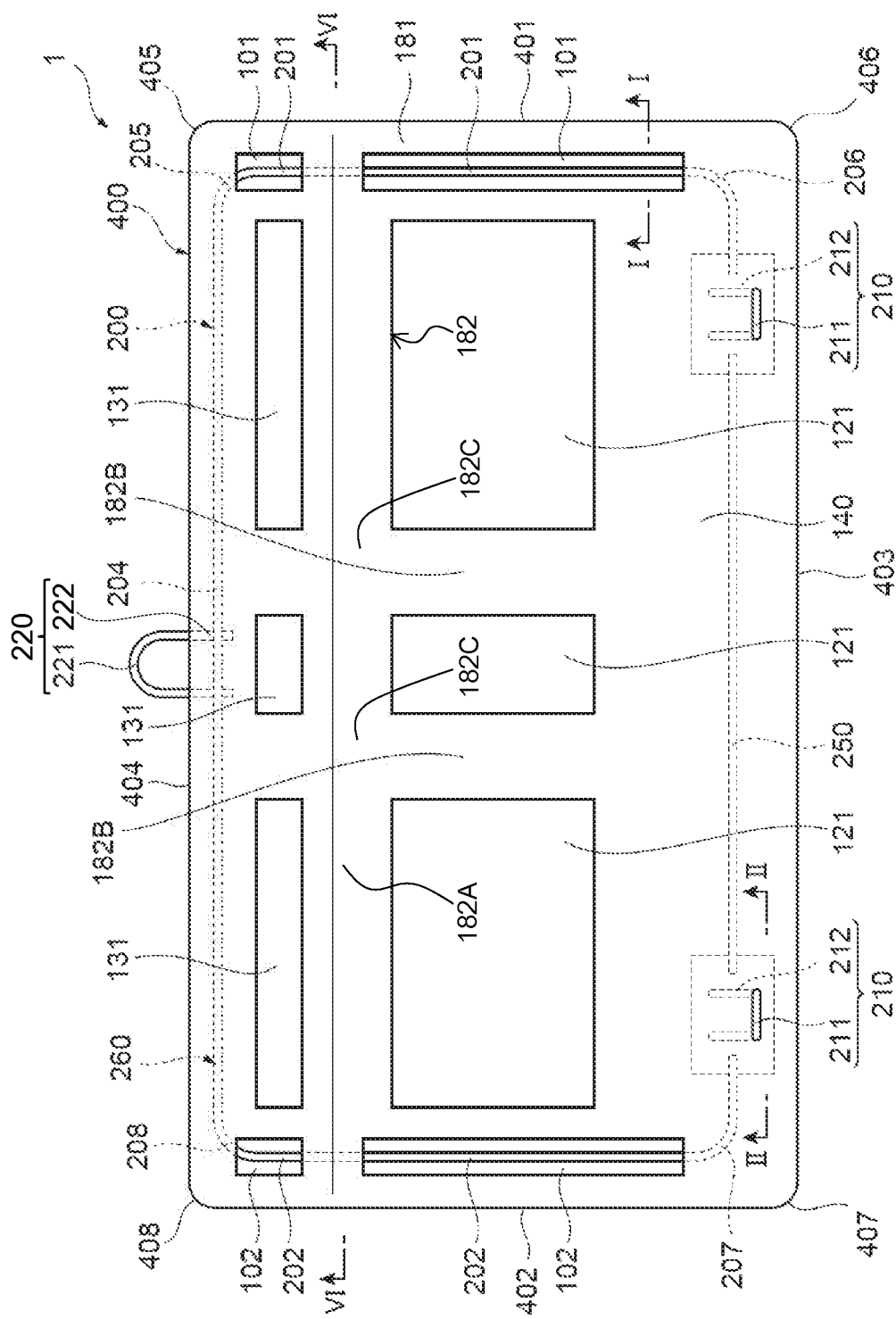
FIG. 4 is a plan view (bottom view) of the vehicle seat member according to the first embodiment of the first invention when seen from a bottom surface (vehicle fastened surface).
Figure 6:
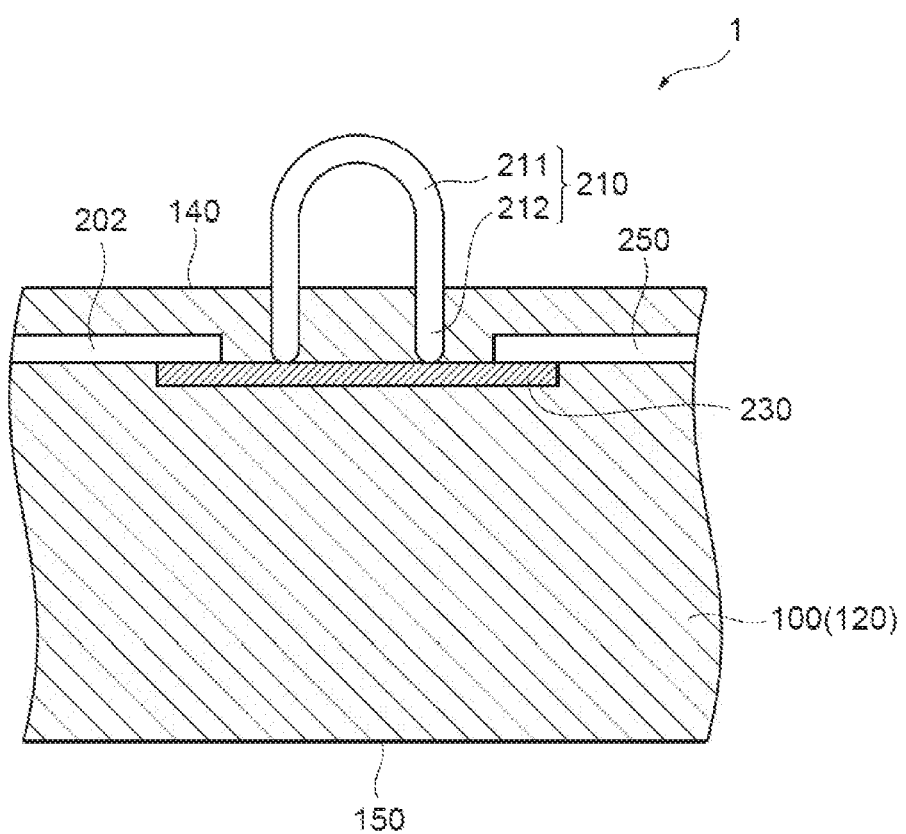
FIG. 6 is a II-II line arrow-view sectional view illustrated in FIG. 4 of the vehicle seat member according to the first embodiment of the first invention.

The locking portions 210, 210, 220 are constituted by two front locking portions 210, 210 and one rear locking portion 220 in the illustrated embodiment. The front locking portions 210, 210 are formed so as to protrude from each of the pair of bases 230 connected to the both ends of the first framework 250 as illustrated in FIG. 4, and a distal end part 211 protrudes outward from the foamed resin molded body 100 in each of the front locking portions 210 as illustrated in FIG. 6, while a base end part 212 is embedded in the foamed resin molded body 100. The rear locking portion 220 is formed so as to protrude from the second framework rear part 204, and a distal end part 221 protrudes outward from the foamed resin molded body 100, while a base end part 222 is embedded in the foamed resin molded body 100. The front locking portions 210, 210 are connected to the both ends of the first framework 250 through the bases 230, 230 in the illustrated embodiment, but this form is not limiting, and as in the rear locking portion 220, they may be directly connected to the both ends of the first framework 250 without through the bases 230, 230. Moreover, the number of the front locking portions 210, 210 is not particularly limited but it may be one, or three or more. Either one of the front locking portions 210, 210 and the rear locking portion 220 does not have to be present.

In the front locking portions 210, 210 and the rear locking portion 220, their distal end parts 211, 221 are used for being fastened to the vehicle. In the illustrated embodiment, the distal end part 211 of each of the front locking portions 210, 210 and the distal end part 221 of the rear locking portion 220 are formed by bending a wire rod into a substantial U-shape, respectively, but this structure is not limiting, and it only needs to be a structure capable of being fastened in accordance with the structure on the vehicle side.

In this embodiment, as illustrated in FIG. 6, the base end part 212 of each of the front locking portions 210 has its entire periphery embedded in the foamed resin molded body 100. By means of this constitution, when the vehicle seat member 1 of this embodiment is fastened to the vehicle through the distal end part 211 of each of the front locking portions 210, 210, even if a force in a pulling-out direction is applied, the front locking portions 210, 210 are held by the foamed resin molded body 100 and thus, resistance against the force in the pulling-out direction is high. When the entire base end part 212 of each of the front locking portions 210 is embedded in the foamed resin molded body 100, regardless of the aforementioned merit, movement of the foamed resin molded body 100 associated with thermal expansion or thermal contraction is prevented in the vicinity of the base end part 212 of each of the front locking portion 210 and thus, it is likely to lead to deformation of the foamed resin molded body 100 and the frame member 200 but in this embodiment, by providing a gap which will be described later, deformation of the foamed resin molded body 100 and the frame member 200 can be suppressed.

In this embodiment, the foamed resin molded body 100 is a substantially rectangle in plan view, and the frameworks 250, 260 of the frame member 200 have longitudinal parts (the first framework 250 and the second framework rear part 204) along the longitudinal direction of the foamed resin molded body 100, the locking portion (the front locking portions 210, 210 and the rear locking portion 220) are provided on the longitudinal part, a body portion of the frame member 200 is constituted only by a pair of opposed longitudinal parts (the first framework 250 and the second framework rear part 204), a pair of transverse parts (the second framework right part 201 and the second framework left part 202) connected to both sides of each of the longitudinal parts and a part connecting them (the second framework first corner part 205, the second framework second corner part 206, the second framework third corner part 207, the second framework fourth corner part 208, and the bases 230, 230), and the body portion of the frame member 200 circles around inside the foamed resin molded body 100 so that a continuous loop is formed inside the foamed resin molded body 100 along the outer shape 400 of the foamed resin molded body 100 in plan view. By means of this constitution, rigidity of the vehicle seat member 1 of this embodiment can be improved.

Figure 3:
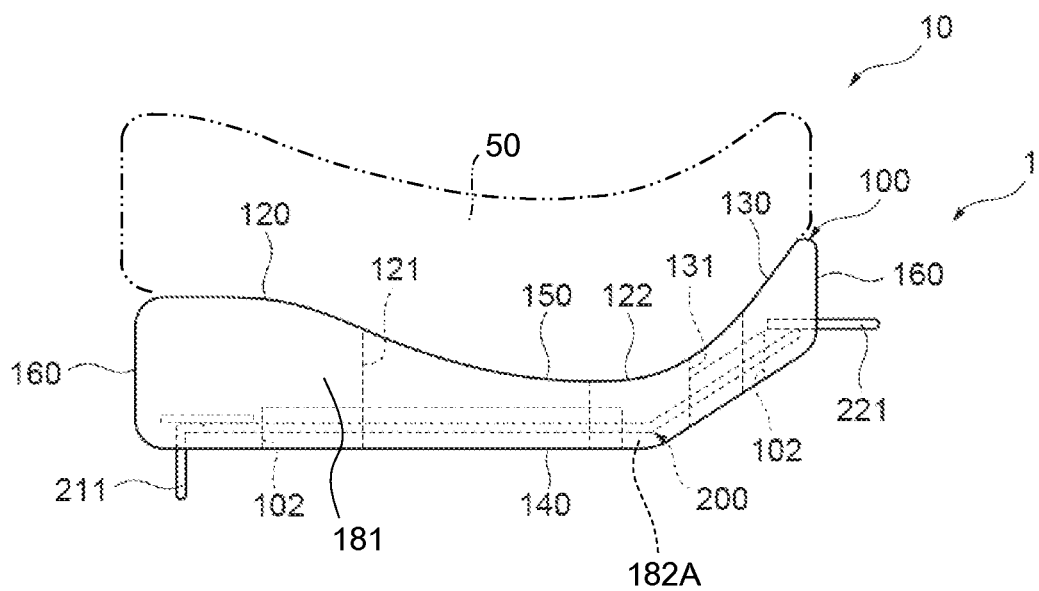
FIG. 3 is a side view of the vehicle seat member according to the first embodiment of the first invention.

The vehicle seat member 1 of this embodiment having the aforementioned constitution can be a vehicle seat 10 by laminating/disposing an upper seat member 50 made of a cushion material or the like as appropriate from a side of an upper surface 150 of the vehicle seat member 1 as illustrated in FIG. 3, for example. Moreover, the vehicle seat member 1 may be covered by an appropriate exterior material together with the upper seat member 50 so as to have the vehicle seat 10.

The vehicle seat member 1 of this embodiment has gaps 101, 101, 102, 102 formed between at least a part of the second framework 260 and the foamed resin molded body 100 along the extending direction of the second framework 260. In the following description, an outer side of the vehicle seat member 1 in plan view is expressed simply as an "outer side", and an inner side of the vehicle seat member 1 in plan view is expressed simply as an "inner side" in some cases. In the second framework 260, on a section (see FIG. 5) perpendicular to the extending direction of the second framework right part 201, the gaps 101, 101 are formed between the second framework right part 201, and a part 112 of the foamed resin molded body 100 located closer to the outer side than the second framework right part 201 and a part 113 of the foamed resin molded body 100 located closer to the inner side than the second framework right part 201 and, on a section perpendicular to the extending direction of the second framework left part 202, gaps 102, 102 are formed between the second framework left part 202 and a part of the foamed resin molded body 100 located closer to the outer side and the inner side than the second framework left part 202. The part 112 of the foamed resin molded body 100 located closer to the outer side than the second framework right part 201 and the part 113 of the foamed resin molded body 100 located closer to the inner side than the second framework right part 201 are adjacent in a width direction of the vehicle seat member 1 in plan view to the second framework right part 201, respectively. One of the gaps 101, 101 is formed between the second framework right part 201 and the front part 120 of the foamed resin molded body 100, while another is formed between the second framework right part 201 and the rear part 130 of the foamed resin molded body 100. The gaps 102, 102 around the second framework left part 202 are also formed similarly.

In the first invention, the gap between at least a part of the framework and the foamed resin molded body is preferably formed so as to have a length of 50% or more of a width of the vehicle seat member in the extending direction along the extending direction of the at least a part of the framework from a viewpoint of effective suppression of deformation of the vehicle seat member. Specifically, a total of the lengths of the gaps 101, 101 is preferably 50% or more of the width (the width between the front edge 403 and the rear edge 404 of the vehicle seat member 1) of the vehicle seat member 1 in the extending direction of the second framework right part 201. Similarly, the total of the lengths of the gaps 102, 102 is preferably 50% or more of the width (the width between the front edge 403 and the rear edge 404 of the vehicle seat member 1) of the vehicle seat member 1 in the extending direction of the second framework left part 202.

When a heat is input into the aforementioned vehicle seat member 1 (or when the input heat is released), since materials of the foamed resin of the foamed resin molded body 100 and the frame member 200 embedded in the foamed resin molded body 100 which are materials of the vehicle seat member 1 have different thermal expansion coefficients, this difference in the thermal expansion coefficients can easily appear as a difference in the expansion amounts or contraction amounts between (the rim part 181 of) the foamed resin molded body 100 and the frame member 200. Particularly, this phenomenon is remarkable in the width direction (or particularly in the longitudinal direction) of the foamed resin molded body 100 in plan view of the vehicle seat member 1.

However, in this embodiment, in the second framework 260, by providing the gaps 101, 101, 102, 102 between the second framework right part 201 as well as the second framework left part 202 and the foamed resin molded body 100, a difference in the contraction amounts between the foamed resin molded body 100 and the frame member 200 can be absorbed in the gaps 101, 101, 102, 102. As a result, deformation of the frame member 200 and the foamed resin molded body 100 in which the frame member 200 is embedded can be suppressed.

Particularly, the extension 182 (particularly, the first extension part 182A) in which the frame member 200 is not disposed but constituted only of the foamed resin can be deformed easily so as to be curved from the center thereof.

According to this embodiment, even in such case, the entire shape of the vehicle seat member 1 can be kept to a predetermined shape.

The method of manufacturing the vehicle seat member 1 of this embodiment includes:

the placing step of placing the frame member 200 in a molding die 70 which will be described later so that the first framework 250 and the second framework 260 are disposed along the outer shape 400 in plan view of the vehicle seat member 1;

the molding step of molding the foamed resin molded body 100 in the in-mold foam molding so that at least a part of the frame member 200 is embedded by filling the pre-expanded resin particles obtained by pre-expanding the expandable resin particles containing the resin and the foaming agent and then, by foaming the pre-expanded resin particles in the molding die 70; and the gap forming step of forming the gaps 101, 101, 102, 102 between at least a part of the first framework 250 or the second framework 260 and the part 112 of the foamed resin molded body 100 located closer to the outer side than the at least a part as well as the part 113 of the foamed resin molded body 100 located closer to the inner side than the at least a part along the extending direction of the first framework 250 or the second framework 260, the gap forming step being performed in the molding step or after the molding step. After the molding step, the molding die 70 is removed, and the vehicle seat member 1 containing the foamed resin molded body 100 is manufactured.

Usually, the foamed resin molded body 100 has a property of slightly contacting after molding. On the other hand, the frame member 200 constituted by a material such as metal whose dimensions are not substantially changed as compared to the foamed resin molded body 100 under a condition of molding the foamed resin molded body 100 is not substantially changed in the dimensions before and after molding of the foamed resin molded body 100. Thus, if the entirety of the first framework 250 and the second framework 260 of the frame member 200 embedded in the foamed resin molded body 100 is in close contact with the foamed resin molded body 100, the first framework 250 and the second framework 260 are subjected to the force by the contraction of the foamed resin molded body 100, the foamed resin molded body 100 can no longer contract uniformly in the vicinity of the first framework 250 and the second framework 260, and as a result, deformation such as warping, bending, or the like of the frame member 200 and the foamed resin molded body 100 can occur.

The contraction amount of the foamed resin molded body 100 from the outside to the inside of the outer shape 400 of the vehicle seat member 1 in plan view is usually larger than the contraction amount of the foamed resin molded body 100 in the thickness direction. Thus, as in the illustrated embodiment, when the first framework 250 and the second framework 260 are disposed so as to extend inside the foamed resin molded body 100 along the outer shape 400 of the vehicle seat member 1 in plan view, an influence of the contraction of the foamed resin molded body 100 on the first framework 250 and the second framework 260 is large, and the aforementioned problem of the deformation of the frame member 200 and the foamed resin molded body 100 becomes apparent.

Figure 15:
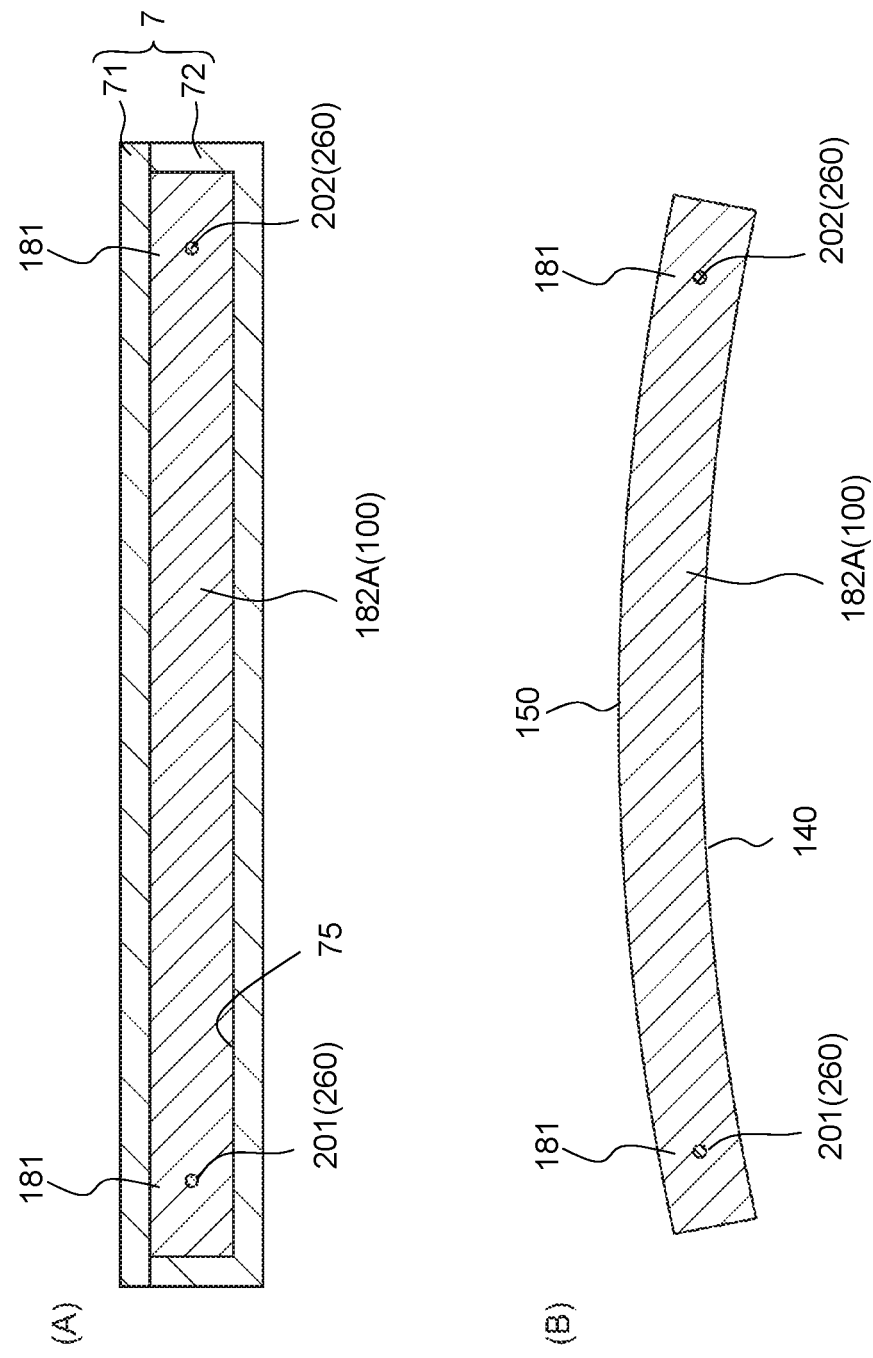
FIG. 15 are schematic sectional views for explaining a method of manufacturing a vehicle seat member which is a comparative example of the first invention.

Moreover, the foamed resin molded body 100 includes the rim part 181 and the extension 182 and is formed so that a plurality of the hollow portions 121, 131 penetrate the foamed resin molded body 100, as described above. Problems of a comparative example in which the gap forming step is not performed will be described by referring to FIG. 15. Each of FIG. 15 is a view corresponding to the VI-VI line arrow-view sectional view in FIG. 4 (however, this is an example in which the gaps 101, 101, 102, 102 are not formed). As illustrated in FIG. 15(A), the foamed resin molded body 100 is molded by a molding die 7 made of a first die 71 and a second die 72, and as illustrated in FIG. 15(B), for a period from immediately after the molding until the foamed resin molded body 100 is removed from the molding die 7 and the foamed resin molded body 100 releases heat, the foamed resin molded body 100 thermally contracts. The amount of contraction is particularly larger in the width direction of the foamed resin molded body 100 of the vehicle seat member 1 in plan view. At this time, both sides of the first extension part 182A of the extension 182 where the frame member 200 is not present are restrained by the rim part 181 where the second framework 260 of the frame member 200 is present and thus, a compression stress and a tensile stress non-uniformly act as a thermal stress on the extension 182, and the extension 182 is deformed easily so as to be curved upward from the center.

Thus, in this embodiment, in the molding of or after the molding of the foamed resin molded body 100, by forming the gaps 101, 101, 102, 102 between at least a part of the first framework 250 and the second framework 260 of the frame member 200 and the part 112 of the foamed resin molded body 100 located closer to the outer side than the at least a part and/or the part 113 of the foamed resin molded body 100 located closer to the inner side than the at least part along the extending direction of the first framework 250 and the second framework 260, the force by the contraction after the molding of the foamed resin molded body 100 is buffered by the gaps, and the influence on the frame member 200 is reduced.

Patent Literature 3 discloses that, as described above, a space is formed outside in the longitudinal direction of the seat core material of the foamed particle molded body part in which a column part of the locking fixture is embedded but the column part of the locking fixture is disposed perpendicularly to a spreading direction of the foamed particle molded body and cannot solve the aforementioned problems to be solved by this embodiment. Moreover, with the constitution of Patent Literature 3, a holding force of the column part of the locking fixture by the foamed particle molded body is likely to be lowered by forming the space.

In the second framework 260 of the frame member 200 in this embodiment, the second framework right part 201 and the second framework left part 202 are disposed so as to oppose to each other in the longitudinal direction of the vehicle seat member 1, respectively, and are continuously integrated. In this case, even though the second framework right part 201 and the second framework left part 202 are pushed inward by inward contraction of the respective peripheral foamed resin molded body 100, since relative positions of the second framework right part 201 and the second framework left part 202 are fixed, the frame member 200 is deformed easily. Moreover, since the contraction of the foamed resin molded body 100 in the periphery of the second framework right part 201 and the second framework left part 202 can become non-uniform easily, the foamed resin molded body 100 is also deformed easily. Particularly, as illustrated in FIG. 15(B), the compression stress and the tensile stress easily act non-uniformly as the thermal stress on the extension 182 in which the frame member 200 is not embedded, and the extension 182 is deformed easily so as to curved upward from the center. Moreover, since the contraction amount of the foamed resin molded body 100 after the molding is large in the longitudinal direction of the outer shape 400 of the vehicle seat member 1, the second framework right part 201 and the second framework left part 202 extending in the direction crossing the longitudinal direction are particularly susceptible to the influence of the contraction of the foamed resin molded body 100 in the longitudinal direction after the molding. This problem can occur when the outer shape 400 of the vehicle seat member 1 has a shape (a rectangle, for example) having the transverse direction and the longitudinal direction and the second framework right part 201 and the second framework left part 202 extend in the direction crossing the longitudinal direction.

Figure 5:
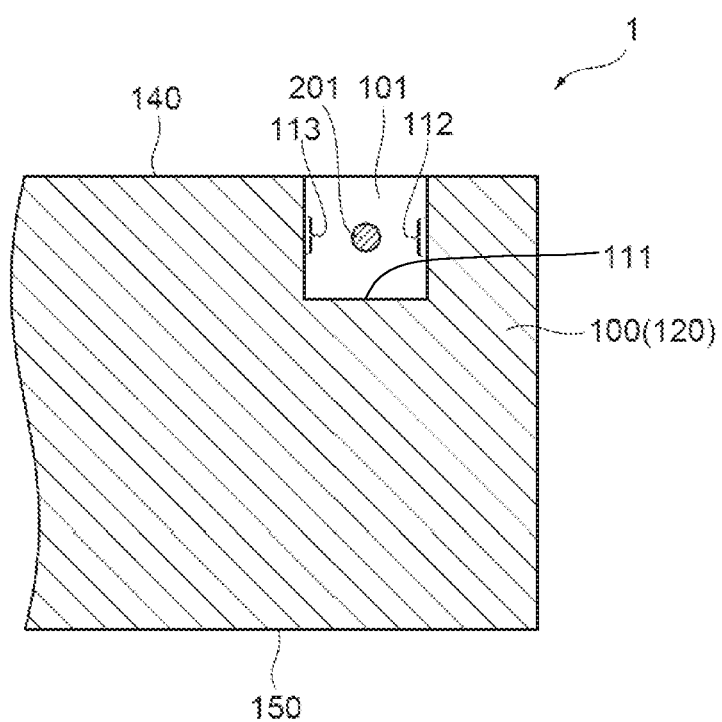
FIG. 5 is a I-I line arrow-view sectional view illustrated in FIG. 4 of the vehicle seat member according to the first embodiment of the first invention.

Thus, in this embodiment, on the section (see FIG. 5) perpendicular to the extending direction of the second framework right part 201, the gaps 101, 101 are formed between the second framework right part 201 and the part 112 of the foamed resin molded body 100 located on the outer side of the second framework right part 201, and on the section perpendicular to the extending direction of the second framework left part 202, the gaps 102, 102 are formed between the second framework left part 202 and the part of the foamed resin molded body 100 located on the outer side of the second framework left part 202. In this embodiment, as illustrated in FIG. 5, the gaps 101, 101 are formed between an entire part 111 of the foamed resin molded body 100 surrounding the periphery of the second framework right part 201 on the section and the second framework right part 201 (that is, the gaps 101, 101 are formed on the entire periphery of the second framework right part 201 on the section), but in order to relax the influence of the contraction of the foamed resin molded body 100 in the direction (longitudinal direction) where the second framework right part 201 and the second framework left part 202 are opposed with each other, the gaps 101, 101 only need to be at least formed between the second framework right part 201 and the part 112 closer to the outer side than the second framework right part 201. Moreover, by forming the gaps 101, 101 between the second framework right part 201 and the part 113 closer to the inner side than the second framework right part 201, the influence of the expansion in the direction (longitudinal direction) where the second framework right part 201 and the second framework left part 202 are opposed with each other can be relaxed. However, as illustrated, on the section, formation of the gaps 101, 101 between the entire part 111 surrounding the second framework right part 201 and the second framework right part 201 in the foamed resin molded body 100 is further preferable since a direct influence by the contraction and expansion of the foamed resin molded body 100 in all the directions on the second framework right part 201 can be relaxed. The gaps 101, 101 are formed between the second framework right part 201 and the front part 120 as well as the rear part 130 of the foamed resin molded body 100. The gaps 102, 102 in the periphery of the second framework left part 202 are also formed similarly.

In this embodiment, as illustrated in FIG. 5, the second framework right part 201 is disposed in the vicinity of the bottom surface 140 which is one of end surfaces of the foamed resin molded body 100 in the thickness direction. In the foamed resin molded body 100, the part 111 surrounding the second framework right part 201 on the section has a groove with a bottom extending along the second framework right part 201, opened to the bottom surface 140, and formed in the foamed resin molded body 100 so as to contain the second framework right part 201 and has the gap 101 formed as an internal space of the groove. In this embodiment, since the gap 101 is formed only in the vicinity of the bottom surface 140 which is one of the end surfaces of the foamed resin molded body 100 in the thickness direction, mechanical strength of the entire foamed resin molded body 100 is not damaged, and the vehicle seat member 1 with high mechanical strength is obtained.

As the gap forming step of the method of this embodiment, when the gaps 101, 101, 102, 102 are formed in molding of the foamed resin molded body 100, in-mold foam molding using a molding die including projecting portions corresponding to the gaps 101, 101, 102, 102 can be performed.

Figure 7:
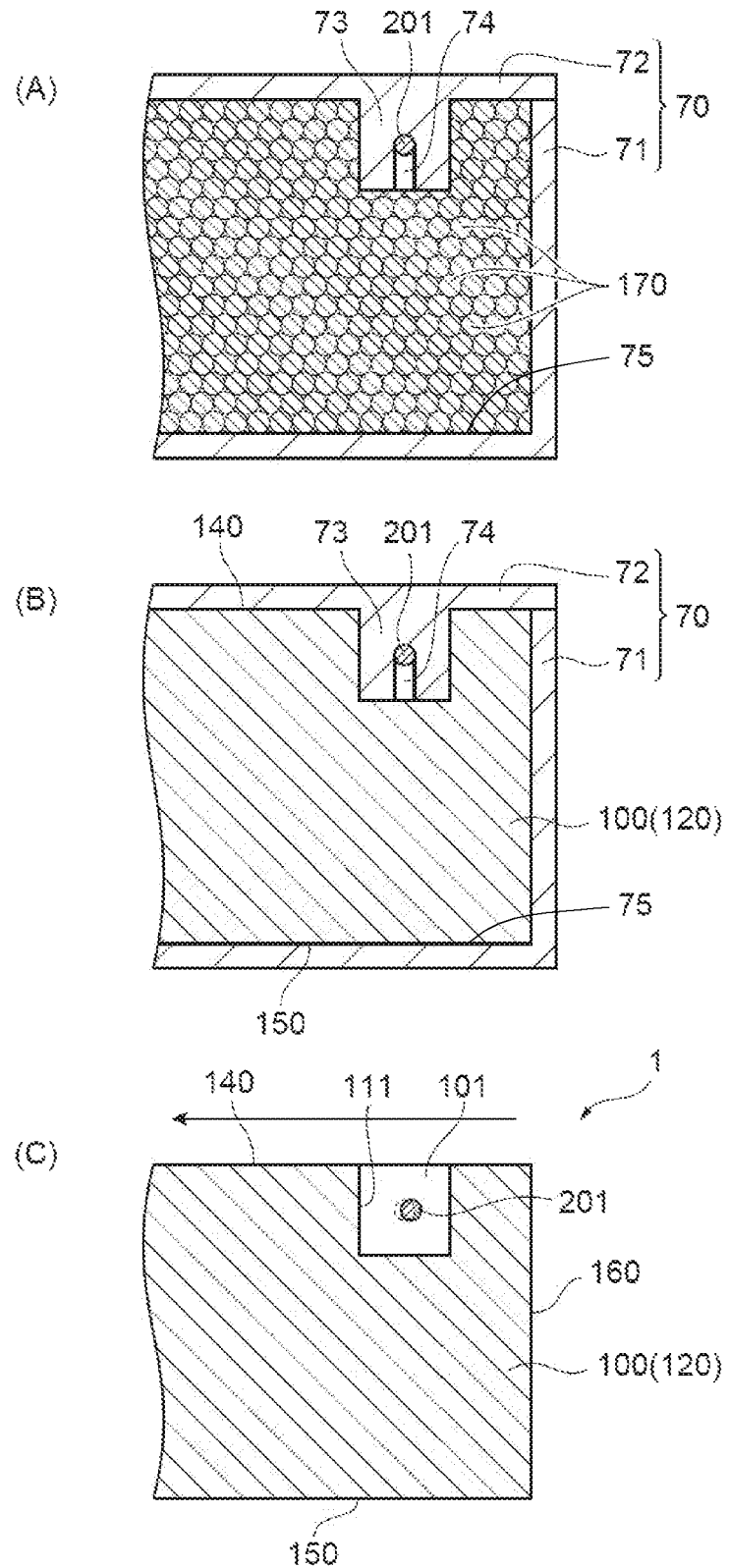
FIG. 7 are schematic sectional views at a position corresponding to the I-I line arrow-view section illustrated in FIG. 4 of the vehicle seat member according to the first embodiment of the first invention for explaining a manufacturing method.
Figure 8:
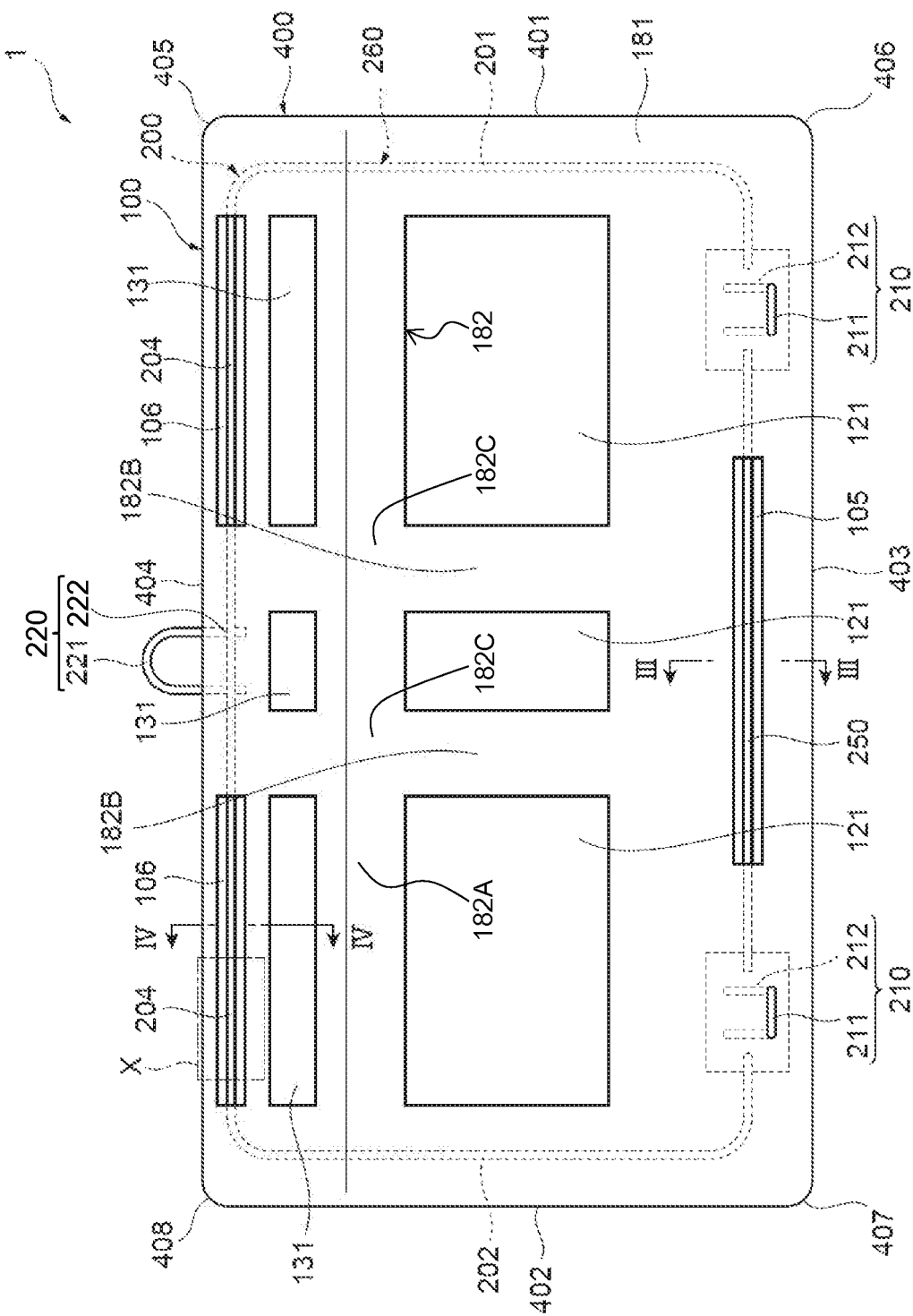
FIG. 8 is a plan view (bottom view) of the vehicle seat member according to a second embodiment of the first invention when seen from a bottom surface (vehicle fastened surface).

FIG. 7 illustrate an example of a method of forming the gap 101 between the part 111 of the foamed resin molded body 100 surrounding the entire periphery of the second framework right part 201 and the second framework right part 201 on the section perpendicular to the extending direction of the second framework right part 201 of the foamed resin molded body 100 during the molding of the foamed resin molded body 100. In this method, a molding die 70 combining a separable first die 71 and second die 72 is used. In the molding die 70, when the first die 71 and the second die 72 are clamped, a cavity 75 according to the foamed resin molded body 100 is formed in the molding die 70. In the second die 72, a projecting portion 73 corresponding to the gap 101 is formed. In the projecting portion 73, a groove 74 opened into the molding die is formed. The groove 74 is constituted so as to accommodate the second framework right part 201 of the frame member 200 in its deepest part.

In the placing step of this embodiment, as illustrated in FIG. 7(A), first, the frame member 200 is placed in the molding die 70 so that each framework such as the second framework right part 201 is located in the cavity 75 of the molding die 70. Then, after the first die 71 and the second die 72 in which the frame member 200 is placed in the cavity 75 are temporally clamped (cracking), pre-expanded resin particles 170 obtained by pre-expanding the expandable resin particles containing the resin and the foaming agent are filled and clamped. At this time, in order to prevent entry of the pre-expanded resin particles 170 into the groove 74, it is necessary that an opening width of the groove 74 is formed having a width smaller than a dimension of the pre-expanded resin particles 170 or that after the second framework right part 201 of the frame member 200 is accommodated in the groove 74, an appropriate measure is taken so that the pre-expanded resin particles 170 cannot enter into the groove 74 and then, the pre-expanded resin particles 170 are filled.

In this embodiment, in the in-mold foam molding, the entirety excluding the distal end parts 211, 211 of the front locking portions 210, 210 and the distal end part 221 of the rear locking portion 220 in the frame member 200 is disposed so as to be located inside the cavity 75 of the molding die 70. The distal end parts 211, 211 of the front locking portions 210, 210 and the distal end part 221 of the rear locking portion 220 in the frame member 200 are disposed so as to be on the outer side of the cavity 75 of the molding die 70 or if they are to be disposed inside the cavity 75 of the molding die 70, they are disposed by taking an appropriate measure so that the pre-expanded resin particles 170 do not enter the periphery thereof.

Subsequently, as illustrated in FIG. 7(B), the pre-expanded resin particles 170 are secondarily foamed by heating the inside of the cavity 75 of the molding die 70 by steam or the like, gaps among the pre-expanded resin particles 170 are filled, and the pre-expanded resin particles 170 are integrated by fusing them to each other so that the foamed resin molded body 100 is formed. At this time, the gaps 101, 101 corresponding to the projecting portions 73 of the molding die 70 are formed in the periphery on the section of the second framework right part 201.

Subsequently, the molding die 70 is removed, and the vehicle seat member 1 of this embodiment in which the foamed resin molded body 100 and the frame member 200 are integrated is obtained. At this time, the foamed resin molded body 100 contracts at the time of the die removal or after the die removal. In FIG. 7(C), a position of the second framework right part 201 in a state accommodated in the groove 74 of the projecting portion 73 before the die removal of the molding die 70 is indicated by a dotted line. The foamed resin molded body 100 has a large contraction amount in the longitudinal direction of the outer shape 400 of the vehicle seat member 1 and thus, as indicated by an arrow in FIG. 7(C), the foamed resin molded body 100) in the periphery of the second framework right part 201 is moved inward by the die removal and the contraction, and in association with that, the second framework right part 201 is moved relatively outward in the gaps 101, 101. As described above, by providing the gaps 101, 101, a direct influence on the second framework right part 201 by the contraction of the foamed resin molded body 100 after the molding can be avoided. In FIG. 7(C), for the purpose of description, a relative position of the second framework right part 201 in the gaps 101, 101 after the contraction is indicated closer to the outer side with highlight, but in actuality, a movement distance to the outer side is slight, and as illustrated in FIG. 5, the position of the second framework right part 201 in the gaps 101, 101 can be regarded as substantially at the center. That is, FIG. 5 and FIG. 7(C) illustrate the same section.

The other gaps 102, 102 can be also formed in molding of the foamed resin molded body 100 similarly to the gaps 101, 101.

In this embodiment, the method of forming the gaps 101, 101, 102, 102 after the molding of the foamed resin molded body 100 is not particularly limited and the gaps 101, 101, 102, 102 can be formed by treating the foamed resin molded body 100 after the molding by using a hot wire or a blade for example. The formation of the gaps 101, 101, 102, 102 after the molding of the foamed resin molded body 100 is preferably performed while large contraction does not occur in the foamed resin molded body 100 after the foamed resin molded body 100 is in-mold molded and the die is removed, particularly it is preferably performed without delay during the amount of contraction of the resin is still within the range of elastic deformation of the material (such as metals) constituting the first framework 250, the second framework 260, the front locking portions 210, 210, the rear locking portion 220, or other portions of the frame member 200, and more specifically, it is preferably performed within 60 minutes after the molding of the foamed resin molded body 100.

First Invention/Second Embodiment

With regard to a second embodiment of the vehicle seat member 1 and the method of manufacturing the same of the first invention, features different from the aforementioned first embodiment will be described below on the basis of FIGS. 8 to 11. Description on features of the second embodiment in common with the first embodiment will be omitted.

In the second embodiment, the outer shape 400 of the vehicle seat member 1 has a shape having a short side direction and a longitudinal direction (a rectangle) and the extending directions of the first framework 250 and the second framework rear part 204 are both directions along the longitudinal direction. Then, a gap 105 along the extending direction of the first framework 250 is formed between a part of the first framework 250 and a part of the foamed resin molded body 100 located closer to an outer side and an inner side of the vehicle seat member 1 than the part in plan view, and gaps 106, 106 along the extending direction of the second framework rear part 204 are formed between a part of the second framework rear part 204 and a part of the foamed resin molded body 100 located closer to the outer side and the inner side of the vehicle seat member 1 than the part in plan view. In this embodiment, on the section (see FIG. 9) perpendicular to the extending direction of the first framework 250, the gap 105 along the extending direction of the first framework 250 is formed between a part 115 of the foamed resin molded body 100 surrounding the entire periphery of the first framework 250 and the first framework 250. Similarly, on the section (see FIG. 10) perpendicular to the extending direction of the second framework rear part 204, the gaps 106, 106 along the extending direction of the second framework rear part 204 are formed between a part 116 of the foamed resin molded body 100 surrounding the entire periphery of the second framework rear part 204 and the second framework rear part 204.

If the first framework 250 extending in the longitudinal direction of the outer shape 400 of the vehicle seat member 1 and the entire second framework rear part 204 are in close contact with the foamed resin molded body 100, the following problem can occur. FIG. 11(B) is a sectional view of a part corresponding to a region X illustrated in FIG. 8 when the gap 106 is not provided in the vehicle seat member 1 of the second embodiment at a height passing through the second framework rear part 204. Displacement by contraction or expansion after molding of the foamed resin molded body 100 is larger in the longitudinal direction of the outer shape 400 indicated by an arrow in a lateral direction than in the short side direction of the outer shape 400 indicated by an arrow in a vertical direction in FIG. 11(B). Thus, as in FIG. 11(B), if the gap 106 is not provided in the vehicle seat member 1 of the second embodiment, and the entire second framework rear part 204 is in close contact with the foamed resin molded body 100, a shearing force by the large contraction in the longitudinal direction of the foamed resin molded body 100 acts on the second framework rear part 204, and deformation of the second framework rear part 204 and the foamed resin molded body 100 can occur. Moreover, when the foamed resin molded body 100 is expanded or contracted at a heat input into the manufactured vehicle seat member 1 or at the heat release after the heat input, deformation of the second framework rear part 204 and the foamed resin molded body 100 can occur similarly. There is a similar concern for the first framework 250 extending in the longitudinal direction of the outer shape 400.

Thus, in the second embodiment, on the section perpendicular to the extending direction of the first framework 250, the gap 105 is formed between the part 115 of the foamed resin molded body 100 surrounding the entire periphery of the first framework 250 and the first framework 250, and on the section perpendicular to the extending direction of the second framework rear part 204, the gap 106 is formed between the part 116 of the foamed resin molded body 100 surrounding the entire periphery of the second framework rear part 204 and the second framework rear part 204. By means of this constitution, a direct influence of the contraction or expansion along the short side direction and the longitudinal direction of the outer shape 400 of the foamed resin molded body 100 on the first framework 250 and the second framework rear part 204 can be avoided. FIG. 11(A) illustrates a sectional view of the part of the region X illustrated in FIG. 8 of the vehicle seat member 1 according to the second embodiment of the first invention at the height passing through the second framework rear part 204.

Figure 9:
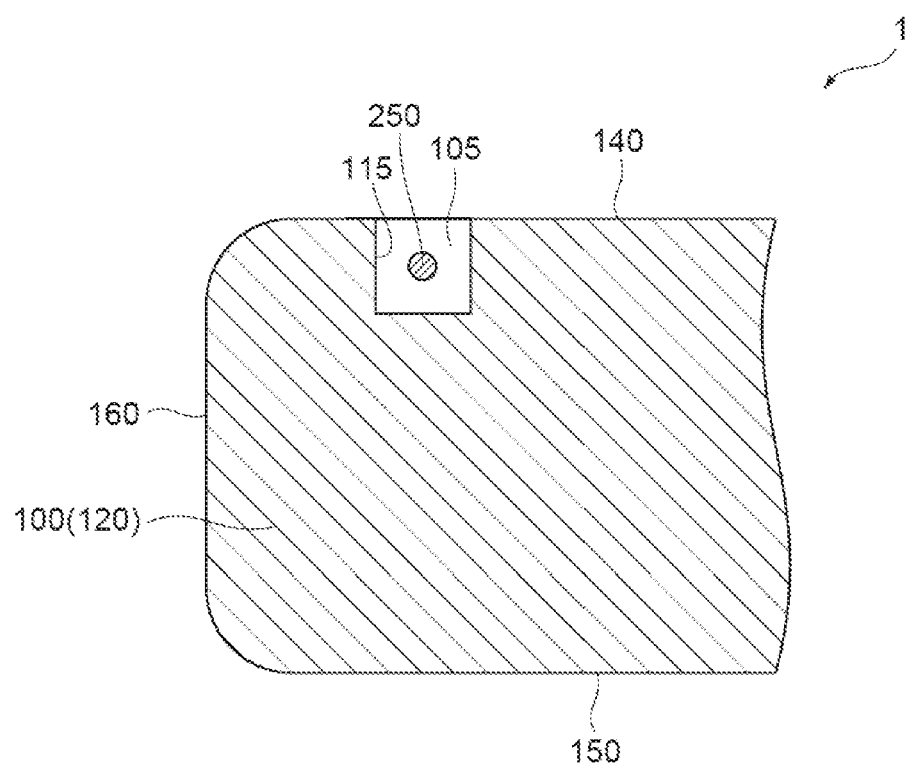
FIG. 9 FIG. 9 is a III-III line arrow-view sectional view illustrated in FIG. 8 of the vehicle seat member according to the second embodiment of the first invention.
Figure 10:
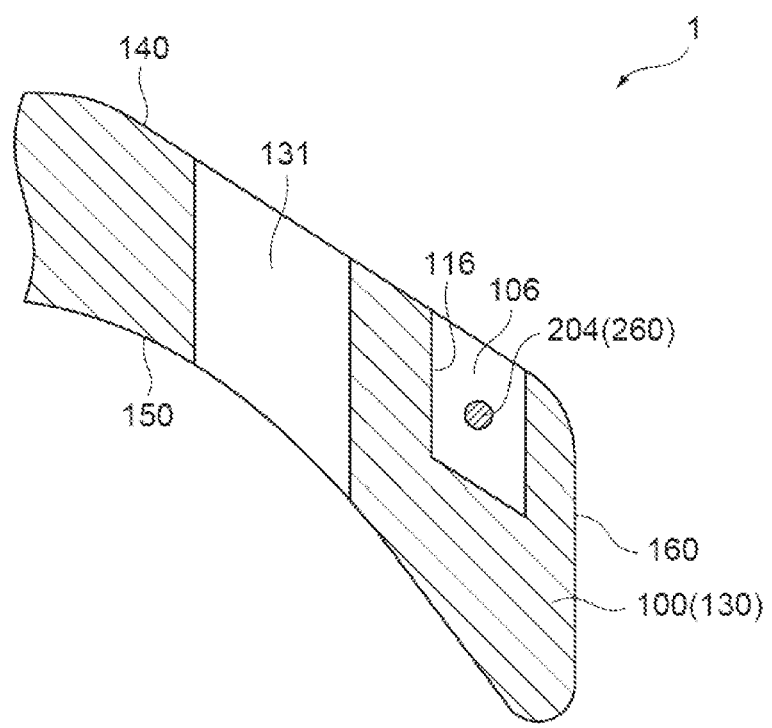
FIG. 10 FIG. 10 is a IV-IV line arrow-view sectional view illustrated in FIG. 8 of the vehicle seat member according to the second embodiment of the first invention.
Figure 11:
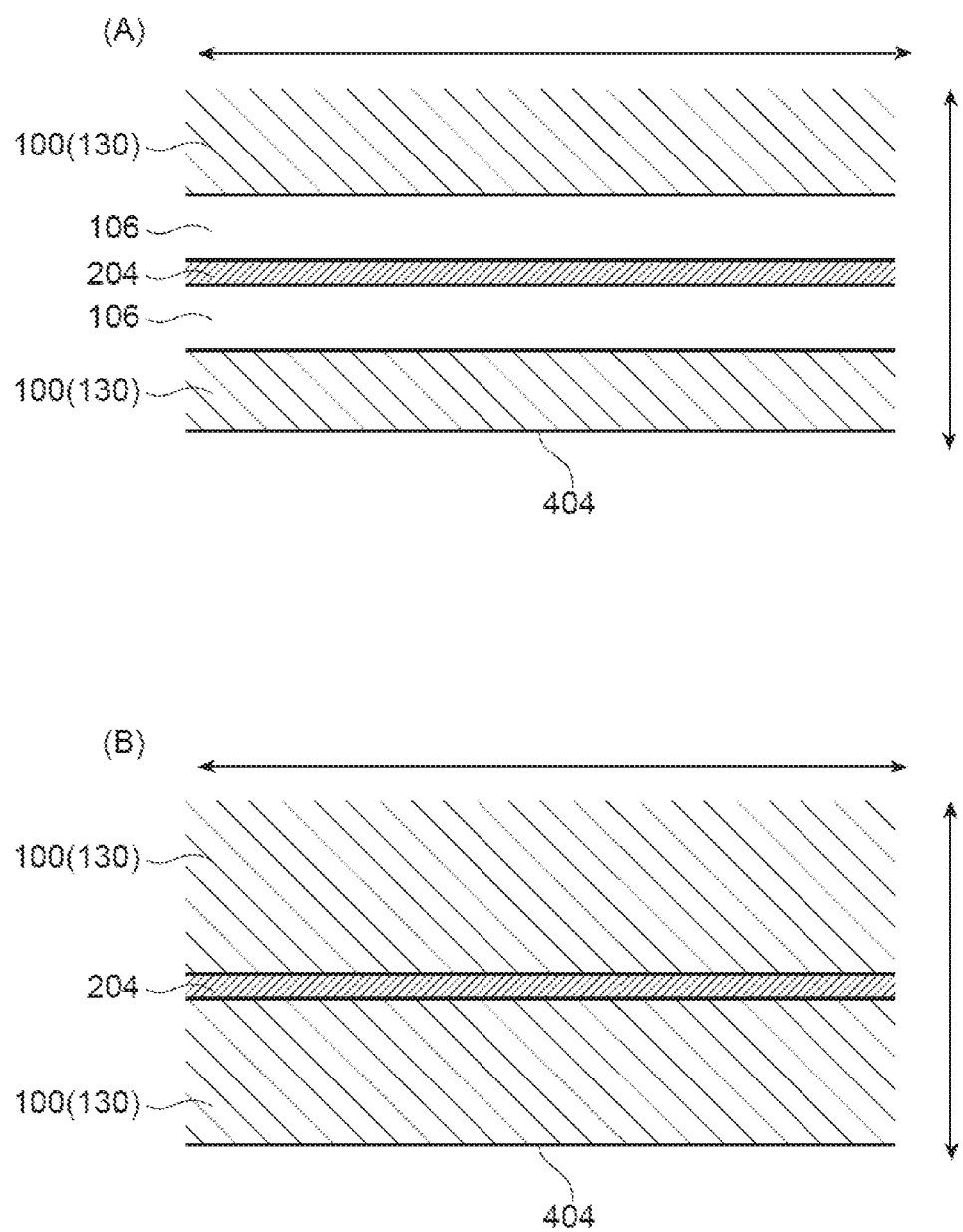
FIG. 11(A) is a sectional view of a part of a region X illustrated in FIG. 8 of the vehicle seat member according to the second embodiment of the first invention at a height going through a second framework rear part.
FIG. 11(B) is a sectional view of a part corresponding to the region X illustrated in FIG. 8 at the height going through the second framework rear part when a gap is not provided in the vehicle seat member according to the second embodiment of the first invention.

In this embodiment, too, as illustrated in FIGS. 9 and 10, the first framework 250 and the second framework rear part 204 are disposed in the vicinity of the bottom surface 140 which is one of the end surfaces of the foamed resin molded body 100 in the thickness direction, respectively. In the foamed resin molded body 100, the part 115 surrounding the first framework 250 and the part 116 surrounding the second framework rear part 204 have grooves with bottoms formed extending along the first framework 250 and the second framework rear part 204, opened to the bottom surface 140 and, formed in the foamed resin molded body 100 so as to contain the first framework 250 and the second framework rear part 204 and have the gaps 105, 106 formed as internal spaces of the grooves, respectively. In this embodiment, since the gaps 105, 106 are formed only in the vicinity of the bottom surface 140 which is one of the end surfaces of the foamed resin molded body 100 in the thickness direction, mechanical strength of the entire foamed resin molded body 100 is not damaged, and the vehicle seat member 1 with high mechanical strength is obtained.

The forming method of the gaps 105, 106, 106 in the second embodiment is similar to the forming method of the gaps 101, 101, 102, 102 in the first embodiment.

First Invention/Third Embodiment

With regard to a third embodiment of the vehicle seat member 1 and the method of manufacturing the same of the first invention, features different from the aforementioned third embodiment will be described below on the basis of FIGS. 12 to 14. Description on features of the third embodiment in common with the first embodiment will be omitted.

In the third embodiment, a gap 108, a gap 109, a gap 110, and a gap 111 are formed between the second framework first corner part 205 (hereinafter, referred to as the "first corner part 205" in some cases), the second framework second corner part 206 (hereinafter, referred to as the "second corner part 206" in some cases), the second framework third corner part 207 (hereinafter, referred to as the "third corner part 207" in some cases), and the second framework fourth corner part 208 (hereinafter, referred to as the "fourth corner part 208" in some cases) of the frame member 200, and a part of the foamed resin molded body 100 in the peripheries thereof, respectively.

Since the foamed resin molded body 100 of the vehicle seat member 1 having a rectangular (substantially rectangular) outer shape 400 in plan view as illustrated is contracted or expanded along a direction of each side after molding, though a force is applied in any direction to the first to fourth corner parts 205 to 208 of the frame member 200 extending along the first corner 405, the second corner 406, the third corner 407, and the fourth corner 408 of the outer shape 400 of the vehicle seat member 1, the first to fourth corner parts 205 to 208 are connected to each other and relative positions are fixed, and thus, the frame member 200 is deformed easily. Moreover, in the vicinity of each of the first to fourth corner parts 205 to 208, contraction of the foamed resin molded body 100 becomes non-uniform, and the foamed resin molded body 100 is also deformed easily. Moreover, when the foamed resin molded body 100 is expanded or contracted at a heat input into the manufactured vehicle seat member 1 or a heat release after the heat input, deformation of the frame member 200 and the foamed resin molded body 100 can occur similarly.

Thus, as in this embodiment, gaps are formed between each of two or more of the first to fourth corner parts 205 to 208 of the frame member 200 connected to each other and a part of the foamed resin molded body 100 located closer to the outer side and/or the inner side than the each of the two or more of the first to fourth corner parts 205 to 208, wherein the gaps extend along the extending direction of each of the two or more of the first to fourth corner parts 205 to 208, and wherein the two or more of the first to fourth corner parts 205 to 208 extend along each of two or more corners selected from the four corners 405 to 408 of the outer shape 400 of the vehicle seat member 1, and wherein the two or more corners are selected so as to constitute one or more pairs of corners opposed in a direction of any one side of the outer shape 400 (in other words, the two or more corners are any one of a combination of the first corner 405 and the second corner 406, a combination of the first corner 405, the second corner 406, and the third corner 407, a combination of the first corner 405, the second corner 406, the third corner 307, and the fourth corner 408, a combination of the second corner 406 and the third corner 407, a combination of the second corner 406, the third corner 407, and the fourth corner 408, a combination of the third corner 407 and the fourth corner 408, a combination of the third corner 407, the fourth corner 408, and the first corner 405, a combination of the fourth corner 408 and the first corner 405, and a combination of the fourth corner 408, the first corner 405, and the second corner 406). The gaps formed can reduce an influence on the frame member 200 caused by contraction or expansion of the vehicle seat member 1 along one or more sides of the outer shape 400.

In the following description of the third embodiment, features of the gap 110 formed between the third corner part 207 and the foamed resin molded body 100 will be described, but the other gaps 108, 109, 111 also have the similar features.

Figure 13:
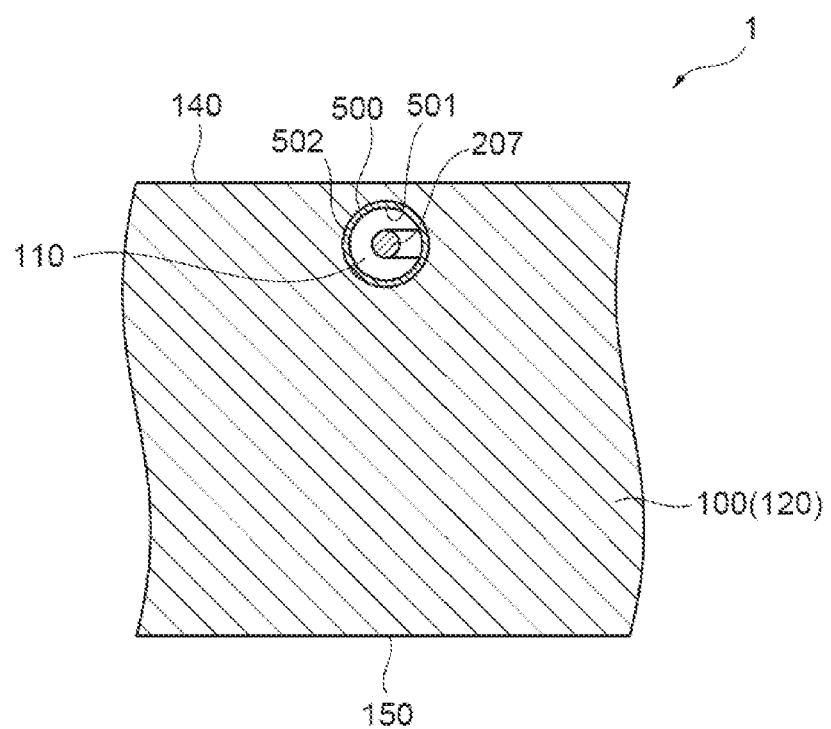
FIG. 13 is a V-V line arrow-view sectional view illustrated in FIG. 12 of the vehicle seat member according to the third embodiment of the first invention.

As in the embodiment illustrated in FIG. 13, forming the gap 110 between the part of the foamed resin molded body 100 surrounding the entire periphery of the third corner part 207 and the third corner part 207 on the section perpendicular to the third corner part 207 is preferable, since the gap 110 reduces an influence of the force in various directions on the third corner part 207 by contraction or expansion of the foamed resin molded body 100 after the molding. However, not limited to this example, the gap 110 may have at least a structure formed between the part of the foamed resin molded body 100 located on the outer side and/or the inner side of the third corner part 207 and the third corner part 207 on the section perpendicular to the extending direction of the third corner part 207.

In this embodiment, as illustrated in FIG. 13, the gap 110 is formed as a cylindrical hole surrounded by the foamed resin molded body 100 on the entire periphery on the section perpendicular to the extending direction of the third corner part 207 of the frame member 200, and since mechanical strength of the entire foamed resin molded body 100 is not damaged, the vehicle seat member 1 with high mechanical strength is obtained.

In the third embodiment, the vehicle seat member 1 further includes a tubular body 500 embedded in the foamed resin molded body 100 in a state where the first corner part 205, the second corner part 206, the third corner part 207, and the fourth corner part 208 of the frame member 200 are inserted therein, respectively. The gaps 108, 109, 110, 111 are formed between the first corner part 205, the second corner part 206, the third corner part 207, and the fourth corner part 208 of the frame member 200, and an inner peripheral surface 501 of the tubular body 500. An outer peripheral surface 502 of the tubular body 500 is in contact with the foamed resin molded body 100.

An example of the method of manufacturing the vehicle seat member 1 of the third embodiment will be described by referring to FIG. 14. Each of FIG. 14 is a view corresponding to the V-V line arrow-view sectional view in FIG. 12 and illustrates a step of forming the gap 110 in the periphery of the third corner part 207 of the frame member 200. Since the gaps 108, 109, 111 in the peripheries of the first corner part 205, the second corner part 206, and the fourth corner part 208 of the frame member 200 can be also manufactured by the similar procedure, the description will be omitted.

As a placing step, first, as illustrated in FIG. 14(A), the frame member 200 and the tubular body 500 are disposed in a cavity 81 inside a molding die 80 in a state where the third corner part 207 of the frame member 200 is inserted through the tubular body 500 so that the gap 110 is formed between the third corner part 207 of the frame member 200 and the inner peripheral surface 501 of the tubular body 500). Further, after the molding die 80 in which the frame member 200 is disposed in the cavity 81 is temporarily clamped (cracking), pre-expanded resin particles 170 obtained by pre-expanding expandable resin particles containing a resin and a foaming agent are filled and clamped. At this time, in order to prevent entry of the pre-expanded resin particles 170 into the gap 110, it is only necessary that an opening width of the gap 110 is formed having a width smaller than a dimension of the pre-expanded resin particle 170 or that after the frame member 200 and the tubular body 500 are installed in the molding die 80, an appropriate measure is taken so that the pre-expanded resin particles 170 cannot enter into the gap 110 and then, the pre-expanded resin particles 170 are filled.

Subsequently, as illustrated in FIG. 14(B), the pre-expanded resin particles 170 are secondarily foamed by heating the inside of the cavity 81 of the molding die 80 by steam or the like, the gaps among the pre-expanded resin particles 170 are filled, and the pre-expanded resin particles 170 are integrated by fusing them to each other so that the foamed resin molded body 100 is formed. At this time, the foamed resin molded body 100 is brought into close contact with the outer peripheral surface 502 of the tubular body 50X), but the inside of the tubular body 500 is held as the gap 110.

Subsequently, the molding die 80 is removed, and the vehicle seat member 1 of the third embodiment in which the foamed resin molded body 100, the frame member 200, and the tubular body 500 are integrated. At this time, the foamed resin molded body 100 contracts at the time of the die removal or after the die removal. With regard to the foamed resin molded body 100, as indicated by an arrow in FIG. 14(C), the foamed resin molded body 1000 in the periphery of the third corner part 207 is moved inward, and the third corner part 207 is moved relatively outward in the gap 110 with that. In FIG. 14(C), the position of the third corner part 207 in the gap 110 in the molding die 80 before the die removal is indicated by a dotted line. By providing the gap 110 as above, the direct influence on the third corner part 207 by the contraction of the foamed resin molded body 100 after the molding can be avoided. In FIG. 14(C), the relative position of the third corner part 207 in the gap 110 after the contraction is indicated with highlight for explanation, but in actuality, a movement distance to the outer side is slight, and as illustrated in FIG. 13, the position of the third corner part 207 in the gap 110 can be regarded as substantially at the center. That is, FIG. 13 and FIG. 14(C) illustrate the same section.

When the vehicle seat member 1 of the third embodiment is manufactured by the aforementioned procedure, there is no need to provide the projecting portions according to the gaps 108, 109, 110, 111 in the molding die 80, and the gap can be formed at a desired position by adjusting disposed positions and the number of the tubular bodies 500, which is preferable.

The tubular body 500 only needs to be able to hold the internal space under the condition of molding the foamed resin molded body 100, and the material of the tubular body 500 is not particularly limited.

First Invention/Other Embodiments

The vehicle seat member of the first invention and the method of manufacturing the same are not limited to the aforementioned first to third embodiments, but various changes can be made within a range not departing from the gist of the first invention described in the claims.

For example, in the vehicle seat member 1 in the first embodiment, the gap 105 described in the second embodiment may be further formed between a part of the first framework 250 and the foamed resin molded body 100, the gaps 106, 106 described in the second embodiment may be formed between a part of the second framework rear part 204 and the foamed resin molded body 100, the gap 108 described in the third embodiment may be formed between the first corner part 205 of the second framework 260 and the foamed resin molded body 100, the gap 109 described in the third embodiment may be formed between the second corner part 206 of the second framework 260 and the foamed resin molded body 100, the gap 110 described in the third embodiment may be formed between the third corner part 207 of the second framework 260 and the foamed resin molded body 100, and the gap 111 described in the third embodiment may be formed between the fourth corner part 208 of the second framework 260 and the foamed resin molded body 100.

Moreover, in the vehicle seat member 1 of the first embodiment and/or the second embodiment, one or more of the gaps 101, 101, 102, 102, 105, 106, 106 may be formed as internal spaces of the tubular body 500 disposed so that parts of the first framework 250 and the second framework 260 are inserted as described in the third embodiment.

<Second Invention>

Hereinafter, a vehicle seat member according to the second invention and embodiments of a vehicle seat will be described by referring to the drawings. However, a range of the second invention is not limited to individual embodiments.

Second Invention/First Embodiment 2-1-1. Vehicle Seat Member 2010

A first embodiment of a vehicle seat member and a method of manufacturing the same will be described on the basis of FIGS. 16 to 20.

Figure 16:
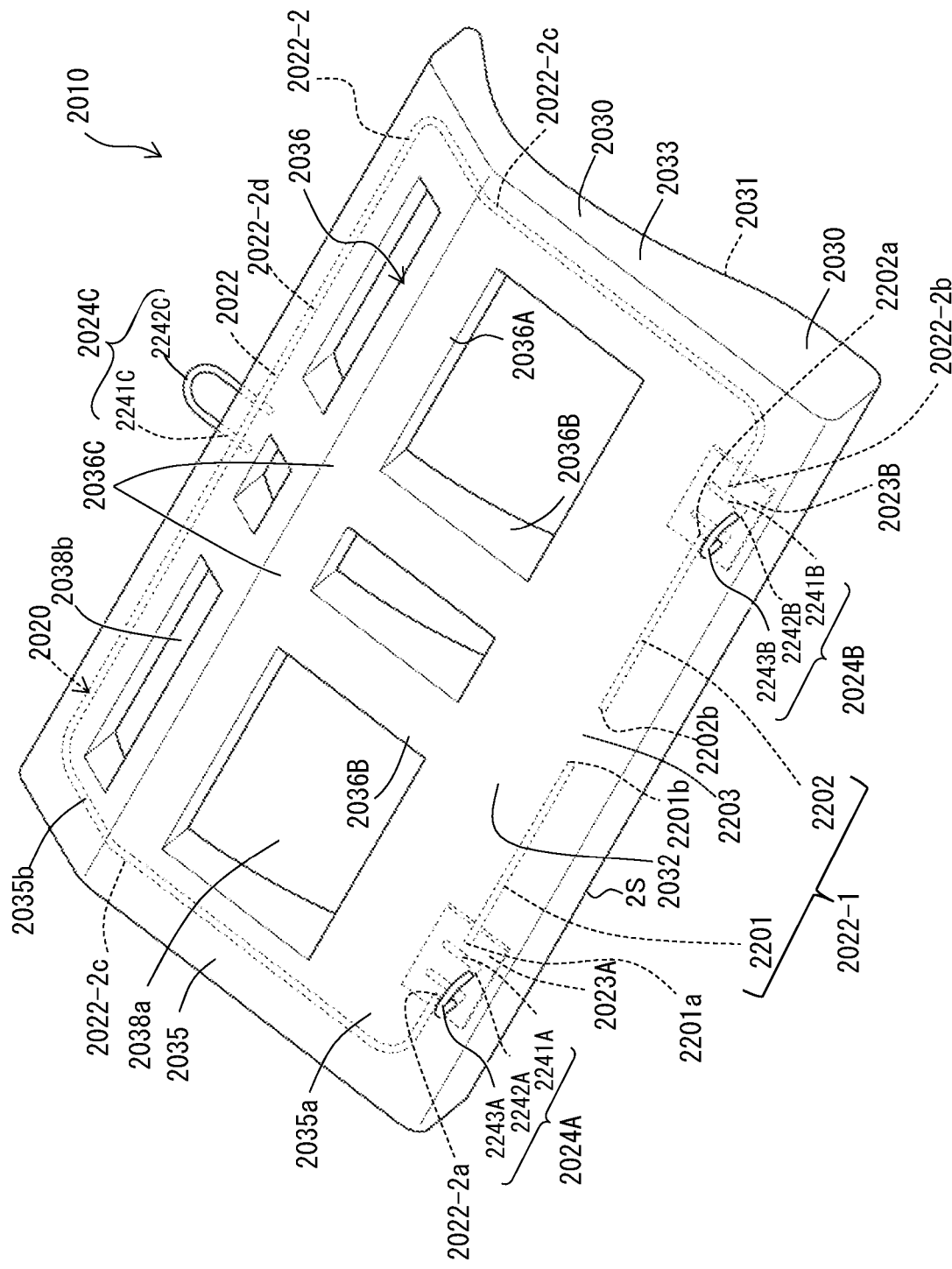
FIG. 16 is a schematic perspective view of a vehicle seat member according to a first embodiment of a second invention when seen from below.
Figure 17:
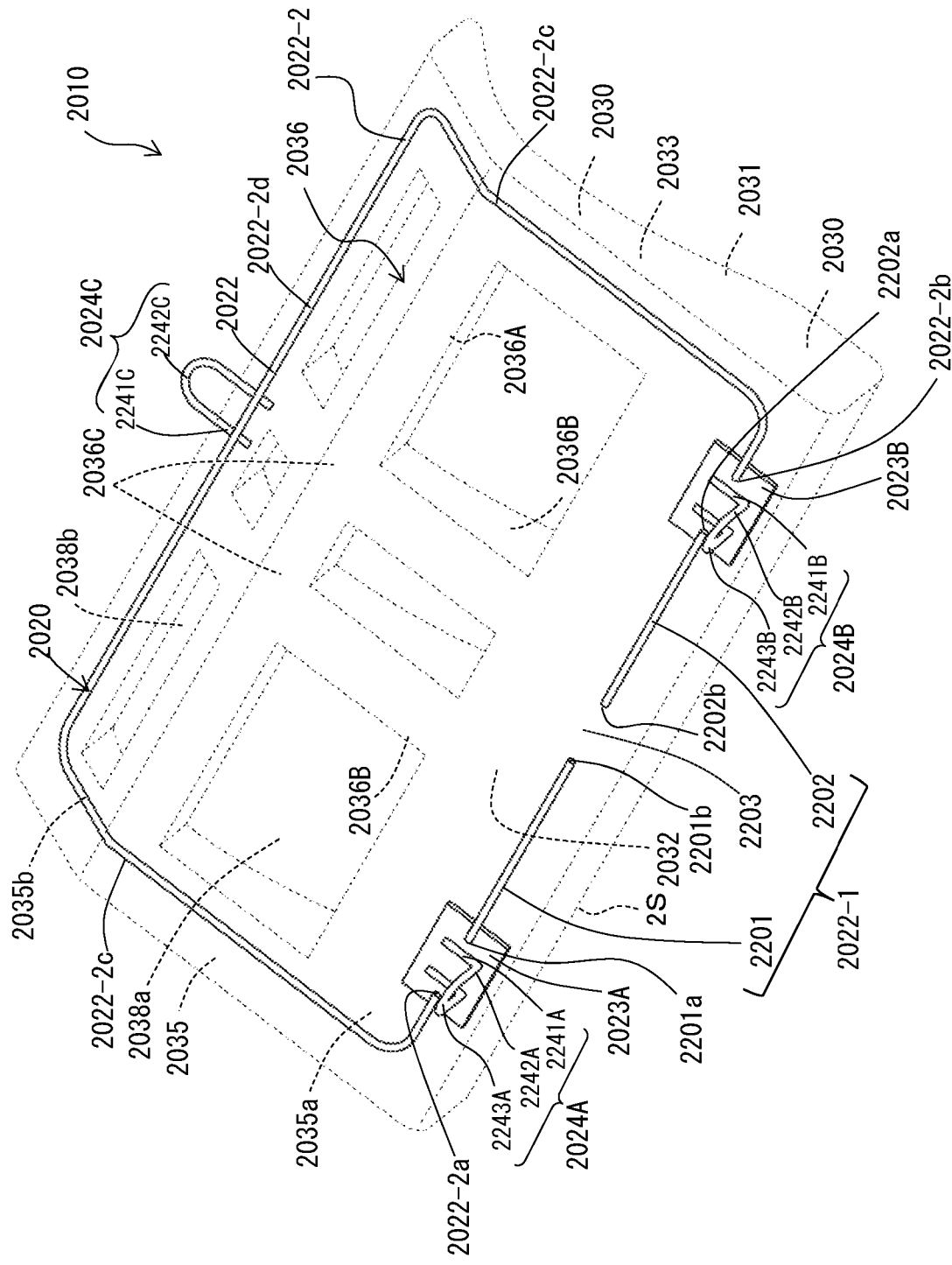
FIG. 17 is a schematic perspective view illustrating a placed state of a frame member of the vehicle seat member illustrated in FIG. 16.

As illustrated in FIGS. 16 and 17, the vehicle seat member 2010 includes a frame member 2020 and a foamed resin molded body 2030 in which at least a part of the frame member 2020 is embedded as a basic constitution.

Figure 19:
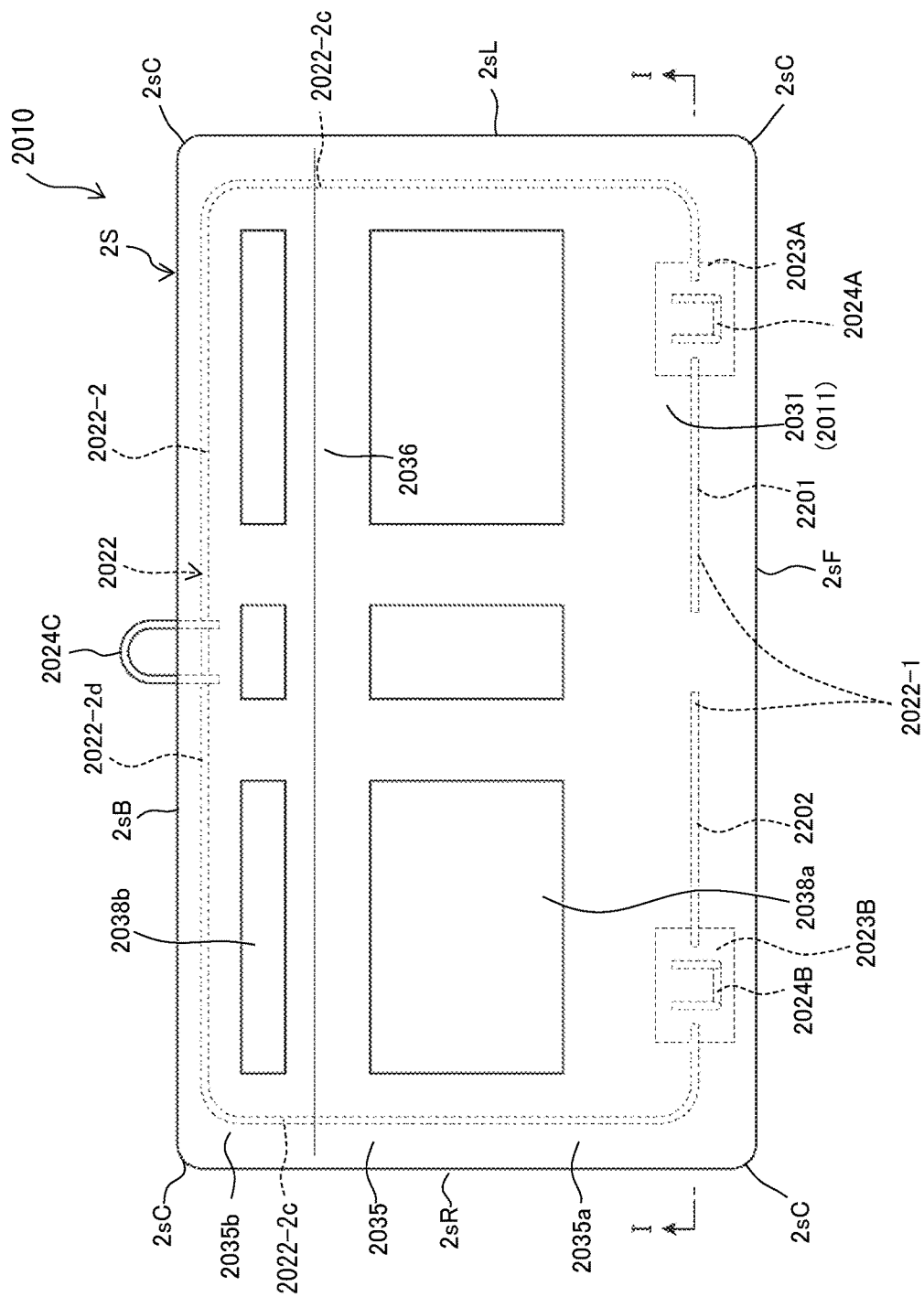
FIG. 19 is a view of the vehicle seat member illustrated in FIG. 16 when seen from an upper surface.

An entire shape of the vehicle seat member 2010 is not particularly limited but as illustrated in FIG. 19, a rectangular shape in plan view is common. In the description, a rectangle refers to a square such as a rectangle, a regular square, and the like, and not only the rectangle or the regular square, it may be a shape such as a trapezoid or a parallelogram. In the description, the rectangle also includes a substantial rectangle, and corner parts may be rounded or a part or the whole of a side constituting the rectangle may be a bent side, for example.

In this embodiment, as illustrated in FIG. 19, an outer shape 2S of the vehicle seat member 2010 in plan view is a rectangle having a short side and a long side and has a shape having a short side direction and the longitudinal direction. The outer shape 2S includes a right edge 2$s$R and a left edge 2$s$L constituting the short sides, a front edge 2$s$F and a rear edge 2$s$B constituting the long sides as four sides, and corners 2$s$C constituting four corners. The terms front, rear, left, and right in this embodiment refer to directions when an advancing (front) direction of the vehicle is seen from the vehicle in a state where an occupant is seated in the vehicle.

Figure 18:
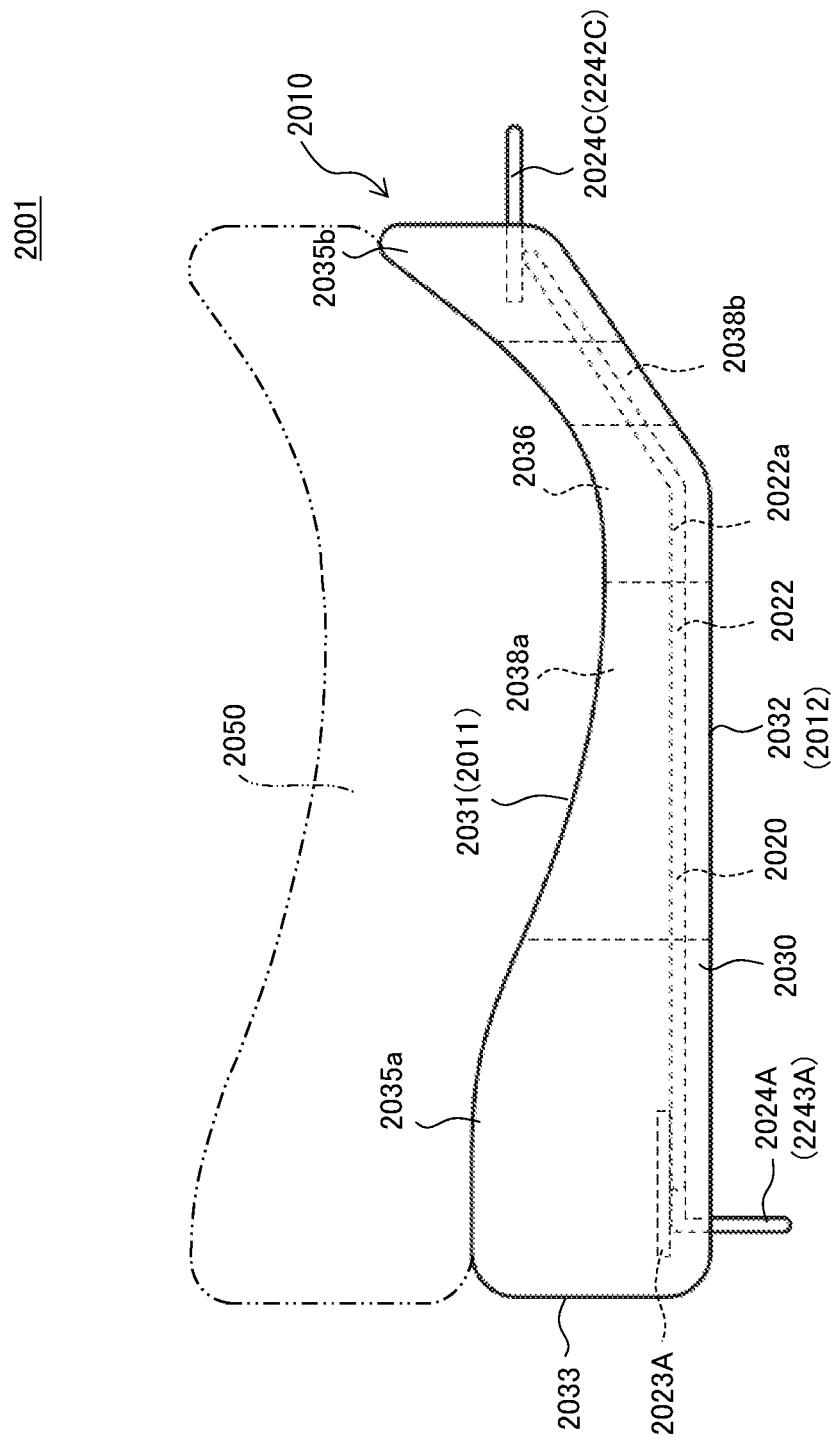
FIG. 18 is a left side view of the vehicle seat member illustrated in FIG. 16.

The vehicle seat member 2010 of this embodiment may be made into a vehicle seat 2001 by laminating/disposing an upper seat member 2050 such as a cushion material or the like as appropriate from a side of an upper surface 2011 of the vehicle seat member 2010, in other words, an upper surface 2031 of the foamed resin molded body 2030 as illustrated in FIG. 18, for example. Moreover, the vehicle seat member 2010 may be covered by an appropriate exterior material together with the cushion material or the like so as to have the vehicle seat 2001.

2-1-2. Frame Member 2020

As illustrated in FIGS. 16 and 17, the frame member 2020 is embedded in order to apply required shape retaining properties and strength to the foamed resin molded body 2030. The frame member 2020 is usually constituted by a material whose dimensions are not substantially changed as compared to the foamed resin molded body 2030 under a condition that the foamed resin molded body 2030 is molded or a metal material such as steel or aluminum, for example.

The frame member 2020 includes a linear framework 2022 extending inside the foamed resin molded body 2030, a first locking fixture 2024A, a second locking fixture 2024B, a third locking fixture 2024C fixed to different positions in the extending direction in which the framework 2022 extends, a first plate-shaped member 2023A connecting the first locking fixture 2024A and the framework 2022, and a second plate-shaped member 2023B connecting the second locking fixture 2024B and the framework 2022 along the outer shape 2S of the vehicle seat member 2010 in plan view.

The framework 2022 includes a framework first section 2022-1 extending along the front edge 2$s$F of the outer shape 2S and a framework second section 2022-2 extending along the right edge 2$s$R, the rear edge 2$s$B, and the left edge 2$s$L of the outer shape 2S as sections sandwiched by the first locking fixture 2024A and the second locking fixture 2024B.

The framework first section 2022-1 in the framework 2022 is separated into a first part 2201 extending such that the first locking fixture 2024A is fixed to a side of one end 2201$a$ and another end 2201$b$ is located between the first locking fixture 2024A and the second locking fixture 2024B and a second part 2202 extending such that the second locking fixture 2024B is fixed to a side of one end 2202$a$ and another end 2202$b$ is located between the first locking fixture 2024A and the second locking fixture 2024B. In the framework 2022, a side of the other end 2201$b$ of the first part 2201 in the framework first section 2022-1 is not connected to a side of the other end 2202$b$ of the second part 2202. The first part 2201 and the second part 2202 of the framework first section 2022-1 both extend in a direction connecting the first locking fixture 2024A and the second locking fixture 2024B, and this direction is called an "extending direction" in the second invention in some cases.

In this embodiment, the other end 2201$b$ of the first part 2201 in the framework first section 2022-1 of the framework 2022 is located at a position closer to the first locking fixture 2024A than the other end 2202$b$ of the second part 2202. In other words, a gap 2203 is formed between the other end 2201$b$ of the first part 2201 in the framework first section 2022-1 of the framework 2022 and the other end 2202$b$ of the second part 2202, and in the extending direction, the first part 2201 is closer to a side of the first locking fixture 2024A than the gap 2203, while the second part 2202 is closer to a side of the second locking fixture 2024B than the gap 2203.

The first part 2201 and the second part 2202 in the framework first section 2022-1 of the framework 2022 extends along a part of the center of the front edge 2$s$F in its vicinity and is embedded in a spot slightly on an inner side of the part of the outer peripheral surface 2033 of the foamed resin molded body 2030 forming the front edge 2$s$F.

The framework first section 2022-1 of the framework 2022 is a part along the longitudinal direction of the outer shape 2S of the vehicle seat member 2010 and is called a "longitudinal part" of the framework 2022 in the second invention in some cases.

The framework second section 2022-2 in the framework 2022 extends along the right edge 2$s$R, the rear edge 2$s$B, and the left edge 2$s$L of the outer shape 2S in their vicinities and is embedded in a spot slightly on the inner side of the part of the outer peripheral surface 2033 of the foamed resin molded body 2030 forming the right edge 2$s$R, the rear edge 2$s$B, and the left edge 2$s$L.

The framework second section 2022-2 in the framework 2022 has the first locking fixture 2024A fixed to the side of the one end 2022-2$a$ and the second locking fixture 2024B fixed to the side of the other end 2022-2$b$. The framework second section 2022-2 has a structure in which opposed parts 2022-2$c$, 2022-2$c$ opposed to each other across a space inside a rim part 2035 are connected through a connecting part 2022-2$d$.

In this embodiment, the first locking fixture 2024A and the second locking fixture 2024B are not linked to each other in the framework first section 2022-1 of the framework 2022 but are linked with each other through another section (the framework second section 2022-2), whereby the frame member 2020 is integrally molded in general. The integrally molded frame member 2020 is preferable since an operation of disposition in the molding die is easy.

The framework 2022 and the first locking fixture 2024A are connected through the first plate-shaped member 2023A. Specifically, the first plate-shaped member 2023A is fixed to the side of the one end 2201$a$ of the first part 2201 in the framework first section 2022-1 and the side of the one end 2022-2$a$ in the framework second section 2022-2 in the framework 2022. The first locking fixture 2024A is fixed to the first plate-shaped member 2023A.

The framework 2022 and the second locking fixture 2024B are connected through the second plate-shaped member 2023B. Specifically, the second plate-shaped member 2023B is fixed to the side of the one end 2202$a$ of the second part 2202 in the framework first section 2022-1 and the side of the other end 2022-2$b$ in the framework second section 2022-2 in the framework 2022. The second locking fixture 2024B is fixed to the second plate-shaped member 2023B.

As described above, by means of the framework first section 2022-1 and the framework second section 2022-2 of the framework 2022 as well as the first plate-shaped member 2023A and the second plate-shaped member 2023B connecting them, the frame member 2020 circles around the entirety along the outer shape 2S of the vehicle seat member 2010 except a section between the first part 2201 and the second part 2202 in the framework first section 2022-1 of the framework 2022. In this embodiment, the frame member 2020 circles around the entirety along the outer shape 2S of the vehicle seat member 2010, but the frame member 2020 may circle around intermittently along the outer shape 2S of the vehicle seat member 2010, for example. In other words, not limited to this form, the framework may be disposed only on a part of a part along the outer shape 2S. For example, the framework 2022 may be disposed only along the front edge 2sF.

The first locking fixture 2024A, the second locking fixture 2024B, and the third locking fixture 2024C are parts by which the vehicle seat member 2010 is locked on the vehicle. The first locking fixture 2024A and the second locking fixture 2024B are disposed in the vicinity of both ends of the front edge 2sF of the vehicle seat member 2010 and a part thereof protrudes to the outside of the foamed resin molded body 2030 below the vehicle seat member 2010. The first locking fixture 2024A includes a base 2241A embedded in the foamed resin molded body 2030 and fixed to the first plate-shaped member 2023A, a column portion 2242A linked with the base 2241A and extending toward the outside of the foamed resin molded body 2030, and a locking portion 2243A extending from the column portion 2242A and protruding to the outside of the foamed resin molded body 2030. Similarly, the second locking fixture 2024B includes a base 2241B embedded in the foamed resin molded body 2030 and fixed to the second plate-shaped member 2023B, a column portion 2242B linked with the base 2241B and extending toward the outside of the foamed resin molded body 2030, and a locking portion 2243B extending from the column portion 2242B and protruding to the outside of the foamed resin molded body 2030. The locking portions 2243A, 2243B are curved in a form of a substantial U-shape and are exposed from the foamed resin molded body 2030.

Moreover, the third locking fixture 2024C is directly fixed to the center of the connecting part 2022-2d along the rear edge 2sB in the framework second section 2022-2 of the second framework 2022 and protrudes rearward. The base 2241C of the third locking fixture 2024C is embedded in the foamed resin molded body 2030 and is fixed to the connecting part 2022-2d. A locking portion 2242C at a distal end is curved in form of a substantial U-shape, is exposed from the foamed resin molded body 2030, and is used for engagement with the vehicle.

In this embodiment, the locking portion 2243A of the first locking fixture 2024A, the locking portion 2243B of the second locking fixture 2024B, and the locking portion 2242C of the third locking fixture 2024C are formed by bending a wire rod into a substantial U-shape, respectively, but this structure is not limiting but may have a structure capable of locking in accordance with the structure on the vehicle side. Moreover, a position of the third locking fixture 2024C is not limited to the center of the connecting part 2022-2d in the framework second section 2022-2 of the second framework 2022.

In this embodiment, the first locking fixture 2024A and the second locking fixture 2024B are fixed to the framework 2022 through the first plate-shaped member 2023A and the second plate-shaped member 2023B, respectively, but this form is not limiting, and as in the third locking fixture 2024C, they may be directly fixed to the framework 2022 not through the plate-shaped member. Moreover, the number of the locking fixtures is not limited to three.

In this embodiment, each of the aforementioned parts of the framework 2022 as well as the first locking fixture 2024A, the second locking fixture 2024B, and the third locking fixture 2024C can be constituted by a wire rod (wire) made of steel or aluminum having a diameter of approximately 3 to 6 mm or the like, for example. Moreover, each of the aforementioned parts of the framework 2022 as well as the first locking fixture 2024A, the second locking fixture 2024B, and the third locking fixture 2024C may be a band-shaped or tubular steel material made of metal, for example. Moreover, the entire frame member 2020 may be manufactured by punch molding and press molding from a steel plate. In the second invention, the framework is "linear" is not limited to a wire rod such as a wire but may be the aforementioned band-shape, tubular, or the like, for example, and is not particularly limited as long as it extends along substantially one line.

2-1-3. Foamed Resin Molded Body 2030

As illustrated in FIGS. 16 and 17, the foamed resin molded body 2030 is an in-mold foamed resin molded body of a foamed resin. The foamed resin is not particularly limited, but a foamed thermoplastic resin is usually used, and a foamed polystyrene-based resin, a foamed composite resin containing a polystyrene-based resin and a polyolefin-based resin, a foamed polyolefin-based resin, and the like are suitably used, and the foamed polystyrene-based resin or the foamed composite resin containing the polystyrene-based resin and the polyolefin-based resin is particularly preferable. The foamed polystyrene-based resin or the foamed composite resin containing the polystyrene-based resin and the polyolefin-based resin has small degrees of thermal expansion and thermal contraction and thus, it is particularly preferable from a viewpoint that deformation of the foamed resin molded body and the frame member is suppressed. An expansion ratio can be adjusted as appropriate in accordance with a type of the foamed resin, but it is approximately 10 to 50 times in general or approximately 20 to 40 times typically.

On the foamed resin molded body 2030, an upper surface 2031 on which an occupant of the vehicle is seated and a bottom surface 2032 which is on a side fastened to the vehicle are formed. The foamed resin molded body 2030 has the rim part 2035 in which the frame member 2020 is embedded and defining the outer shape 2S of the vehicle seat member 2010 in plan view of the vehicle seat member 2010. The rim part 2035 is constituted by a front part 2035a located on a front of a seat and a rear part 2035b formed integrally with the front part 2035a and inclined rearward in a state where the vehicle seat member 2010 is mounted. When the vehicle seat member 2010 is assembled in the vehicle, the front part 2035a of the foamed resin molded body 2030 supports a thigh part of the occupant and the rear part 2035b supports a buttock part of the occupant.

Specifically, as illustrated in FIG. 18, the upper surface 2031 of the foamed resin molded body 2030 is formed so as to hold the thigh part and the buttock part of the occupant through the upper seat member 2050 by being a curved surface dented downward so that a vicinity of the rear end of the front part 2035a becomes a deepest part in the illustrated embodiment. However, the shape and the thickness of the foamed resin molded body 2030 can be changed in various ways in accordance with a shape of the vehicle body side on which the vehicle seat member 2010 is mounted and is not limited to the illustrated embodiment.

The upper surface 2031 of the foamed resin molded body 2030 may be substantially a flat shape, for example.

The foamed resin molded body 2030 includes an extension 2036 extending inward from the rim part 2035 so as to bridge the rim part 2035 inside of the rim part 2035. More specifically, the extension 2036 has a first extension part 2036A extending in the longitudinal direction and two second extension parts 2036B extending in the short side direction. In this embodiment, the first extension part 2036A is formed so as to extend between the opposed parts 2022-2c, 2022-2c in the framework second section 2022-2 of the framework 2022. The first extension part 2036A and the second extension part 2036B are linked by a linking portion 2036C. As described above, by providing the first extension part 2036A and the second extension part 2036B crossing each other inside the rim part 2035, the vehicle seat member 2010 can be reinforced.

Moreover, by forming the extension 2036 in the space inside the rim part 2035, hollow portions 2038a, 2038b are formed in the front part 2035a and the rear part 2035b of the foamed resin molded body 2030, respectively. The hollow portions 2038a, 2038b are provided for the purpose of reducing a weight of the foamed resin molded body 2030 and of accommodating the other members constituting the vehicle seat (a cushion material, members of a console box, and the like, for example, which are elastically deformed more easily than the foamed resin molded body 2030).

However, the foamed resin molded body in the second invention is not limited to the illustrated form having the hollow portion formed and including the rim part and the extension. There may be a foamed resin molded body with no hollow portion formed, for example.

When a heat is input into the aforementioned vehicle seat member 2010 (or when the input heat is released), materials of the foamed resin of the foamed resin molded body 2030 and the frame member 2020 embedded in the foamed resin molded body 2030 which are materials of the vehicle seat member 2010 have different thermal expansion coefficients and thus, this difference in the thermal expansion coefficients can appear easily as a difference in the expansion amounts or the contraction amounts between (the rim part 2035 of) the foamed resin molded body 2030 and the frame member 2020.

Particularly, since the first locking fixture 2024A, the second locking fixture 2024B, and the framework first section 2022-1 of the framework 2022 sandwiched by them include the parts extending in a plurality of directions, thermal contraction or thermal expansion does not occur uniformly in the foamed resin molded body 2030 in which these parts of the frame member 2020 are embedded. Thus, the frame member 2020 and/or the foamed resin molded body 2030 is deformed particularly easily in the vicinities of the first locking fixture 2024A, the second locking fixture 2024B, and the framework first section 2022-1 of the framework 2022 sandwiched by them. Particularly, such phenomenon is remarkable in the vicinity of the framework first section 2022-1 of the frameworks 2022 extending in the longitudinal direction.

Thus, in the second invention, the framework first section 2022-1 of the framework 2022 is separated to the first part 2201 and the second part 2202. By means of this constitution, the first part 2201 and the second part 2202 can be relatively moved in the framework first section 2022-1 of the framework 2022. Particularly when the first locking fixture 2024A and the second locking fixture 2024B are linked with each other through another section (the framework second section 2022-2) of the framework 2022 as in this embodiment, the first part 2201 and the second part 2202 in the framework first section 2022-1 of the framework 2022 can be elastically deformed. Thus, under the condition that the difference is generated in the contraction amounts between the foamed resin molded body 2030 and the frame member 2020, the difference in the contraction amounts between the foamed resin molded body 2030 and the frame member 2020 can be absorbed between a side of another end 2201b of the first part 2201 and a side of another end 2202b of the second part 2202. As a result, deformation of the rim part 2035 in which the frame member 2020 is embedded can be suppressed.

Particularly, the extension 2036 (particularly, the first extension part 2036A) in which the frame member 2020 is not disposed and constituted only by the foamed resin is deformed easily as being curved from the center thereof. However, even in such a case, by separating the framework first section 2022-1 of the framework 2022 into the first part 2201 and the second part 2202, the entire shape of the vehicle seat member 2010 can be kept to a predetermined shape.

Moreover, in this embodiment, since the framework first section 2022-1 extending in the longitudinal direction of the framework 2022 is separated into the first part 2201 and the second part 2202, a large difference in the contraction amounts in the longitudinal direction between the frame member 2020 and the foamed resin molded body 2030 can be absorbed.

2-2. Method of Manufacturing Vehicle Seat Member 2010

Figure 20:
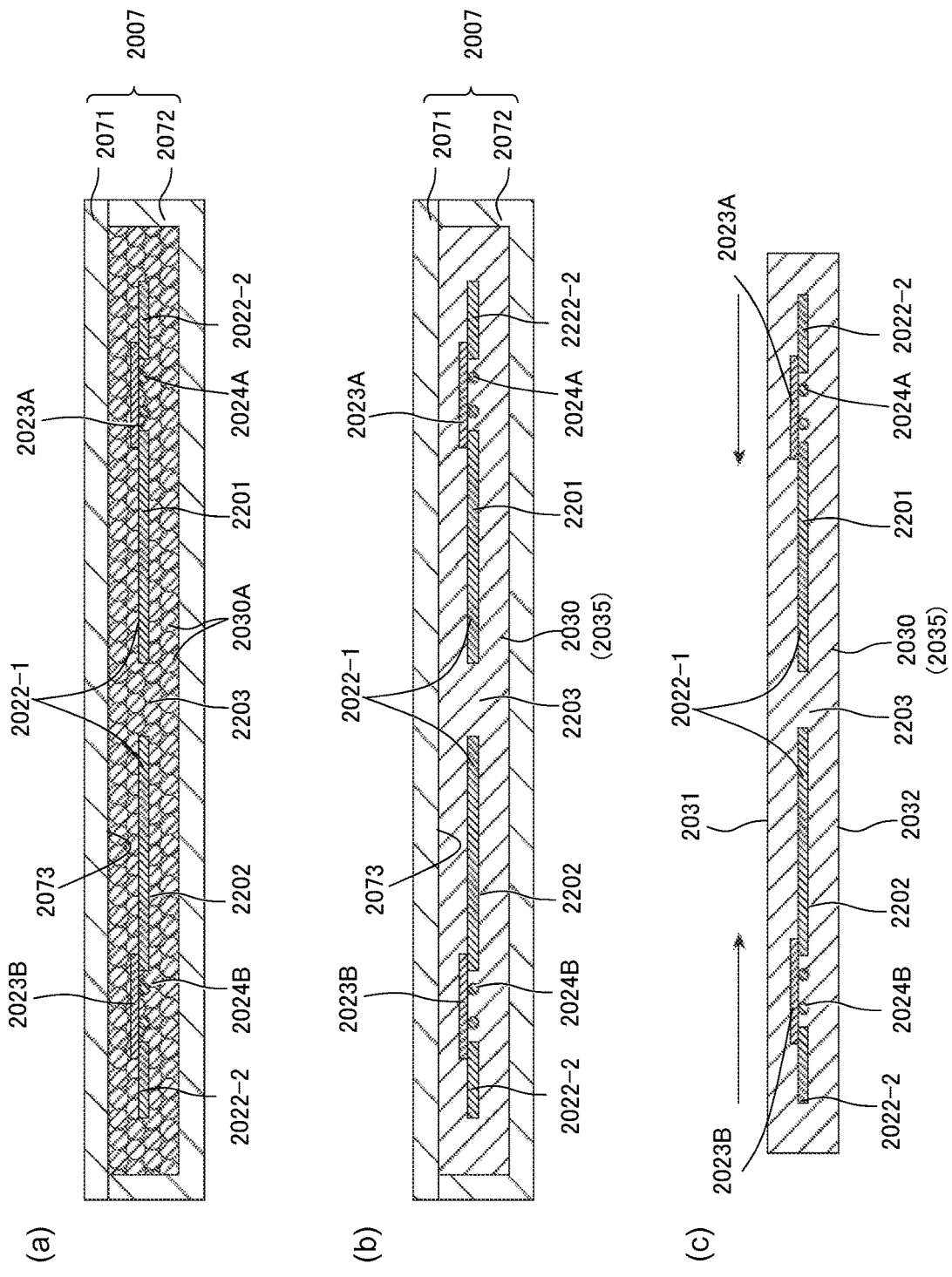
FIG. 20 are schematic sectional views at a position corresponding to a I-I line arrow-view section illustrated in FIG. 19.
Figure 21:
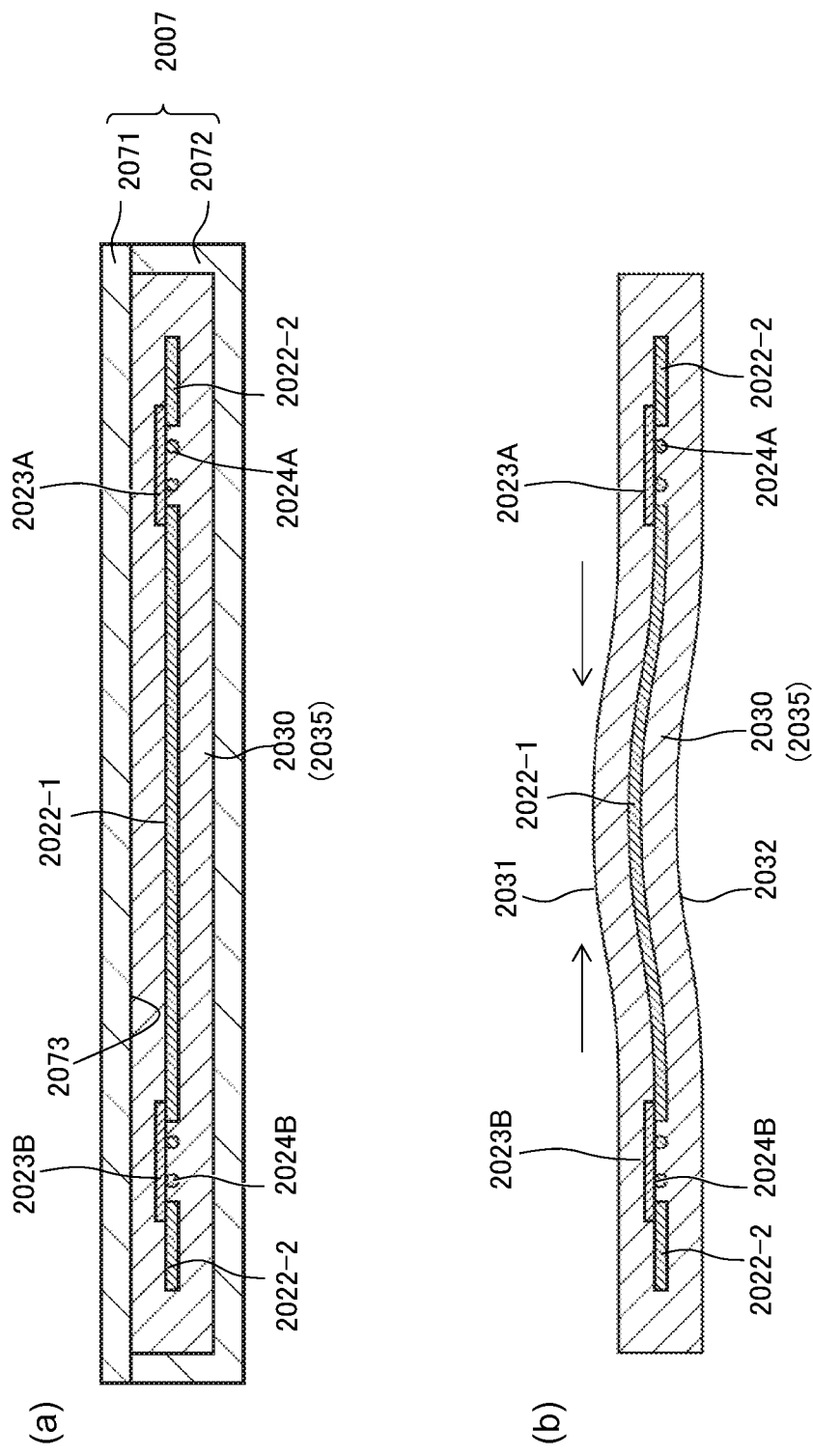

The method of manufacturing the vehicle seat member 2010 will be described below by referring to FIGS. 20 and 21. When the vehicle seat member 2010 of this embodiment is to be manufactured, the frame member 2020 is prepared. Subsequently, after the pre-expanded resin particles 2030A obtained by pre-expanding the expandable resin particles containing the resin and the foaming agent are filled, steam is supplied into a molding die 2007 so as to foam the pre-expanded resin particles 2030A, and the foamed resin molded body 2030 is molded. After that, the foamed resin molded body 2030 is removed from the molding die 2007 together with the frame member 2020 and cooled by heat releasing or the like.

The foamed resin molded body 2030 usually has a property of slightly contracting when remaining heat during foam molding is released after the molding. On the other hand, the frame member 2020 constituted by a material such as metal hardly contracts as compared to the foamed resin molded body 2030 before and after the molding of the foamed resin molded body 2030. Therefore, as illustrated in FIG. 21(a), after the foamed resin molded body 2030 is molded by the molding die 2007 made of a first die 2071 and a second die 2072, for a period of time immediately after the molding until the foamed resin molded body 2030 is removed from the molding die 2007 and the foamed resin molded body 2030 releases heat, the foamed resin molded body 2030 is thermally contracted.

As a result, as illustrated in FIG. 21(b), the rim part 2035 in which the framework first section 2022-1 sandwiched between the first locking fixture 2024A and the second locking fixture 2024B in the framework 2022 is embedded is deformed in some cases. Moreover, though not shown, both sides of the extension 2036 where the frame member 2020 is not present are restrained by the rim part 2035 where the frame member 2020 is present and thus, the compression stress and the tensile stress non-uniformly act as the thermal stress on the extension 2036, and the extension 2036 is deformed easily so as to be curved upward from the center.

A deformed state of the foamed resin molded body 2030 immediately after the molding is held even after the heat release.

In view of these points, in this embodiment, the vehicle seat member 2010 is manufactured as follows. First, the frame member 2020 having the aforementioned structure is prepared. Specifically, the frame member 2020 having the linear framework 2022 disposed along the outer shape 2S as well as the first locking fixture 2024A and the second locking fixture 2024B fixed at the different positions in the extending direction of the framework 2022, in which the first section 2022-1 which is one of the sections sandwiched by the first locking fixture 2024A and the second locking fixture 2024B in the framework 2022 is separated into the first part 2201 and the second part 2202 is prepared.

Subsequently, in plan view of the vehicle seat member 2010, the frame member 2020 is disposed in the molding die 2007 so that the frame member 2020 extends along the outer shape 2S of the vehicle seat member 2010 (placing step). In this placing step, the framework first section 2022-1 extends along the longitudinal direction of the outer shape 2S of the vehicle seat member 2010.

As illustrated in FIG. 20(a), the molding die 2007 is made of the first die 2071 and the second die 2072, and when the first die 2071 and the second die 2072 are clamped, a cavity 2073 according to the foamed resin molded body 2030 is formed in the molding die 2007.

Subsequently, as illustrated in FIG. 20(a), the first die 2071 and the second die 2072 in which the frame member 2020 is disposed is temporarily clamped (cracking) and then, the pre-expanded resin particles 2030A obtained by pre-expanding the expandable resin particles containing the resin and the foaming agent are filled therein and clamped.

Subsequently, as illustrated in FIG. 20(b), the pre-expanded resin particles 2030A are secondarily foamed by heating the inside of the cavity 2073 of the molding die 2007 by steam or the like, the gaps among the pre-expanded resin particles 2030A are filled, and the pre-expanded resin particles 2030A are integrated by fusing them to each other so that the foamed resin molded body 2030 is molded (molding step).

As described above, in the molding die 2007, the foamed resin molded body 2030 including the rim part 2035 and the extension 2036 can be molded. The molded rim part 2035 has the frame member 2020 embedded and forms the outer shape 2S of the vehicle seat member 2010. Moreover, the molded extension 2036 extends on the inner side from the rim part 2035 so as to bridge the rim part 2035 inside of the rim part 2035.

Subsequently, as illustrated in FIG. 20(c), the foamed resin molded body 2030 is removed from the molding die 2007, and the foamed resin molded body 2030 heated by the heat during the molding is cooled (cooling step). Here, previously, as illustrated in FIG. 21(b), the rim part 2035 of the foamed resin molded body 2030 and the framework first section 2022-1 of the frame member 2020 embedded therein were deformed by the thermal contraction so as to be curved upward and the extension 2036 was also deformed in some cases, for example.

However, in this embodiment, as illustrated in FIG. 20(c), by separating the framework first section 2022-1 of the framework 2022 into the first part 2201 and the second part 2202, the difference in the contraction amounts between the foamed resin molded body 2030 and the frame member 2020 can be absorbed between the side of the other end 2201b of the first part 2201 and the side of the other end 2202b of the second part 2202. As a result, when the heat during the molding of the foamed resin molded body 2030 is released, deformation of the frame member 2020, the rim part 2035, and the extension 2036 caused by the thermal contraction can be suppressed, and the entire shape of the vehicle seat member 2010 can be kept to the predetermined shape. As a result, the vehicle seat member 2010 with high dimensional accuracy can be manufactured.

Particularly, when the frame member 2020 is made to continuously circle around along the outer shape 2S of the vehicle seat member 2010, such deformation occurs easily, but in this embodiment, even in such a case, by separating the framework first section 2022-1 of the framework 2022 into the first part 2201 and the second part 2202, the deformation can be suppressed.

Second Invention/Second Embodiment

The vehicle seat member 2010 according to a second embodiment of the second invention and the method of manufacturing same will be described below by referring to FIGS. 22 and 23. The vehicle seat member 2010 according to the second embodiment is different from that of the first embodiment in structures of the first part 2201 and the second part 2202 of the framework first section 2022-1 of the framework 2022. Therefore, the same constitutions as those in the first embodiment are given the same reference numerals and detailed description will be omitted.

Figure 22:
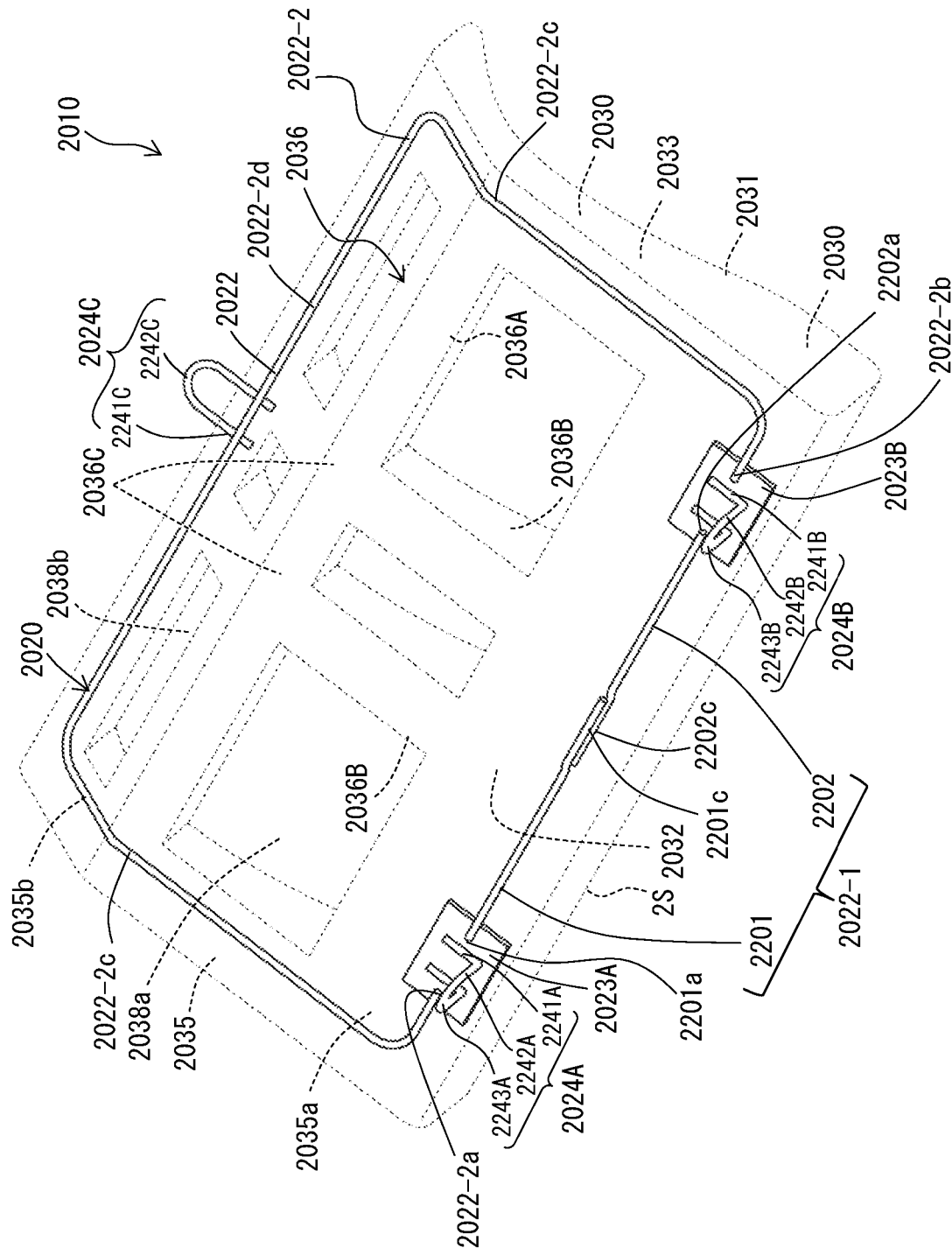
FIG. 22 is a schematic perspective view illustrating a placed state of the frame member of the vehicle seat member according to a second embodiment of the second invention.
Figure 23:
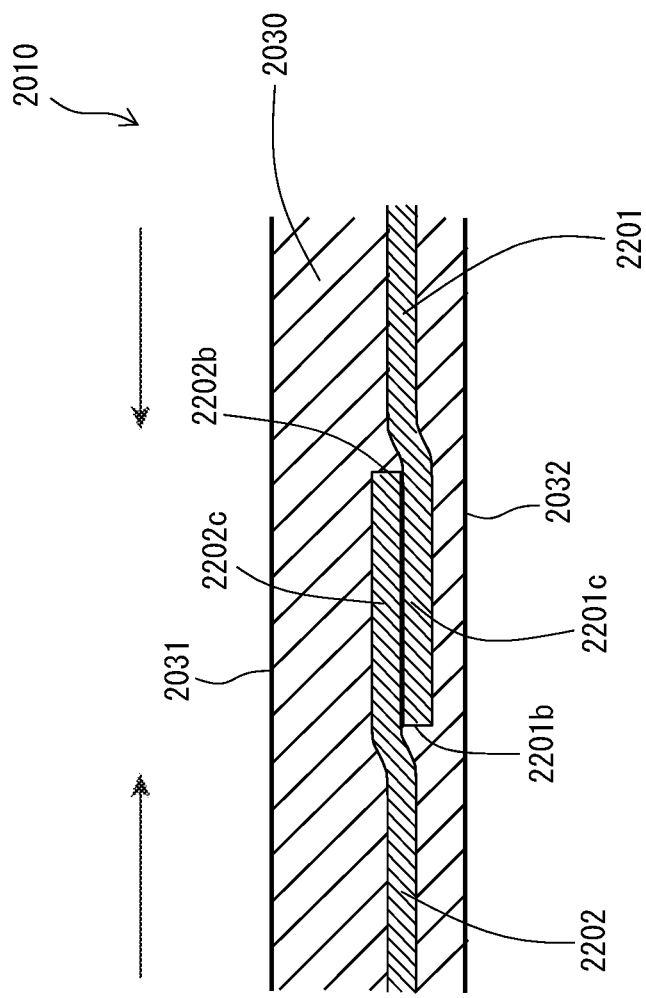
FIG. 23 is a schematic conceptual diagram for explaining vicinities of another end side of a first member and another end side of a second member according to the second embodiment corresponding to FIG. 20(c).

In this embodiment, as illustrated in FIGS. 22 and 23, the other end 2201b of the first part 2201 is located at a position closer to the second locking fixture 2024B than the other end 2202b of the second part 2202 in the extending direction of the framework first section 2022-1 of the framework 2022 of the frame member 2020, and a side 2201c of the other end 2201b of the first part 2201 and a side 2202c of the other end 2202b of the second part 2202 are disposed so as to be juxtaposed in a direction perpendicular to the extending direction.

According to this constitution, since the first part 2201 and the second part 2202 of the framework first section 2022-1 of the framework 2022 are disposed without disconnection in the extending direction between the first locking fixture 2024A and the second locking fixture 2024B, in the vehicle seat member 2010 in which this frame member 2020 is embedded in the foamed resin molded body 2030, sufficient mechanical strength is given to a part between the first locking fixture 2024A and the second locking fixture 2024B of the foamed resin molded body 2030.

Moreover, in the first part 2201 and the second part 2202 of the framework first section 2022-1 of the framework 2022, the side 2201c of the other end 2201b of the first part 2201 and the side 2202c of the other end 2202b of the second part 2202 are disposed side by side but since they are not linked with each other, the first part 2201 and the second part 2202 can be moved relatively.

Thus, according to the second embodiment, the difference in the contraction amounts between the foamed resin molded body 2030 and the frame member 2020 can be absorbed between the side 2201c of the other end 2201b of the first part 2201 and the side 2202c of the other end 2202b of the second part 2202, while strength of the vehicle seat member 2010 to be manufactured is kept.

In the second embodiment, the side 2201c of the other end 2201b of the first part 2201 and the side 2202c of the other end 2202b of the second part 2202 in the framework first section 2022-1 of the framework 2022 do not have to be in contact with each other as illustrated but may be separated from each other. Moreover, if they are separated from each other, there may be a part of the foamed resin molded body 2030 between the side 2201c of the other end 2201b of the first part 2201 and the side 2202c of the other end 2202b of the second part 2202 in the framework first section 2022-1 of the framework 2022.

Some embodiments of the second invention have been described in detail, but the second invention is not limited to the aforementioned embodiments but is capable of various design changes within a range not departing from the spirit of the second invention described in "Solution to Problem".

<Third Invention>

Third Invention/First Embodiment 3-1. Vehicle Seat Member 3010

A first embodiment of a vehicle seat member and a method of manufacturing the same will be described on the basis of FIGS. 24 to 29.

Figure 24:
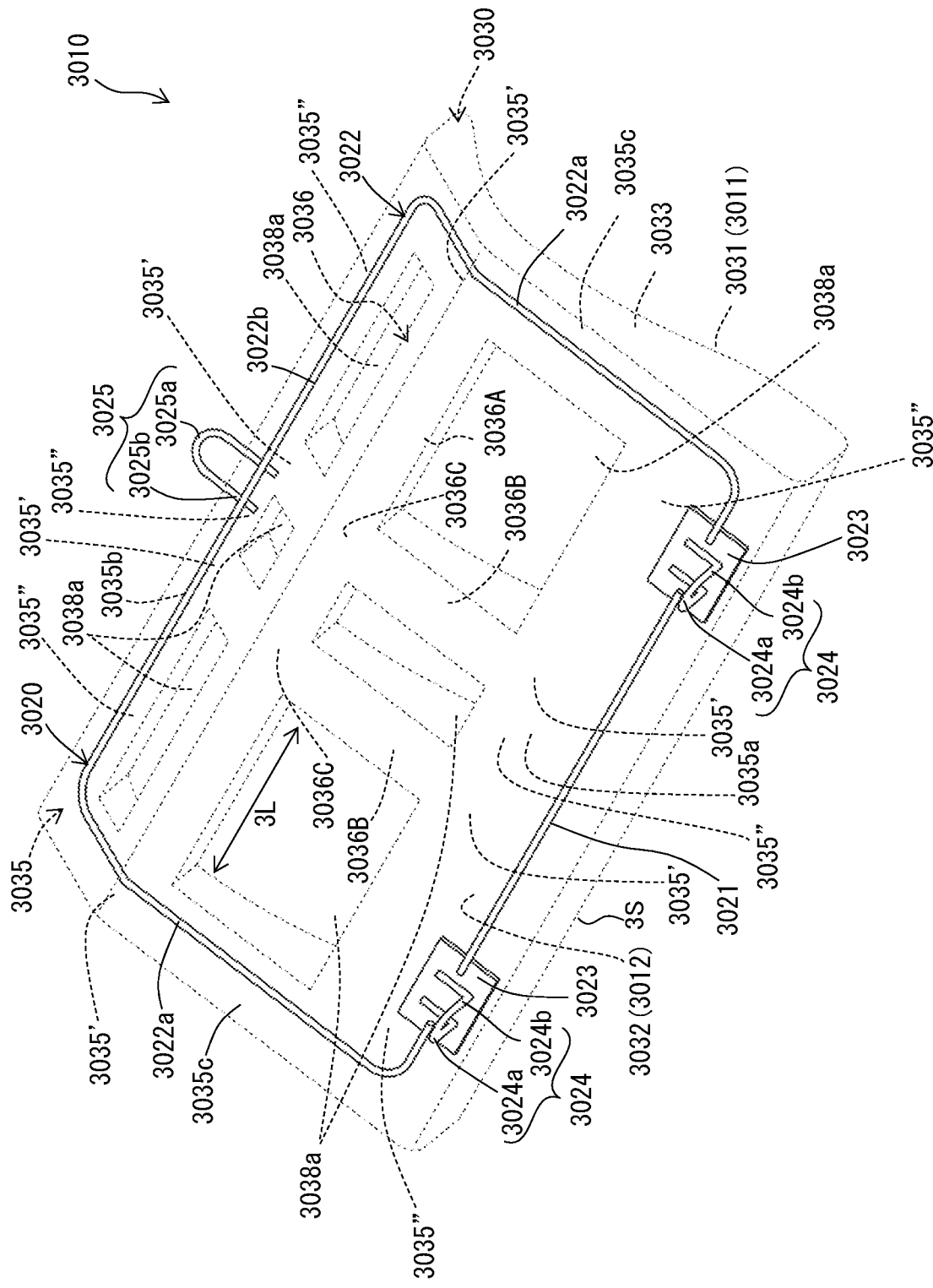
FIG. 24 is a schematic perspective view for explaining a structure of a frame member when a vehicle seat member according to a first embodiment of a third invention is seen from below.
Figure 25:
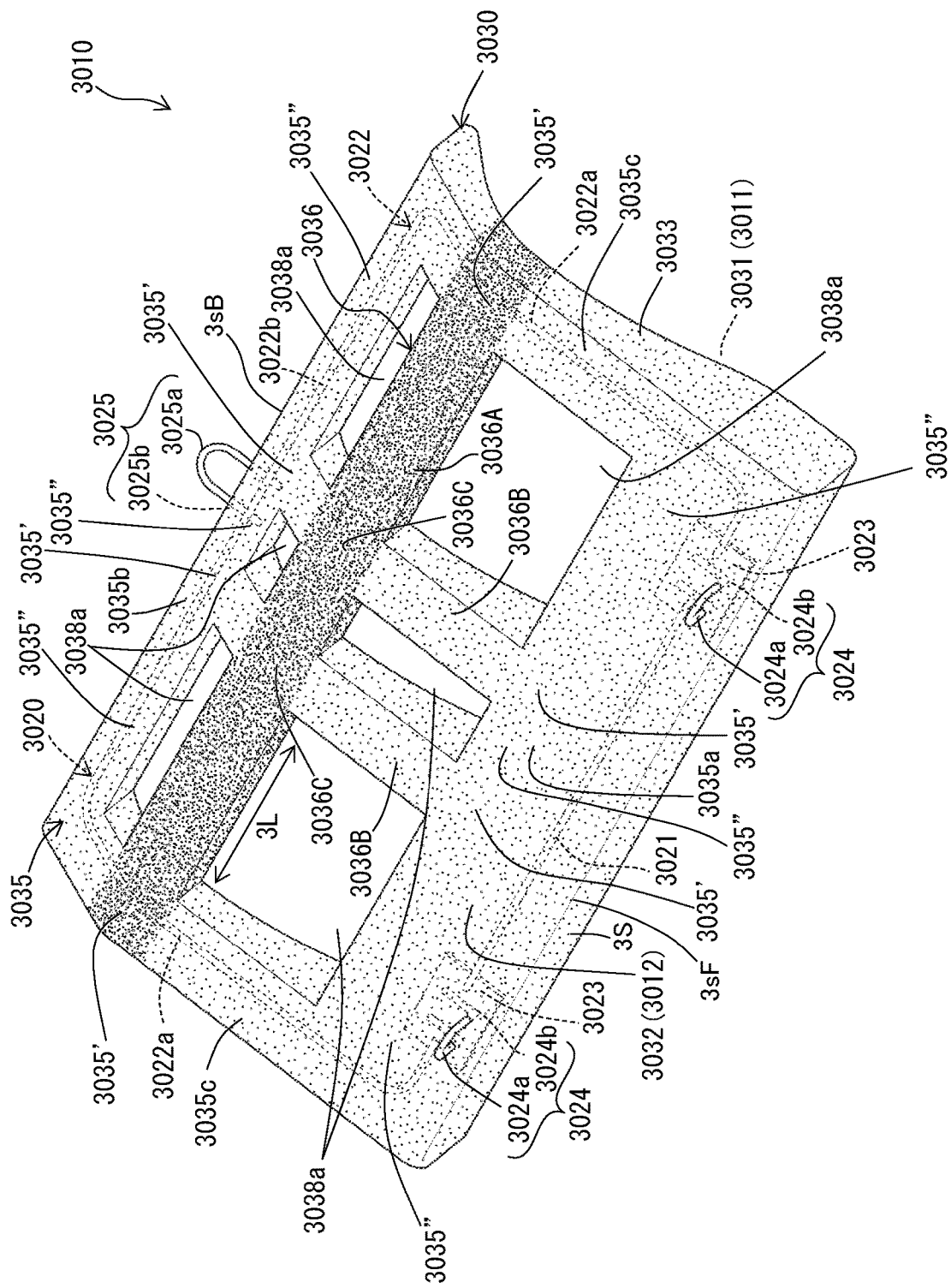
FIG. 25 is a schematic perspective view for explaining a structure of a foamed resin molded body when the vehicle seat member according to the first embodiment of the third invention is seen from below.

As illustrated in FIGS. 24 and 25, the vehicle seat member 3010 includes a frame member 3020 and a foamed resin molded body 3030 in which at least a part of the frame member 3020 is embedded as a basic constitution.

Figure 27:
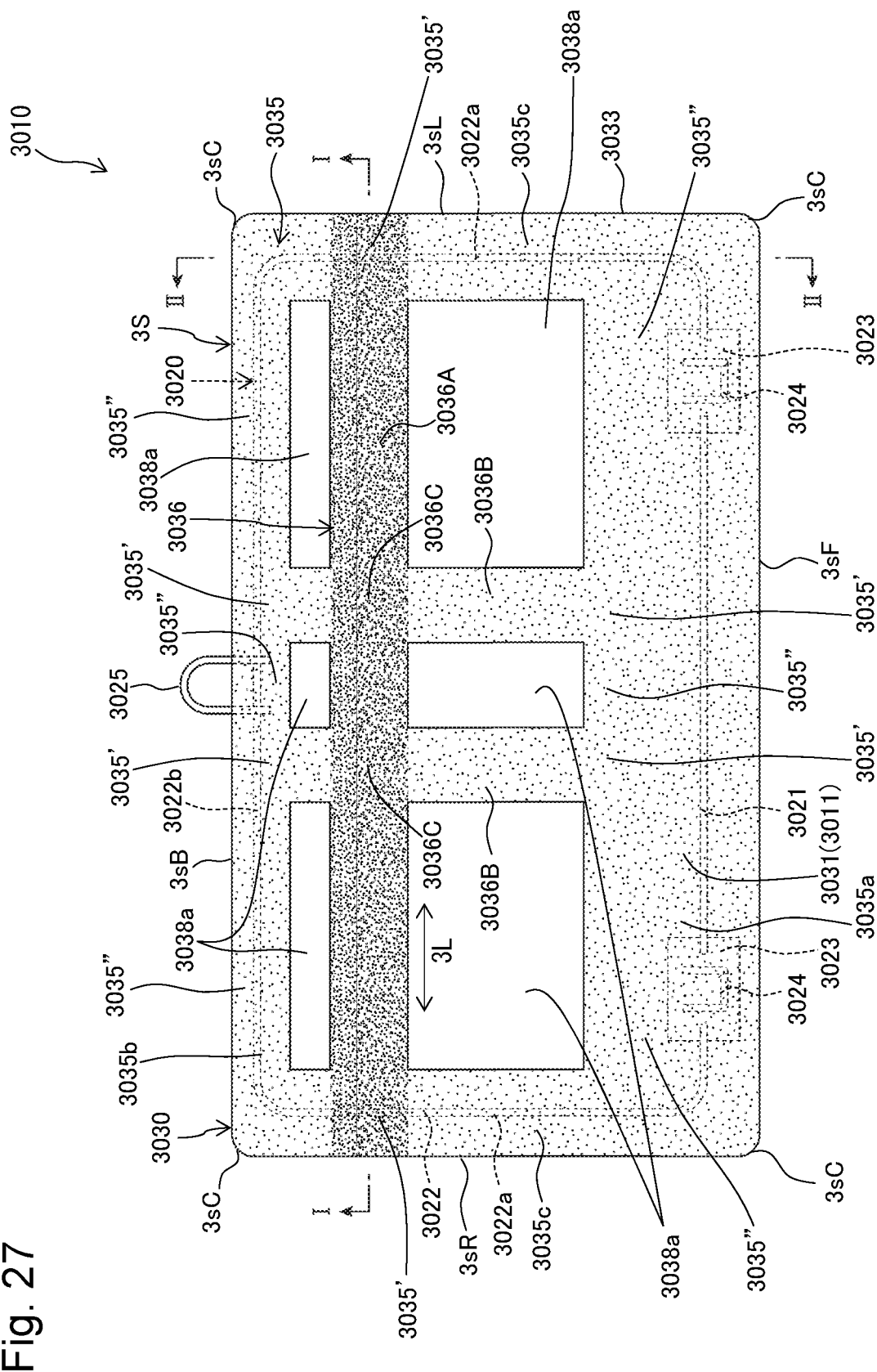
FIG. 27 is a plan view of the vehicle seat member according to the first embodiment of the third invention when seen from an upper surface.

An entire shape of the vehicle seat member 3010 is not particularly limited but as illustrated in FIG. 27, a rectangular shape in plan view is common. In the description, a rectangle refers to a square such as a rectangle, a regular square and the like, and not only the rectangle or the regular square, it may be a shape such as a trapezoid or a parallelogram. In the description, the rectangle also includes a substantial rectangle, and corner parts may be rounded or a part or the whole of a side constituting the rectangle may be a bent side, for example.

In this embodiment, as illustrated in FIG. 27, an outer shape 3S of the vehicle seat member 3010 in plan view is a rectangle having a short side and a long side and has a shape having a short side direction and the longitudinal direction. The outer shape 3S includes a right edge 3sR and a left edge 3sL constituting the short sides, a front edge 3sF and a rear edge 3sB constituting the long sides as four sides, and corners 3sC constituting four corners. The terms front, rear, left, and right in this embodiment refer to directions when an advancing (front) direction of the vehicle is seen from the vehicle in a state where an occupant is seated in the vehicle.

The vehicle seat member 3010 of this embodiment may be made into a vehicle seat 3001 by laminating/disposing an upper seat member 3050 such as a cushion material or the like as appropriate from a side of an upper surface 3011 (upper surface 3031) of the vehicle seat member 3010 (foamed resin molded body 3030). Moreover, the vehicle seat member 3010 may be covered by an appropriate exterior material together with the cushion material or the like so as to have the vehicle seat 3001.

3-2. Frame Member 3020

As illustrated in FIGS. 24 to 27, the frame member 3020 is embedded in order to apply required shape retaining properties and strength to the foamed resin molded body 3030.

The frame member 3020 is usually constituted by a material whose dimensions are not substantially changed as compared to the foamed resin molded body 3030 under a condition that the foamed resin molded body 3030 is molded or a metal material such as steel or aluminum, for example.

The frame member 3020 includes first and second frameworks 3021, 3022 extending inside the foamed resin molded body 3030 and a pair of bases 3023, 3023 linked with end portions of the first and second frameworks 3021, 3022 along the outer shape 3S of the vehicle seat member 301 in plan view. The second framework 3022 has a structure in which a pair of opposed parts 3022a, 3022a continue to each other, and in the description, the second framework 3022 is called a "continuous part" of the frame member 3020 in some cases.

The frame member 3020 further includes a front locking portion 3024 mounted on each of the bases 3023 and a rear locking portion 3025 mounted on the second framework 3022. In this embodiment, as the first and second frameworks 3021, 3022 and the front and rear locking portions 3024, 3025, a wire rod (wire) made of steel or aluminum having a diameter of approximately 3 to 6 mm or the like is used, for example, but it may be a band-shaped or tubular steel material made of metal, for example. Moreover, the frame member 3020 may be manufactured by punch molding and press molding from a steel plate.

The first framework 3021 of the frame member 3020 extends along a part of the center of the front edge 3sF in the vicinity thereof, and the second framework 3022 extends along a part of both sides of the front edge 3sF, the right edge 3sR, the left edge 3sL, the rear edge 3sB, and each of the corners 3sC in their vicinities. The frame member 3020 is embedded in a spot slightly on an inner side of an outer peripheral surface 3033 of the foamed resin molded body 3030 defining the outer shape 3S so as to follow the outer shape 3S of the vehicle seat member 3010.

As described above, the first and second frameworks 3021, 3022 of the frame member 3020 continuously circle around along the outer shape 3S of the vehicle seat member 3010 together with the pair of bases 3023, 3023 connecting them. In this embodiment, parts including the first and second frameworks 3021, 3022 of the frame member 3020 continuously circle around along the outer shape 3S of the vehicle seat member 3010 but the first and second frameworks 3021, 3022 of the frame member 3020 may circle around intermittently along the outer shape 3S of the vehicle seat member 3010, for example. That is, not limited to this form, the framework may be disposed only on a part of a part along the outer shape 3S. For example, it may be so constituted that the second framework 3022 is not linked with the bases 3023, 3023 but extends along the rear edge 3sB. Moreover, the number of the frameworks constituting the frame member 3020 is not limited to two but the number may be one, or three or more.

The front locking portion 3024 and the rear locking portion 3025 constituting the frame member 3020 are parts by which the vehicle seat member 3010 is locked on the vehicle. The front locking portion 3024 is linked with the base 3023 by welding, bonding, or the like, for example, and protrudes downward from the base 3023. A distal end part 3024a of the front locking portion 3024 is curved having a substantial U-shape and is exposed from the foamed resin molded body 3030, and a base end part 3024b is embedded in the foamed resin molded body 3030 together with the base 3023. More specifically, the base end part 3024b is embedded in the foamed resin molded body 3030 by the entire periphery thereof. As a result, even if a force in the pulling-out direction is applied when the vehicle seat member 3010 of this embodiment is locked on the vehicle through the distal end part 3024a of the front locking portion 3024, the front locking portion 3024 is held by the foamed resin molded body 3030, and resistance against the force in the pulling-out direction can be improved.

Moreover, the rear locking portion 3025 protrudes rearward from a center of a part 3022b along the rear edge 3sB in the second framework 3022. The distal end part 3025a of the rear locking portion 3025 is curved having a substantial U-shape and is exposed from the foamed resin molded body 3030, and the base end part 3025*b* is embedded in the foamed resin molded body 3030.

In this embodiment, the distal end parts 3024*a*, 3025*a* of the front locking portion 3024 and the rear locking portion 3025 are formed by bending a wire rod into a substantial U-shape. respectively, but this structure is not limiting, and it only needs to be a structure capable of locking in accordance with the structure on the vehicle side.

In this embodiment, the front locking portion 3024 is linked with both the first and second frameworks 3021, 3022 through the bases 3023. However, the front locking portion 3024 is not limited to this form but may be linked directly with both the first and second frameworks 3021, 3022 not through the base 3023 as the rear locking portion 3025. Moreover, the number of the front locking portions 3024 is not particularly limited but it may be one, or three or more. Either one of the front locking portion 3024 or the rear locking portion 3025 does not have to be present.

3-3. Foamed Resin Molded Body 3030

As illustrated in FIGS. 24 and 25, the foamed resin molded body 3030 is an in-mold foamed resin molded body of a foamed resin. The foamed resin molded body 3030 is a molded body by in-mold foam molding by filling pre-expanded resin particles obtained by pre-expanding expandable resin particles containing a resin and a foaming agent in a molding die and by re-foaming the pre-expanded resin particles in the molding die, and specific aspects of the resin, the foaming agent, the expandable resin particles, and the pre-expanded resin particles are as described above. The foamed resin is not particularly limited, but a foamed thermoplastic resin is usually used, and a foamed polystyrene-based resin, a foamed composite resin containing a polystyrene-based resin and a polyolefin-based resin, a foamed polyolefin-based resin, and the like are suitably used, and the foamed polystyrene-based resin or the foamed composite resin containing the polystyrene-based resin and the polyolefin-based resin is particularly preferable. The foamed polystyrene-based resin or the foamed composite resin containing the polystyrene-based resin and the polyolefin-based resin has small degrees of thermal expansion and thermal contraction and thus, they are particularly preferable from a viewpoint that deformation of the foamed resin molded body and the frame member is suppressed.

In the foamed resin molded body 3030, an upper surface 3031 on which the occupant of the vehicle is seated and a bottom surface 3032 which is on a side fastened to the vehicle are formed. The foamed resin molded body 3030 has the rim part 3035 in which the frame member 3020 is embedded and defining the outer shape 3S of the vehicle seat member 3010 in plan view of the vehicle seat member 3010. The rim part 3035 is constituted by a front part 3035*a* located on a front of a seat, a pair of side parts 3035*c*, 3035*c* formed integrally with the front part 3035*a*, located on right and left sides of the seat, extending rearward from both end portions of the front part 3035*a*, and having vicinities of the rear ends inclined, and a rear part 3035*b* integrally formed with the side parts 3035*c*, 3035*c* and connecting the rear ends of the pair of side parts 3035*c*, 3035*c* in a state where the vehicle seat member 3010 is mounted. When the vehicle seat member 3010 is assembled in the vehicle, the front part 3035*a* in the rim part 3035 supports a thigh part of the occupant, and the rear part 3035*b* supports a buttock part of the occupant.

Figure 26:
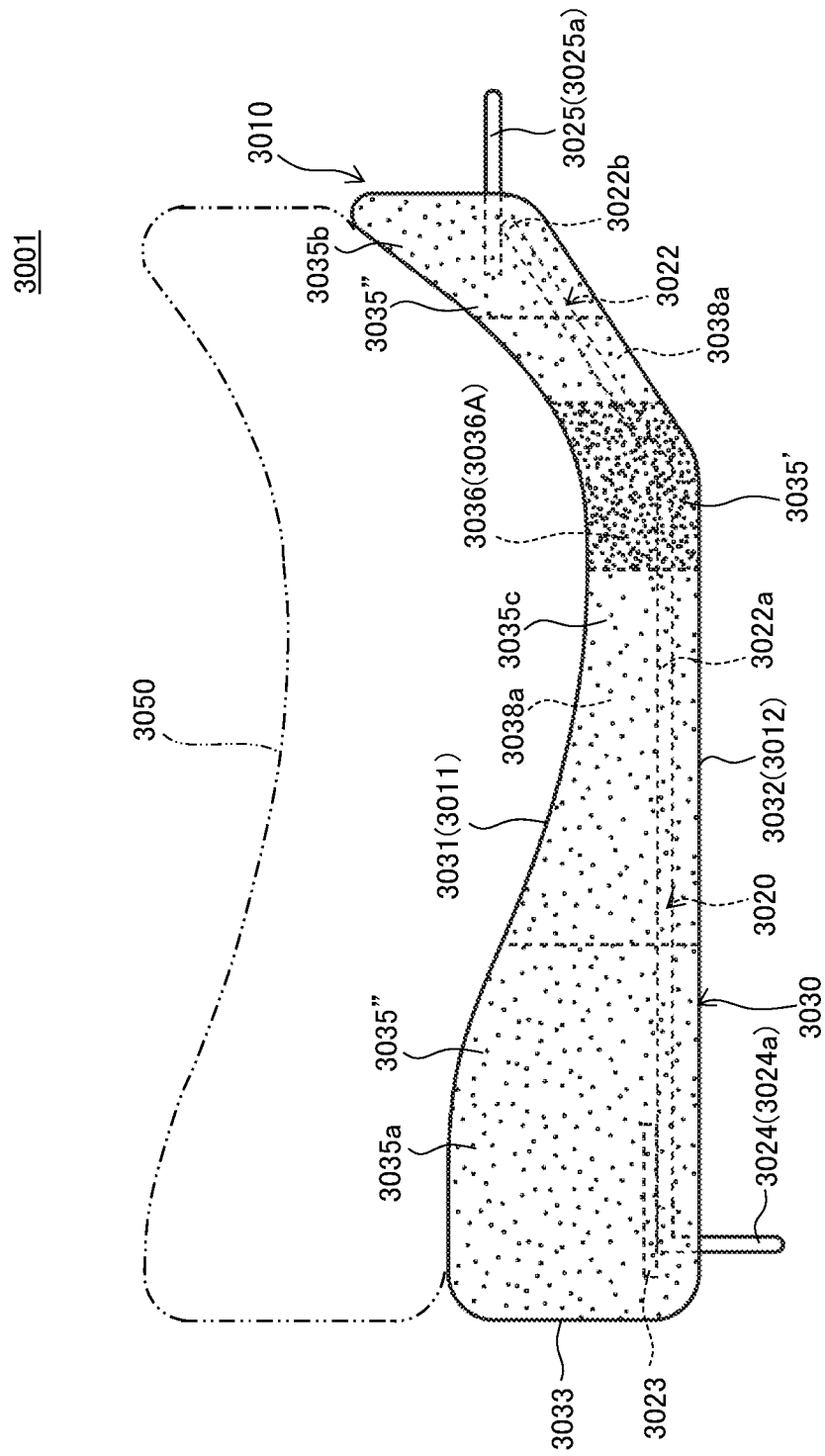
FIG. 26 is a left side view of the vehicle seat member according to the first embodiment of the third invention.

Specifically, as illustrated in FIG. 26, the upper surface 3031 of the foamed resin molded body 3030 is formed so as to hold the thigh part and the buttock part of the occupant through the upper seat member 3050 by being a curved surface dented downward. However, the shape and the thickness of the foamed resin molded body 3030 can be changed in various ways in accordance with a shape of the vehicle body side on which the vehicle seat member 3010 is mounted and is not limited to the illustrated embodiment. The upper surface 3031 of the foamed resin molded body 3030 may be substantially a flat shape, for example.

The foamed resin molded body 3030 includes an extension 3036 extending inward from the rim part 3035 so as to bridge the rim part 3035 inside of the rim part 3035. In the third invention, a part extending along a predetermined direction in the extension is called an "extension part". The extension may be made only of one extension part or may be formed of a plurality of extension parts. In this embodiment, the extension 3036 is constituted by a first extension part 3036A extending in the longitudinal direction and a second extension part 3036B extending in the transverse direction. The first extension part 3036A and the second extension part 3036B are linked by a linking portion 3036C. In this embodiment, the extension 3036 is constituted by the plurality of extension parts 3036A, 3036B, but this is not limiting, and it may be constituted only by one extension part. For example, the extension 3036 may be constituted only by the first extension part 3036A or may be constituted only by the second extension part 3036B. When the extension 3036 includes a plurality of extension parts extending across the rim part 3035, each of the plurality of extension parts may be provided along a predetermined direction.

In the rim part 3035, a part connected to the extension 3036 is made a connecting part 3035' and a part other than the connecting part 3035' is made a not-connecting part 3035". Specifically, the connecting part 3035' of the rim part 3035 is connected to an end of each of the extension parts 3036A, 3036B of the extension 3036 and supports them.

In this embodiment, the frame member 3020 has the second framework 3022 (continuous part) in which the opposed parts 3022*a*. 3022*a* opposed to each other across a space inside the rim part 3035 continue to each other. The first extension part 3036A in the extension 3036 is formed so as to extend between the opposed parts 3022*a*. 3022*a*.

The extension 3036 in the foamed resin molded body 3030 is a part for reinforcing and holding the shape of the vehicle seat member 3010. In the foamed resin molded body 3030, by forming the extension 3036 in a space inside the rim part 3035, a hollow portion 3038*a* is formed between the rim part 3035 and the extension 3036. The hollow portion 3038*a* is provided for the purpose of reducing the weight of the foamed resin molded body 3030 or of accommodating the other members (a cushion material which is elastically deformed more easily than the foamed resin molded body 3030, a member of a console box, and the like, for example) constituting the vehicle seat. In the illustrated embodiment, six pieces of the hollow portions 3038*a* are formed in the foamed resin molded body 3030, but the number of the hollow portions 3038*a* is not limited.

The extension 3036 of the foamed resin molded body 3030 contains the foamed resin with a maximum point stress by bending larger than that of the foamed resin contained in the not-connecting part 3035" of the rim part 3035. In FIGS. 25 to 27, the foamed resin with the larger maximum point stress by bending is indicated in a dark color, and the foamed resin with the smaller maximum point stress by bending is indicated in a pale color. More specifically, an extending direction 3L in which the first extension part 3036A in the extension 3036 extends is matched with the longitudinal direction of the vehicle seat member 3010, and the entire first extension part 3036A contains the foamed resin with the maximum point stress by bending larger than that of the foamed resin forming the not-connecting part 3035" of the rim part 3035. As in the illustrated embodiment, if a plurality of extension parts is present in the extension 3036, at least one extension part only needs to contain the foamed resin with the maximum point stress by bending larger than that of the foamed resin contained in the not-connecting part 3035" of the rim part 3035, and the entirety of the at least one extension part is preferably formed by the foamed resin with the maximum point stress by bending larger than that of the foamed resin contained in the not-connecting part 3035" of the rim part 3035.

The larger the maximum point stress by bending of the foamed resin contained in each part of the foamed resin molded body 3030, the higher the rigidity of the each part of the foamed resin molded body 3030 is, if the shapes and the dimensions are the same. In this embodiment, by molding the foamed resin molded body 3030 so that the extension 3036 contains the foamed resin with the maximum point stress by bending larger than that of the foamed resin contained in the not-connecting part 3035" of the rim part 3035, the rigidity of the extension 3036 can be selectively improved.

In the third invention, the extension 3036 "contains" the foamed resin with the maximum point stress by bending larger (hereinafter, referred to as a "predetermined foamed resin" in some cases) than that of the foamed resin contained in the not-connecting part 3035" of the rim part 3035 only needs that the extension 3036 contains the predetermined foamed resin to such a degree that sufficient rigidity is given to at least one extension part, and the extension 3036 may further contain other foamed resins other than the predetermined foamed resin. At least one extension part in the extension 3036 preferably contains the predetermined foamed resin and more preferably, the at least one extension part is formed by the predetermined foamed resin.

In the third invention, the maximum point stress by bending (kPa) of the foamed resin is measured in accordance with a bending test provided for in ASTM D790 procedure A.
Conditions of the bending test are specifically as follows:
Testing instrument: TENSILON Universal Material Testing Instrument UCT-10T (ORIENTEC CORPORATION)
Test piece: 79.2 W×380 L×19.8 T thickness (mm) (without skin)
Number of test: 5
Test speed: 8.4 mm/min
Distance between support points: 316.7 (mm)
Maximum deflection: 64 mm
Distal-end jig: cradle wedge . . . 5R, pressurized wedge . . . 5R
Test piece conditioning/test environment: temperature: 23±+2C, Relative humidity (RH): 50±10%, 24 hours or more In the third invention, the maximum point stress by bending measured under the aforementioned conditions of the foamed resin contained in the not-connecting part of the rim part in the foamed resin molded body is not particularly limited but it is within a range from 10 to 600 kPa or typically within a range from 100 to 500 kPa, for example. On the other hand, the maximum point stress by bending measured under the aforementioned conditions of the foamed resin contained in at least a part of the extension in the foamed resin molded body is higher than that of the foamed resin contained in the not-connecting part of the rim part and 1.2 to 5 times or typically 1.5 to 4 times of the maximum point stress by bending of the foamed resin contained in the not-connecting part of the rim part, for example. An absolute value of the maximum point stress by bending measured under the aforementioned conditions of the foamed resin contained in at least a part of the extension in the foamed resin molded body is 150 to 2,000 kPa or typically 250 to 1,200) kPa, for example. In the foamed resin molded body 3030, the resin in the foamed resin constituting each part can be selected from the aforementioned types of resin and does not have to be formed by the resin of the same base. However, if the entire foamed resin molded body 3030 is constituted by the foamed body of the resin of the same base, each part of the foamed resin molded body 3030 is firmly coupled, which is preferable. If the entire foamed resin molded body 3030 is constituted by the foamed body of the same resin except that the maximum point stress by bending is different, each part of the foamed resin molded body 3030 is coupled further firmly, which is preferable.

Control of the maximum point stress by bending of the foamed resin is executed easily and preferably by controlling an expansion ratio of the foamed resin. With regard to the foamed resin constituted by the same resin material, the smaller the expansion ratio is, the larger the maximum point stress by bending is. The smaller the expansion ratio is, the larger the specific weight of the foamed resin is. Thus, in the third invention, in the aspect in which the maximum point stress by bending is increased by making the expansion ratio of the foamed resin smaller, by molding the foamed resin molded body so that the extension contains the foamed resin with a smaller expansion ratio and a larger maximum point stress by bending rather than the foamed resin contained by the not-connecting part of the rim part, an increase in the weight of the foamed resin molded body can be suppressed while rigidity of the extension is selectively improved.

In the aspect in which the maximum point stress by bending of the foamed resin is controlled by controlling the expansion ratio, a specific range of the expansion ratio is not particularly limited, but the not-connecting part 3035" of the rim part 3035 contains the foamed resin with the expansion ratio of 21 to 60 times or 11 to 60 times, for example, and the extension 3036 contains the foamed resin with the expansion ratio of 2.5 to 20 times or 2.5 to 10 times, for example. The foamed resin molded body 3030 is preferably molded so that these ranges of the expansion ratio are satisfied, and the extension 3036 contains the foamed resin with the smaller expansion ratio than the expansion ratio of the foamed resin contained in the not-connecting part 3035" of the rim part 3035.

Here, the expansion ratio of the foamed resin contained in each part of the foamed resin molded body 3030 can be acquired by the following procedure.

A weight (c) and a volume (d) of a test piece (e.g.: a cuboid piece with 50 mm×100 mm×10 mm) cut out of each part (parts whose expansion ratios are to be measured such as the extension parts 3036A, 3036B of the extension 3036, the not-connecting part 3035" of the rim part 3035, the connecting part 3035' of the rim part 3035, and the like) of the foamed resin molded body 3030 (those dried at 40° C. for 20 hours or more after molding) are measured with effective figures of three digits or more, respectively, and density (g/cm$^3$) of the foamed molded body is acquired by an expression (c)/(d). An inverse number of the density, that is, the expression (d)/(c) is the expansion ratio.

Moreover, in addition to the extension 3036, the connecting part 3035' of the rim part 3035 connected to the extension 3036 preferably contains the foamed resin with the maximum point stress by bending larger than that of the foamed resin contained in the not-connecting part 3035" of the rim part 3035. If a plurality of the extension parts 3036A, 3036B are present in the extension 3036, at least one of the extension parts 3036A, 3036B (3036A, for example) and the connecting part 3035' of the rim part 3035 connected to the at least one extension part preferably contain the foamed resin with the maximum point stress by bending larger than that of the foamed resin contained in the not-connecting part 3035" of the rim part 3035.

Here, while the first and second frameworks 3021, 3022 of the frame member 3020 are embedded in the rim part 3035 in the foamed resin molded body 3030, if the extension 3036 is formed by the foamed resin with the same maximum point stress by bending as that of the not-connecting part 3035" of the rim part 3035 and if the extension 3036 and/or the rim part 3035 is not reinforced by another means, when a heat is input into the vehicle seat member 3010 (or when the input heat is released), apparent thermal expansion amounts (thermal contraction amounts) are different between the rim part 3035 in the state where the first and second frameworks 3021, 3022 of the frame member 3020 are embedded in the foamed resin molded body 3030 and the extension 3036 extending inside the rim part 3035 where the frame member 3020 is not present. As a result, the compression stress and the tensile stress non-uniformly act as the thermal stress on the extension 3036 surrounded by the rim part 3035, and the center of the extension 3036 is deformed easily so as to be curved upward, for example. Particularly, such phenomenon is remarkable in the first extension part 3036A formed along the longitudinal direction in the extension 3036.

In this embodiment, by forming the first extension part 3036A extending along the longitudinal direction in the extension 3036 extending inside the rim part 3035 and the connecting part 3035' connected to the first extension part 3036A in the rim part 3035 by the foamed resin with the maximum point stress by bending larger than that of the foamed resin contained in the not-connecting part 3035" of the rim part 3035, the extension 3036 is reinforced. As a result, even if the extension 3036 is thermally expanded or thermally contracted, deformation of the extension 3036 by the thermal stress can be suppressed, and dimensional accuracy of the vehicle seat member 3010 can be ensured. According to this embodiment, since the first extension part 3036A of the extension 3036 and the connecting part 3035' connected to the first extension part 3036A in the rim part 3035 are selectively reinforced, and the not-connecting part 3035" of the rim part 3035 can be constituted by an ordinary foamed resin, margins of a weight increase and a cost increase in the entire foamed resin molded body 3030 are small. Moreover, according to this embodiment, since reinforcement such that the first extension part 3036A of the extension 3036 is formed thick is not needed, it is less likely that design or application is limited.

Particularly in this embodiment, the second framework 3022 having a structure in which the pair of opposed parts 3022a, 3022a opposed to each other continues to each other is embedded in the rim part 3035, and the first extension part 3036A of the extension 3036 is formed so as to extend between the opposed parts 3022a, 3022a. In this constitution, since the both sides of the first extension part 3036A of the extension 3036 are restrained, if the first extension part 3036A is formed by the foamed resin with the same maximum point stress by bending as that of the not-connecting part 3035" of the rim part 3035 and the extension 3036 and/or the rim part 3035 is not reinforced by another means, the extension 3036 including the first extension part 3036A is deformed particularly easily by the thermal expansion and thermal contraction. In this embodiment, by molding the first extension part 3036A and the connecting part 3035' connected to the first extension part 3036A in the rim part 3035 so as to contain the foamed resin with the maximum point stress by bending larger than that of the foamed resin contained in the not-connecting part 3035" of the rim part 3035, the deformation of the extension 3036 including the first extension part 3036A can be further effectively suppressed.

Moreover, as in this embodiment, if the parts including the first framework 3021 and the second framework 3022 of the frame member 3020 continuously circle around along the outer shape 3S of the vehicle seat member 3010, deformation by the thermal stress is suppressed over the entire circumference of the rim part 3035. Thus, if the extension 3036 is formed by the foamed resin with the same maximum point stress by bending as that of the not-connecting part 3035" of the rim part 3035 and the extension 3036 and/or the rim part 3035 is not reinforced by another means, the extension 3036 formed inside the rim part 3035 is deformed further easily. Even in such a case, in this embodiment, by molding the extension 3036 so as to contain the foamed resin with the maximum point stress by bending larger than that of the foamed resin contained in the not-connecting part 3035" of the rim part 3035, the deformation of the extension 3036 can be further effectively suppressed.

3-4. Method of Manufacturing Vehicle Seat Member 3010

Figure 28:
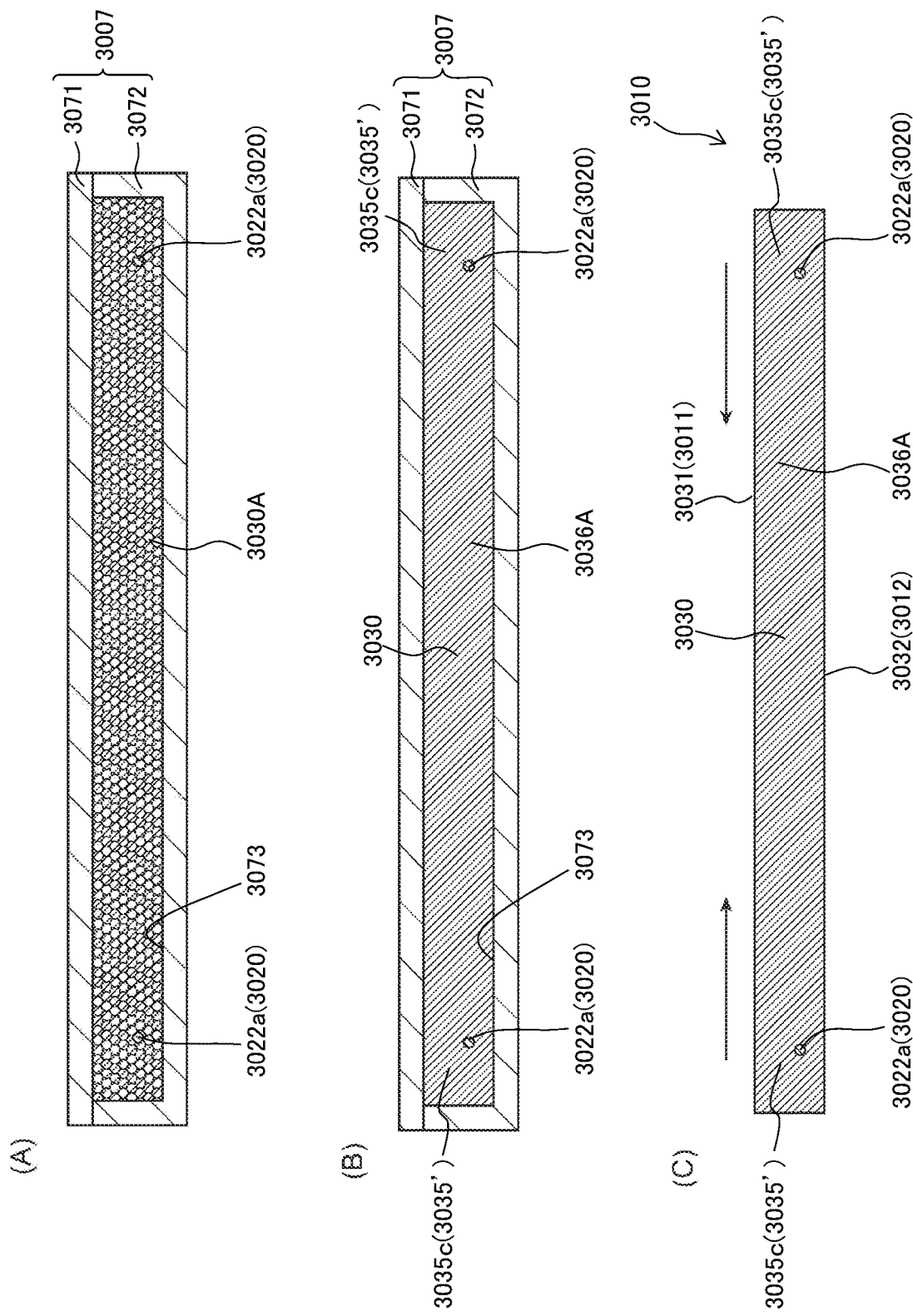
FIG. 28 are schematic sectional views at a position corresponding to a I-I line arrow-view sectional view illustrated in FIG. 27 for explaining a method of manufacturing the vehicle seat member according to the first embodiment of the third invention.
Figure 29:
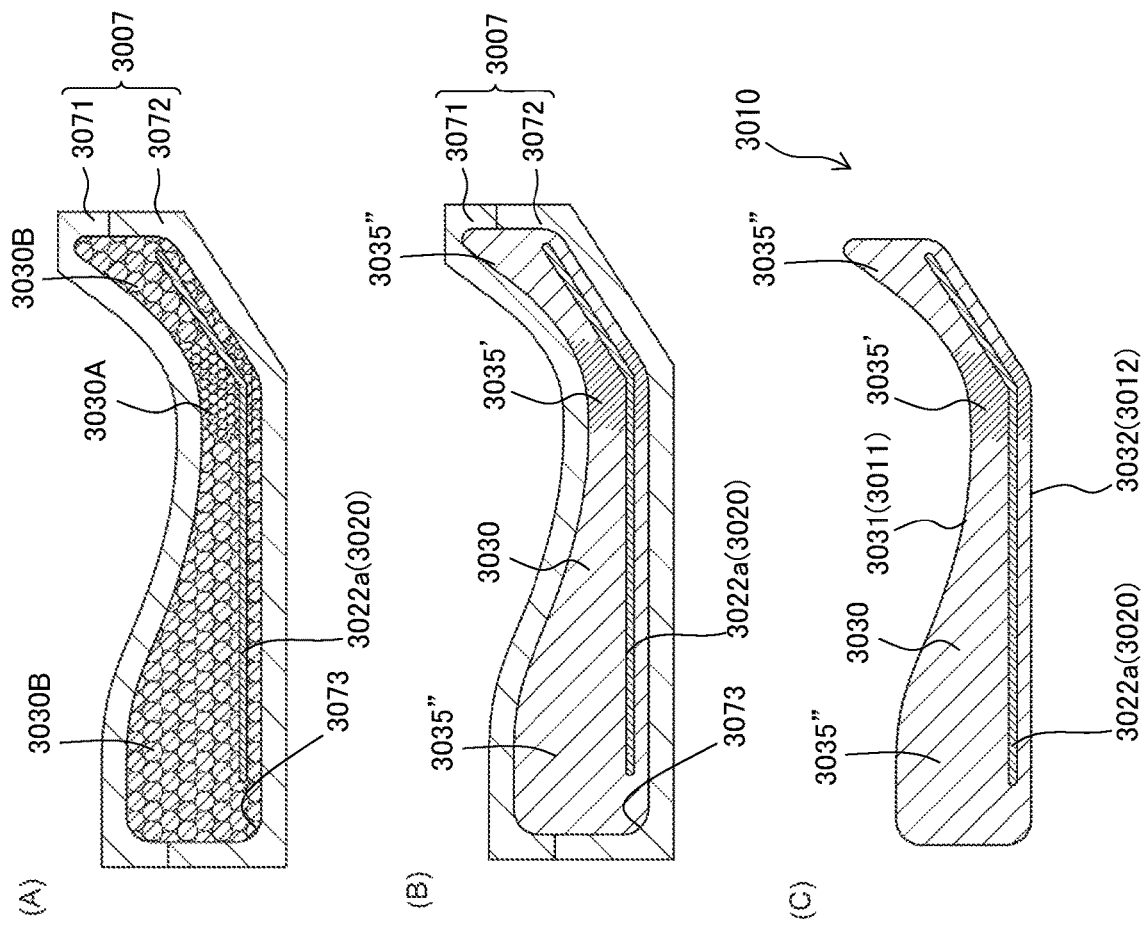
FIG. 29 are schematic sectional views at a position corresponding to a II-II line arrow-view sectional view illustrated in FIG. 27 for explaining the method of manufacturing the vehicle seat member according to the first embodiment of the third invention.

The method of manufacturing the vehicle seat member 3010 will be described below by referring to FIGS. 28 and 29. In FIG. 28, each step of the method of manufacturing will be described by a schematic sectional view at a position corresponding to a I-I line arrow-view sectional view illustrated in FIG. 27. In FIG. 29, each step of the method of manufacturing will be described by a schematic sectional view at a position corresponding to a II-II line arrow-view sectional view illustrated in FIG. 27.

An embodiment described below is an example in which the expansion ratio of a foamed resin constituting the first extension part 3036A in the extension 3036 of the foamed resin molded body 3030 and the part connected to the first extension part 3036A in the connecting part 3035' of the rim part 3035 is made smaller than that of the foamed resin constituting the not-connecting part 3035" of the rim part 3035 so as to increase the maximum point stress by bending.

An outline of the method of manufacturing the vehicle seat member 3010 of this embodiment is as follows. As illustrated in FIG. 28(A) and FIG. 29(A), the frame member 3020 is disposed so as to be located in a cavity 3073 of a molding die 3007 and then, pre-expanded resin particles 3030A. 3030B obtained by pre-expanding the expandable resin particles containing the resin and the foaming agent are filled therein. Subsequently, as illustrated in FIG. 28(B) and FIG. 29(B), the pre-expanded resin particles 3030A are expanded by supplying steam into the molding die 3007 so as to mold the foamed resin molded body 3030. After that, as illustrated in FIG. 28(C) and FIG. 29(C), the foamed resin molded body 3030 is removed from the molding die 3007 together with the frame member 3020 and cooled by heat release or the like.

The foamed resin molded body 3030 usually has a property of slightly contracting when the remaining heat during the foam molding is released after the molding. On the other hand, in the frame member 3020 constituted by a material such as metal, the dimensions are not substantially changed as compared to the foamed resin molded body 3030 before and after the molding of the foamed resin molded body 3030. Therefore, if the extension 3036 is formed by the foamed resin with the same maximum point stress by bending as that of the not-connecting part 3035" of the rim part 3035 and the extension 3036 and/or the rim part 3035 is not reinforced by another means, as illustrated in FIG. 30(A), the foamed resin molded body 3030 is molded by the molding die 3007 made of a first die 3071 and a second die 3072, and as illustrated in FIG. 30(B), for a period of time immediately after the molding until the foamed resin molded body 3030 is removed from the molding die 3007 and the foamed resin molded body 3030 releases heat, the foamed resin molded body 3030 thermally contracts. At this time, since the both sides of the extension 3036 where the frame member 3020 is not present is restrained by the rim part 3035 where the second framework 3022 of the frame member 3020 is present, the compression stress and the tensile stress non-uniformly act as the thermal stress on the extension 3036, and the extension 3036 is deformed easily so as to be curved upward from the center.

In view of these points, in this embodiment, the vehicle seat member 3010 is manufactured as follows. First, the frame member 3020 is prepared. The structure and the material of the frame member 3020 are as described above. Subsequently, in plan view of the vehicle seat member 3010, the frame member 3020 is disposed in the molding die 3007 so that the first framework 3021 and the second framework 3022 of the frame member 3020 are disposed along the outer shape 3S of the vehicle seat member 3010 (placing step).

As the molding die 3007, a closed molding die having a large number of pores can be used.

As illustrated in FIG. 28(A) and FIG. 29(A), the molding die 3007 is made of the first die 3071 and the second die 3072 and is constituted such that a cavity 3073 according to the foamed resin molded body 3030 is formed in the molding die 3007 when the first die 3071 and the second die 3072 are clamped.

Subsequently, as illustrated in FIG. 28(A) and FIG. 29(A), the first die 3071 and the second die 3072 in which the frame member 3020 is disposed therein is temporarily clamped (cracking) and then, the pre-expanded resin particles 3030A, 3030B are filled and clamped.

At this time, at a position in the cavity 3073 corresponding to a part requiring a foamed resin with a large maximum point stress by bending in the foamed resin molded body 3030 to be manufactured, the pre-expanded resin particles 3030A with a small bulk expansion ratio are filled, while at a position in the cavity 3073 corresponding to a part other than the part requiring the foamed resin with the large maximum point stress by bending in the foamed resin molded body 3030 to be manufactured, the pre-expanded resin particles 3030B with a large bulk expansion ratio are filled. Specifically, in this embodiment, at the positions in the cavity 3073 corresponding to the first extension part 3036A in the extension 3036 and the part connected to the first extension part 3036A in the connecting part 3035' of the rim part 3035, the pre-expanded resin particles 3030A are filled, while at the positions in the cavity 3073 corresponding to the parts of the extension 3036 and the rim part 3035 other than the first extension part 3036A of the extension 3036 and the part connected to the first extension part 3036A in the connecting part 3035' of the rim part 3035, the pre-expanded resin particles 3030B with the bulk expansion ratio larger than that of the pre-expanded resin particles 3030A are filled.

Subsequently, as illustrated in FIG. 28(B), the pre-expanded resin particles 3030A, 3030B are secondarily foamed by heating the inside of the cavity 3073 of the molding die 3007 by steam, gaps among the pre-expanded resin particles 3030A, 3030B are filled, and the pre-expanded resin particles 3030A. 3030B are integrated by fusing them to each other so that the foamed resin molded body 3030 is molded (molding step).

A fusion rate among the foamed particles derived from the pre-expanded resin particles of the foamed resin molded body 3030 is not particularly limited but it is 50 to 100%, more preferably 70 to 100%, and further preferably 90 to 100%.

The fusion rate, here, expresses a rate in percentage of the number of foamed particles fractured inside the particles in the total number of foamed particles derived from the pre-expanded resin particles appearing on a section when the foamed resin molded body 3030 is bent and fractured. Measurement of the fusion rate can be specifically performed by the following procedure. A cut line with a depth of approximately 5 mm is made by a cutter knife along the center of the foamed resin molded body. After that, the foamed resin molded body is manually divided into two parts along this cut line. With regard to the foamed particles on the fractured surface, the number (a) of the particles fractured in the particles within a predetermined range from 100 to 150 particles and the number (b) of the particles fractured on an interface between the particles are counted. A value obtained by substituting the results in an expression $[(a)/((a)+(b))] \times 100$ is made a fusion rate (%).

The fusion rate can be controlled by controlling an amount of heat when heating/foaming, for example.

As a result, the foamed resin molded body 3030 containing the rim part 3035 and the extension 3036 can be molded in the molding die 3007. The molded extension 3036 contains, in the first extension part 3036A, the foamed resin with the expansion ratio smaller and the maximum point stress by bending larger than those of the foamed resin contained in the not-connecting part 3035" of the rim part 3035. Moreover, in this embodiment, the part connected to the first extension part 3036A in the connecting part 3035' of the rim part 3035 also contains the foamed resin with the expansion ratio smaller and the maximum point stress by bending larger than those of the foamed resin contained in the not-connecting part 3035" of the rim part 3035. The molded rim part 3035 has the first framework 3021 and the second framework 3022 in the frame member 3020 embedded and forms the outer shape 3S of the vehicle seat member 3010. In the molded extension 3036, the first extension part 3036A extends between the pair of side parts 3035c, 3035c of the rim part 3035, and the second extension parts 3036B, 3036B extend between the front part 3035a and the rear part 3035b of the rim part 3035.

Subsequently, the foamed resin molded body 3030 is removed from the molding die 3007, and the vehicle seat member 3010 of this embodiment in which the foamed resin molded body 3030 and the frame member 3020 are integrated can be obtained. Here, during and after the removal of the foamed resin molded body 3030 from the molding die 3007, remaining heat during the molding is released, and the foamed resin molded body 3030 contracts.

In the embodiment, since the first extension part 3036A is constituted to contain the foamed resin with the maximum point stress by bending larger than that of the foamed resin contained in the not-connecting part 3035" of the rim part 3035, rigidity of the first extension part 3036A is improved. As a result, the deformation of the extension 3036 including the first extension part 3036A by the thermal stress can be suppressed. As a result, the vehicle seat member 3010 with high dimensional accuracy can be manufactured. According to this embodiment, since the not-connecting part 3035" of the rim part 3035 can be constituted by the foamed resin with a large expansion ratio, margins of a weight increase and a cost increase in the entire foamed resin molded body 3030 are small. Moreover, according to this embodiment, since reinforcement such that the first extension part 3036A of the extension 3036 is formed thick is not needed, it is less likely that design or application is limited.

Figure 30:
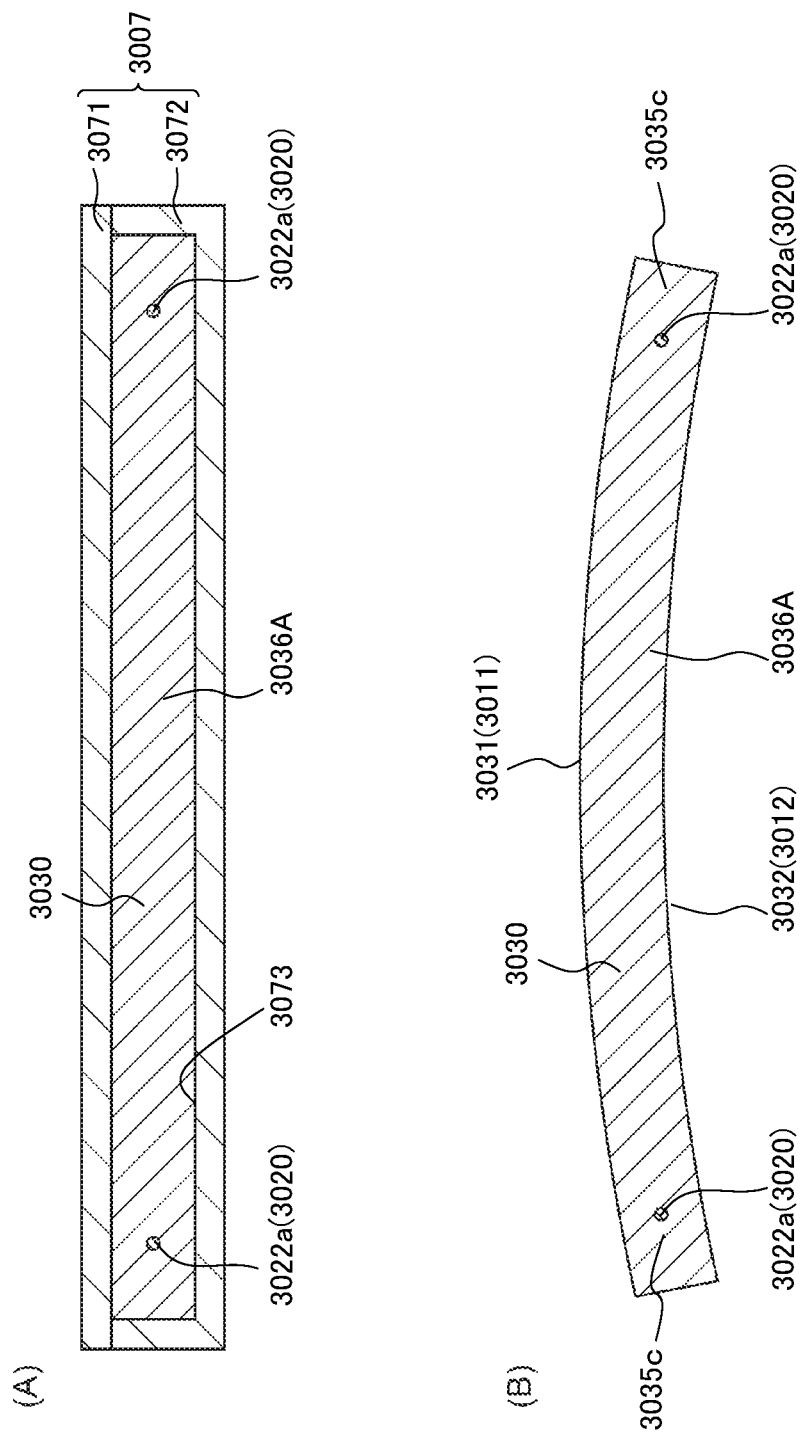
FIG. 30 are schematic sectional views for explaining a method of manufacturing a vehicle seat member which is a comparative example of the third invention.

In this embodiment, the frame member 3020 has the second framework 3022, and the second framework 3022 has the continuous part in which the opposed parts 3022a, 3022a opposed to each other across the space inside the rim part 3035 continue to each other. When the foamed resin molded body 3030 is molded, the extension 3036 is molded so as to have the first extension part 3036A extending between the opposed parts 3022a, 3022a. Therefore, since the both sides of the first extension part 3036A of the extension 3036 is restrained by the side parts 3035c, 3035c of the rim part 3035 in which the opposed parts 3022a, 3022a of the second framework 3022 of the frame member 3020 are embedded, as illustrated in FIG. 30, if the first extension part 3036A is formed by the foamed resin with the same maximum point stress by bending as that of the not-connecting part 3035" of the rim part 3035 and the extension 3036 and/or the rim part 3035 is not reinforced by another means, the extension 3036 including the first extension part 3036A is deformed easily by the thermal contraction. Particularly since the parts including the first framework 3021 and the second framework 3022 of the frame member 3020 are made to continuously circle around along the outer shape 3S of the vehicle seat member 3010, such deformation occurs easily. In this embodiment, by molding the foamed resin molded body 3030 so that the first extension part 3036A which is one of extension parts of the extension 3036 contains the foamed resin with the maximum point stress by bending larger than that of the foamed resin contained in the not-connecting part 3035" of the rim part 3035 during the molding step, the first extension part 3036A and the extension 3036 including that can be reinforced, and the aforementioned deformation can be suppressed.

Third Invention/Second Embodiment

Figure 31:
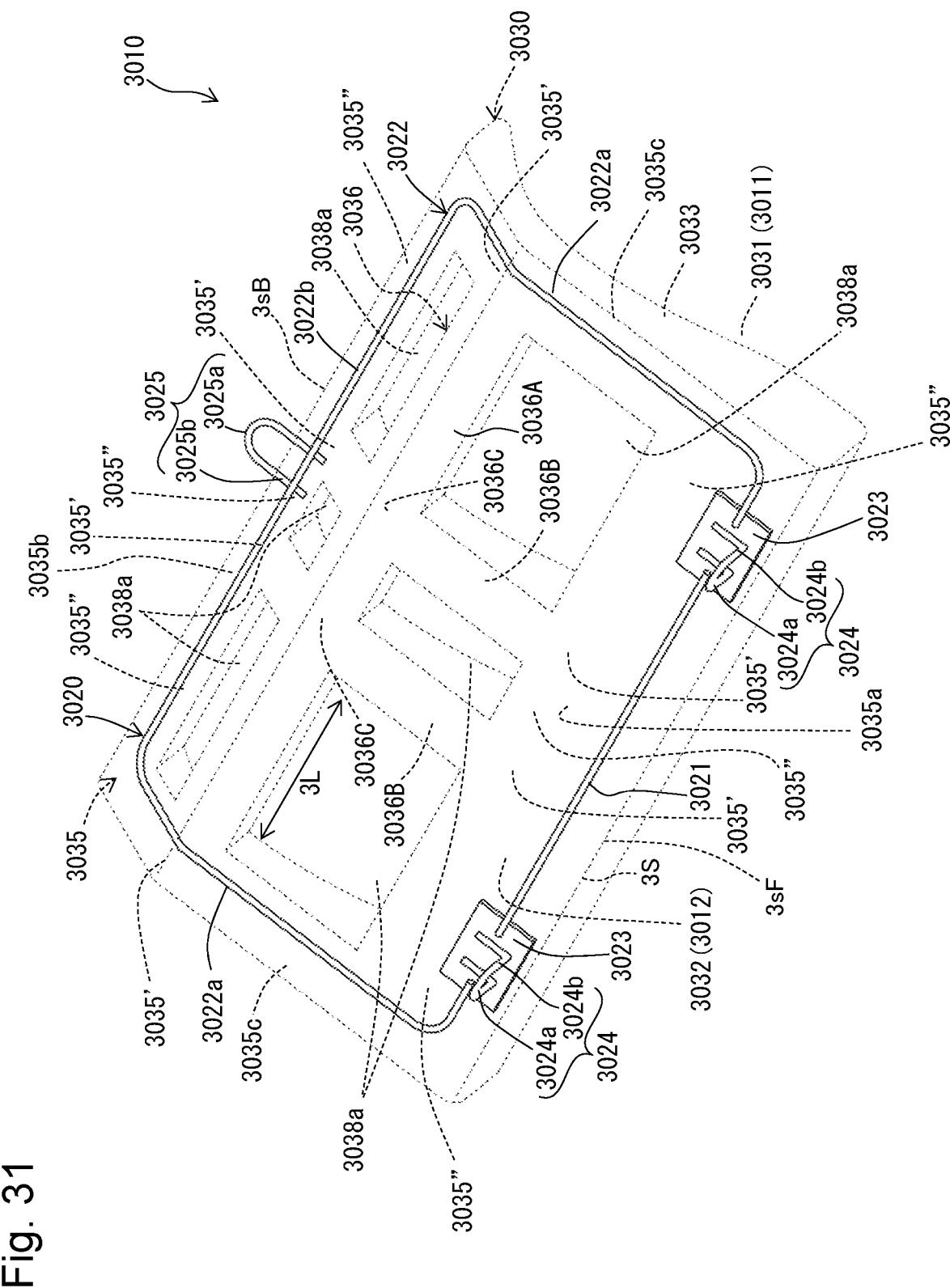
FIG. 31 is a schematic perspective view for explaining a structure of a frame member when a vehicle seat member according to a second embodiment of the third invention is seen from below.
Figure 32:
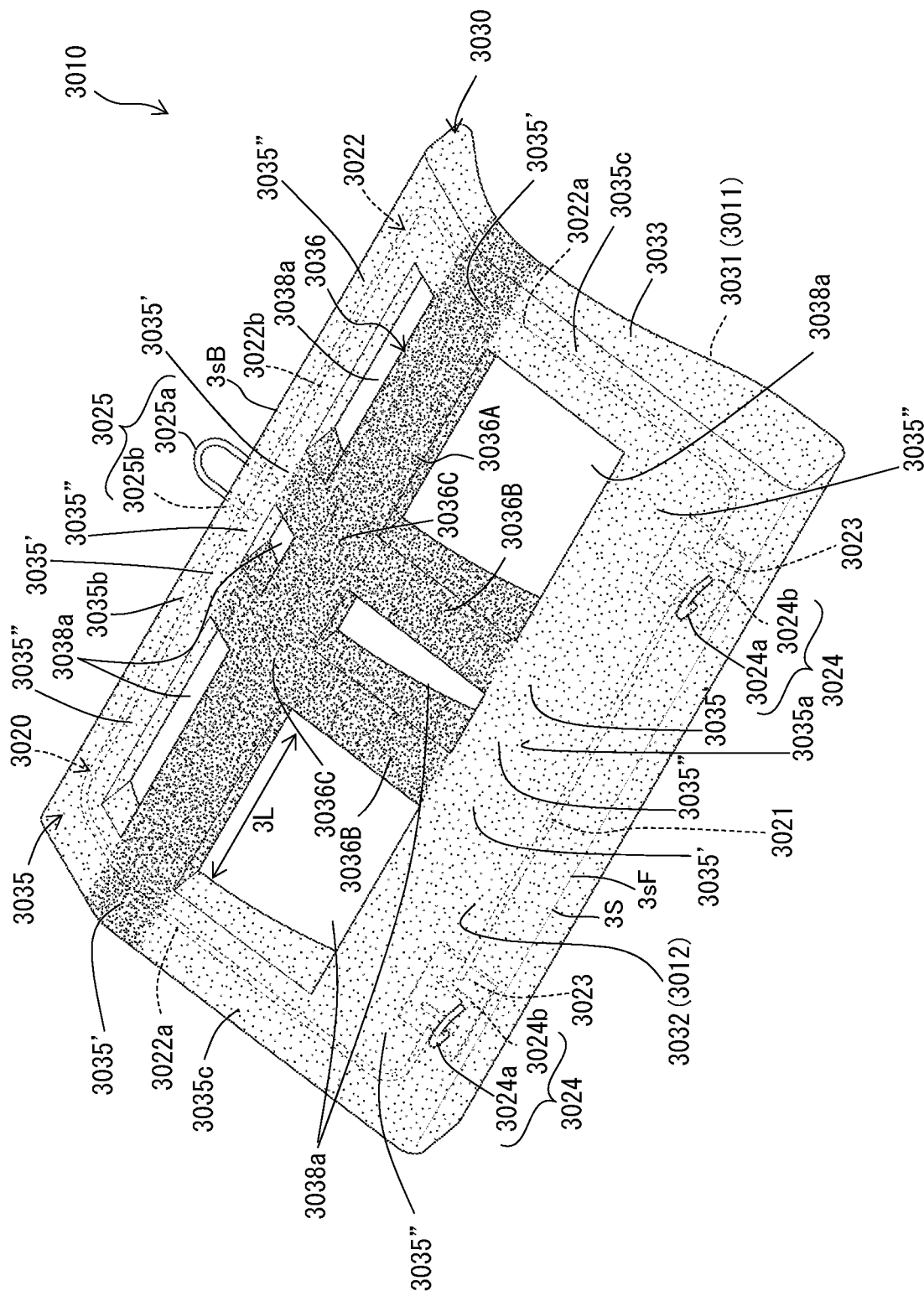
FIG. 32 is a schematic perspective view for explaining a structure of a foamed resin molded body when the vehicle seat member according to the second embodiment of the third invention is seen from below.

The vehicle seat member 3010 according to a second embodiment of the third invention and the method of manufacturing the same will be described below by referring to FIGS. 31 and 32. A point that the vehicle seat member 3010 according to the second embodiment is different from the vehicle seat member 3010 according to the first embodiment is that, in the extension 3036, in addition to the first extension part 3036A extending in the longitudinal direction of the outer shape 3S of the vehicle seat member 3010, the second extension parts 3036B, 3036B extending in the transverse direction contain the foamed resin with the maximum point stress by bending larger than that of the foamed resin contained in the not-connecting part 3035" of the rim part 3035. The same constitutions as those in the first embodiment are given the same reference numerals and detailed description will be omitted.

In this embodiment, the extension 3036 is reinforced by molding the foamed resin molded body 3030 such that the first extension part 3036A and the second extension parts 3036B, 3036B in the extension 3036 contain the foamed resin with the maximum point stress by bending larger than that of the foamed resin contained in the not-connecting part 3035" of the rim part 3035, respectively. As a result, even if the extension 3036 is thermally expanded or thermally contracted, deformation of the extension 3036 by the thermal stress can be suppressed, and dimensional accuracy of the vehicle seat member 3010 can be ensured.

In this embodiment, the deformation of the extension 3036 can be suppressed more efficiently by molding the foamed resin molded body 3030 such that the part connected to the first extension part 3036A in the connecting part 3035' of the rim part 3035 further contains the foamed resin with the maximum point stress by bending larger than that of the foamed resin contained in the not-connecting part 3035" of the rim part 3035.

In this embodiment, the frame member 3020 has a structure in which the first framework 3021 and the part 3022b along the rear edge 3sB in the second framework 3022 opposed with the first framework 3021 continue to each other. The first framework 3021 and the part 3022b along the rear edge 3sB in the second framework 3022 are embedded in the rim part 3035, and the second extension parts 3036B, 3036B of the extension 3036 are formed so as to extend between the first framework 3021 and the part 3022b along the rear edge 3sB in the second framework 3022, respectively. In this constitution, since both sides of the second extension parts 3036B, 3036B of the extension 3036 are restrained, respectively, if the second extension parts 3036B, 3036B of the extension 3036 are formed by the foamed resin with the same maximum point stress by bending as that of the not-connecting part 3035" of the rim part 3035 and the extension 3036 and/or the rim part 3035 is not reinforced by another means, the extension 3036 including the second extension parts 3036B. 3036B is deformed particularly easily by the thermal expansion and thermal contraction. In this embodiment, the deformation of the extension 3036 including the second extension parts 3036B, 3036B can be suppressed more effectively by molding the second extension parts 3036B, 3036B so as to contain the foamed resin with the maximum point stress by bending larger than that of the foamed resin contained in the not-connecting part 3035" of the rim part 3035.

Manufacture of the vehicle seat member 3010 according to the second embodiment can be performed by the procedure similar to the first embodiment. The second embodiment is also an example in which the maximum point stress by bending is increased by making the expansion ratio of the foamed resin constituting the extension 3036 of the foamed resin molded body 3030 and the part connected to the first extension part 3036A in the connecting part 3035' of the rim part 3035 smaller than the foamed resin constituting the not-connecting part 3035" of the rim part 3035.

First, in plan view of the vehicle seat member 3010, the frame member 3020 is disposed in the molding die so that the first framework 3021 and the second framework 3022 of the frame member 3020 are disposed along the outer shape 3S of the vehicle seat member 3010 (placing step). Here, the molding die is made of the first die and the second die and is constituted such that, when the first die and the second die are clamped, a cavity according to the foamed resin molded body 3030 is formed in the molding die.

Subsequently, after the first die and the second die in which the frame member 3020 is disposed therein are temporarily clamped (cracking), the pre-expanded resin particles obtained by pre-expanding the expandable resin particles containing the resin and the foaming agent are filled and clamped. At this time, at the position in the cavity 3073 corresponding to the first extension part 3036A and the second extension part 3036B in the extension 3036 as well as the part connected to the first extension part 3036A in the connecting part 3035' of the rim part 3035, the pre-expanded resin particles with a relatively small bulk expansion ratio are filled, and at the position in the cavity 3073 corresponding to the other parts of the extension 3036 and the rim part 3035, the pre-expanded resin particles with a relatively large bulk expansion ratio are filled.

Subsequently, the pre-expanded resin particles are secondarily foamed by heating the inside of the cavity of the molding die by steam or the like, gaps among the pre-expanded resin particles are filled, and the pre-expanded resin particles are integrated by fusing them to each other so that the foamed resin molded body 3030 is molded (molding step).

As a result, the foamed resin molded body 3030 including the rim part 3035 and the extension 3036 can be molded in the molding die. The molded extension 3036 contains the foamed resin in the first extension part 3036A and the second extension part 3036B with the maximum point stress larger than that of the foamed resin contained in the not-connecting part 3035" of the rim part 3035. Moreover, in this embodiment, the part connected to the first extension part 3036A in the connecting part 3035' of the rim part 3035 also contains the foamed resin with the maximum point stress by bending larger than that of the foamed resin contained in the not-connecting part 3035" of the rim part 3035. The molded rim part 3035 has the first framework 3021 and the second framework 3022 in the frame member 3020 embedded and forms the outer shape 3S of the vehicle seat member 3010. In the molded extension 3036, the first extension part 3036A extends between the pair of side parts 3035c, 3035c of the rim part 3035 and the second extension parts 3036B, 3036B extend between the front part 3035a and the rear part 3035b of the rim part 3035.

Subsequently, the foamed resin molded body 3030 is removed from the molding die, and the vehicle seat member 3010 of this embodiment in which the foamed resin molded body 3030 and the frame member 3020 are integrated can be obtained. Here, during and after the removal of the foamed resin molded body 3030 from the molding die, remaining heat during the molding is released, and the foamed resin molded body 3030 contracts.

In this embodiment, even if the extension 3036 thermally contracts, since the first extension part 3036A and the second extension parts 3036B, 3036B are constituted to contain the foamed resin with the maximum point stress by bending larger than that of the foamed resin contained in the not-connecting part 3035" of the rim part 3035, deformation of the first extension part 3036A and the second extension parts 3036B, 3036B as well as the extension 3036 including them by the thermal stress can be suppressed. As a result, the vehicle seat member 3010 with high dimensional accuracy can be manufactured.

In this embodiment, one ends of the second extension parts 3036B, 3036B of the extension 3036 are restrained by the front part 3035a of the rim part 3035 in which the first framework 3021 of the frame member 3020 is embedded, and the other ends of the second extension parts 3036B. 3036B of the extension 3036 are restrained by the rear part 3035b of the rim part 3035 in which the part 3022b along the rear edge 3sB in the second framework 3022 of the frame member 3020 is embedded. Similarly, as described in relation with the first embodiment, both sides of the first extension part 3036A of the extension 3036 are also restrained by the side parts 3035c, 3035c of the rim part 3035 in which the opposed parts 3022a, 3022a of the second framework 3022 of the frame member 3020 are embedded. Thus, if the first extension part 3036A and the second extension parts 3036B, 3036B are formed by the foamed resin with the same maximum point stress by bending as that of the not-connecting part 3035" of the rim part 3035 and the extension 3036 and/or the rim part 3035 is not reinforced by another means, the extension 3036 is deformed easily by the thermal contraction. Moreover, in this embodiment, since the parts including the first framework 3021 and the second framework 3022 of the frame member 3020 are made to continuously circle around along the outer shape 3S of the vehicle seat member 3010, such deformation can occur particularly easily. In this embodiment, the first extension part 3036A and the extension 3036 including it are reinforced and the aforementioned deformation is suppressed by, during the molding, molding the foamed resin molded body 3030 such that the first extension part 3036A and the second extension parts 3036B, 3036B of the extension 3036 contain the foamed resin with the maximum point stress by bending larger than that of the foamed resin contained in the not-connecting part 3035" of the rim part 3035.

Some embodiments of the third invention have been described above in detail, but the third invention is not limited to the aforementioned embodiments but is capable of various design changes within a range not departing from the scope of the third invention described in "Solution to Problem".

<Fourth Invention>

Some embodiments of a vehicle seat member and a vehicle seat according to the fourth invention will be described below by referring to the drawings. However, the scope of the fourth invention is not limited to the individual embodiments.

Fourth Invention/First Embodiment 4-1. Vehicle Seat Member 4010

A first embodiment of a vehicle seat member and a method of manufacturing the same will be described on the basis of FIGS. 33 to 37.

Figure 33:
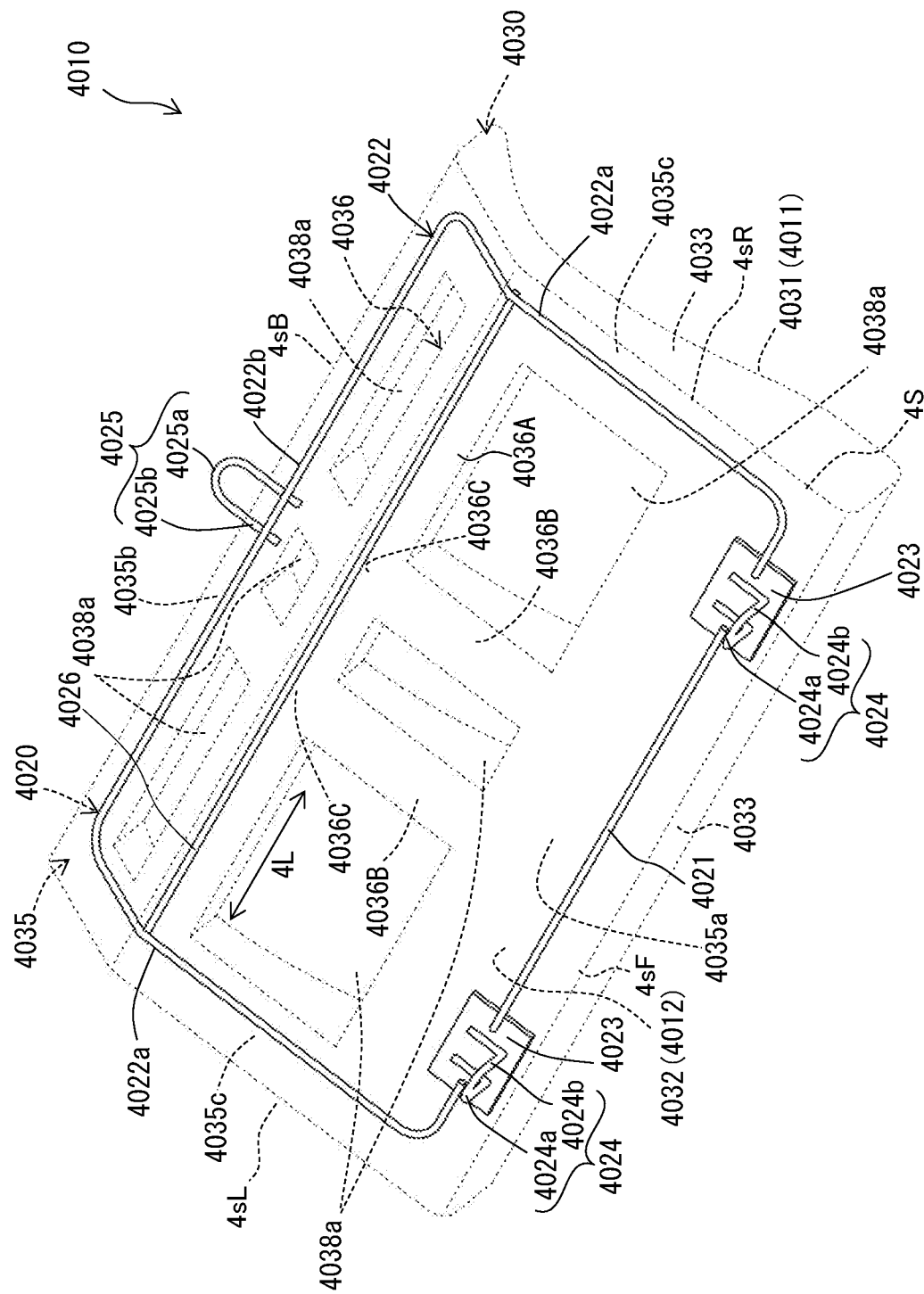
FIG. 33 is a schematic perspective view for explaining a structure of a frame member when a vehicle seat member according to a first embodiment of a fourth invention is seen from below.
Figure 34:
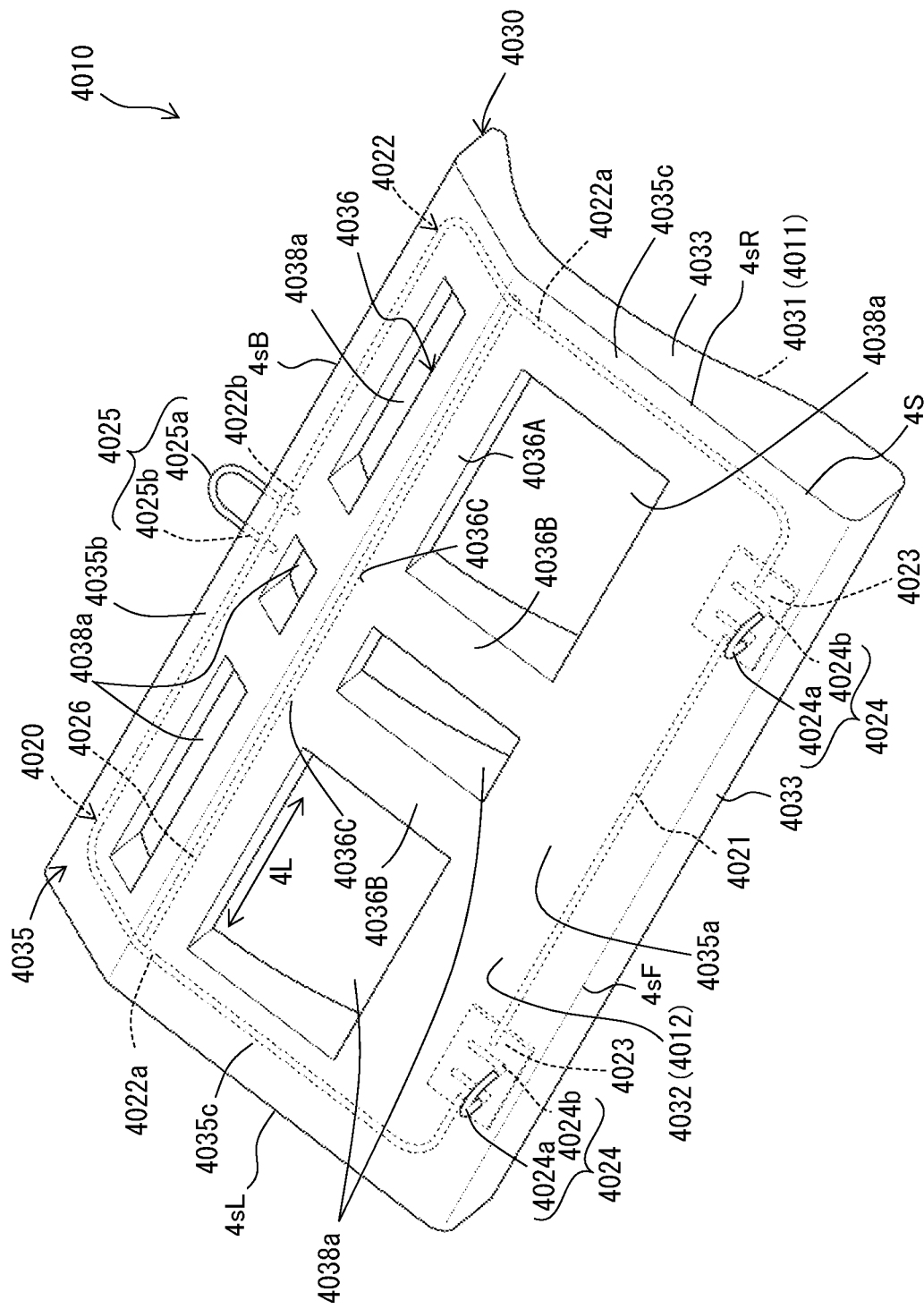
FIG. 34 is a schematic perspective view for explaining a structure of a foamed resin molded body when the vehicle seat member according to the first embodiment of the fourth invention is seen from below.

As illustrated in FIGS. 33 and 34, the vehicle seat member 4010 includes a frame member 4020 and a foamed resin molded body 4030 in which at least a part of the frame member 4020 is embedded as a basic constitution.

Figure 35:
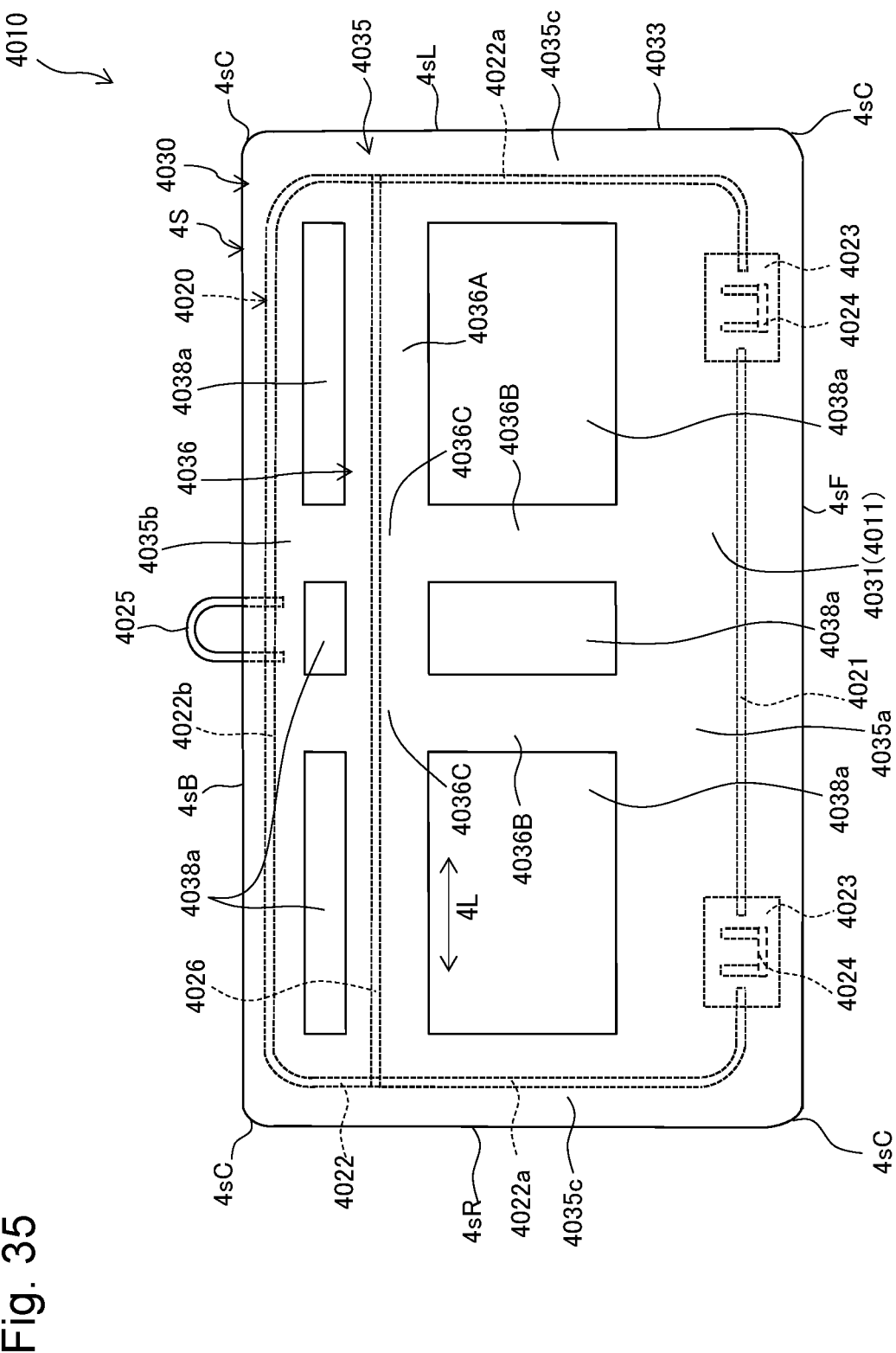
FIG. 35 is a plan view of the vehicle seat member according to the first embodiment of the fourth invention when seen from an upper surface.

An entire shape of the vehicle seat member 4010 is not particularly limited but as illustrated in FIG. 35, a rectangular shape in plan view is common. In the description, a rectangle refers to a square such as a rectangle, a regular square, and the like, and not only the rectangle or the regular square, it may be a shape such as a trapezoid or a parallelogram. In the description, the rectangle also includes a substantial rectangle, and corner parts may be rounded, or a part or the whole of a side constituting the rectangle may be a bent side, for example.

In this embodiment, as illustrated in FIG. 35, an outer shape 4S of the vehicle seat member 4010 in plan view is a rectangle having a short side and a long side and has a shape having a transverse direction and a longitudinal direction. The outer shape 4S includes a right edge 4sR and a left edge 4sL constituting the short sides, a front edge 4sF and a rear edge 4sB constituting the long sides as four sides, and corners 4sC constituting four corners. The terms front, rear, left, and right in this embodiment refer to directions when an advancing (front) direction of the vehicle is seen from the vehicle in a state where an occupant is seated in the vehicle.

Figure 36:
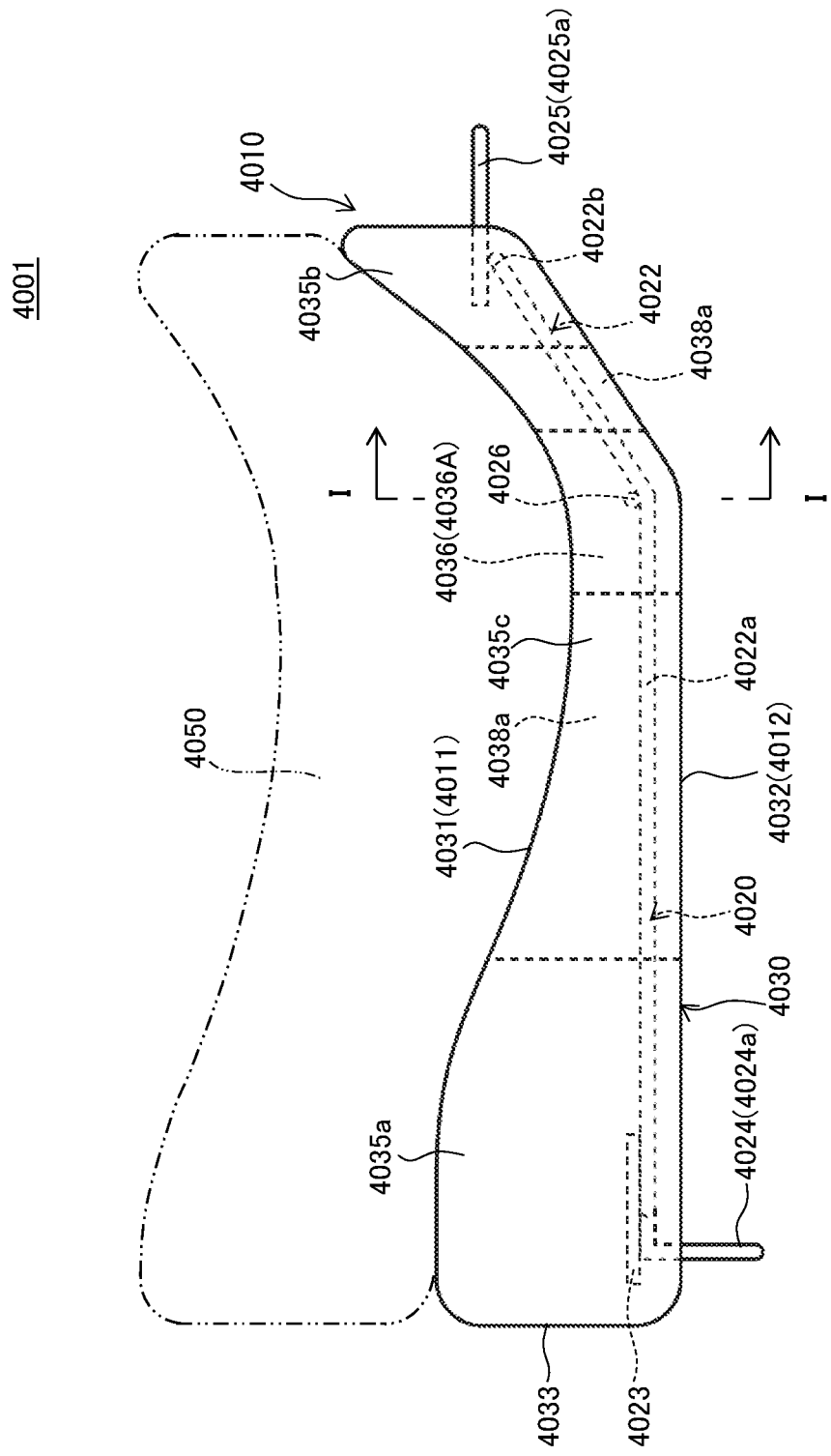
FIG. 36 is a left side view of the vehicle seat member according to the first embodiment of the fourth invention.

The vehicle seat member 4010 of this embodiment may be made into a vehicle seat 4001 by laminating/disposing an upper seat member 4050 such as a cushion material or the like as appropriate from a side of an upper surface 4011 (upper surface 4031) of the vehicle seat member 4010 (foamed resin molded body 4030) as illustrated in FIG. 36, for example. Moreover, the vehicle seat member 4010 may be covered by an appropriate exterior material together with the cushion material or the like so as to have the vehicle seat 4001.

4-2. Frame Member 4020

As illustrated in FIGS. 33 to 35, the frame member 4020 is embedded in order to apply required shape retaining properties and strength to the foamed resin molded body 4030. The frame member 4020 is usually constituted by a material whose dimensions are not substantially changed as compared to the foamed resin molded body 4030 under a condition that the foamed resin molded body 4030 is molded or a metal material such as steel or aluminum, for example.

The frame member 4020 includes first and second frameworks 4021, 4022 extending inside the foamed resin molded body 4030 along the outer shape 4S of the vehicle seat member 4010 in plan view, a pair of bases 4023, 4023 linked with end portions of the first and second frameworks 4021, 4022, and a reinforcing portion 4026. The second framework 4022 has a structure in which a pair of opposed parts 4022a. 4022a opposed to each other continues to each other, and in the description, the second framework 4022 is called a "continuous part" of the frame member 4020 in some cases.

In the illustrated embodiment, the reinforcing portion 4026 is disposed so as to follow a opposed direction of the pair of opposed parts 4022a, 4022a of the second framework 4022, and both ends of the reinforcing portion 4026 are linked with the pair of opposed parts 4022a, 4022a of the second framework 4022, respectively. Linking between the pair of opposed parts 4022a, 4022a of the second framework 4022 and the both ends of the reinforcing portion 4026 can be performed by means such as welding and bonding. Moreover, the pair of opposed parts 4022a, 4022a of the second framework 4022 and the reinforcing portion 4026 may be constituted by an integral member. The reinforcing portion 4026 of the frame member 4020 only needs to extend so as to follow at least one of the directions in which an extension 4036 of the foamed resin molded body 4030 which will be described later extends and to be embedded in the extension 4036 and does not have to be linked with the framework of the frame member 4020 as illustrated. However, in the constitution in which the second framework 4022 and the reinforcing portion 4026 are linked in the frame member 4020, it is preferable since an effect of suppressing deformation of the extension 4036 which will be described later is particularly high. Moreover, since the second framework 4022 and the reinforcing portion 4026 are linked in the frame member 4020, rigidity of the second framework 4022 is improved, and the frame member 4020 has an entire structure that is not deflected easily and thus, disposition of the frame member 4020 in a molding die 4007 is easy in the placing step which will be described later, and particularly assembling and installing the frame member 4020 in the molding die 4007 by using a robot is easy.

In the illustrated embodiment, the reinforcing portion 4026 of the frame member 4020 is constituted by one member extending so as to be embedded across an entire first extension part 4036A which is one of the extension parts of the extension 4036 of the foamed resin molded body 4030, that is, across the entire first extension part 4036A from one end to the other end connected to a rim part 4035, which will be described later. However, this embodiment is not limiting, but the reinforcing portion 4026 of the frame member 4020 may be constituted by a plurality of members disposed along the direction in which the extension 4036 of the foamed resin molded body 4030 extends and extending along the direction.

The frame member 4020 further includes a front locking portion 4024 mounted on each of the bases 4023 and a rear locking portion 4025 mounted on the second framework 4022. In this embodiment, as the first and second frameworks 4021, 4022, the front and rear locking portions 4024, 4025, and the reinforcing portion 4026, a wire rod (wire) made of steel or aluminum having a diameter of approximately 3 to 6 mm is used, for example, but it may be a band-shaped or tubular steel material made of metal, for example. Moreover, the frame member 4020 may be manufactured by punch molding and press molding from a steel plate. In the fourth invention, the framework and the reinforcing portion are preferably a linear framework and a linear reinforcing portion as illustrated, respectively. The term "linear" here is not limited to a wire rod such as a wire but may be the aforementioned band-shaped, tubular, or the like, for example, and is not particularly limited as long as it extends substantially along one line.

The first framework 4021 of the frame member 4020 extends along a part of the center of the front edge 4sF in its vicinity, and the second framework 4022 extends along a part of both sides of the front edge 4sF, the right edge 4sR, the left edge 4sL, the rear edge 4sB, and each of the corners 4sC in their vicinities. The frame member 4020 is embedded at a spot slightly inward from the outer peripheral surface 4033 of the foamed resin molded body 4030 defining the outer shape 4S so as to follow the outer shape 4S of the vehicle seat member 4010.

As described above, the first and second frameworks 4021 and 4022 of the frame member 4020 continuously circle around along the outer shape 4S of the vehicle seat member 4010 together with the pair of bases 4023, 4023 connecting them. In this embodiment, the parts including the first and second frameworks 4021, 4022 of the frame member 4020 continuously circle around along the outer shape 4S of the vehicle seat member 4010, but the first and second frameworks 4021, 4022 of the frame member 4020 may circle around intermittently along the outer shape 4S of the vehicle seat member 4010, for example. That is, not limited to this form, the framework may be disposed only on a part of a part along the outer shape 4S. For example, it may be so constituted that the second framework 4022 is not linked with the bases 4023, 4023 but extends along the rear edge 4sB. Moreover, the number of the frameworks constituting the frame member 4020 is not limited to two but the number may be one, or three or more.

The front locking portion 4024 and the rear locking portion 4025 constituting the frame member 4020 are parts by which the vehicle seat member 4010 is locked on the vehicle. The front locking portion 4024 is linked with the base 4023 by welding, bonding, or the like, for example, and protrudes downward from the base 4023. A distal end part 4024a of the front locking portion 4024 is curved having a substantial U-shape and is exposed from the foamed resin molded body 4030, and a base end part 4024b is embedded in the foamed resin molded body 4030 together with the base 4023. More specifically, the base end part 4024b is embedded in the foamed resin molded body 4030 by the entire periphery thereof. As a result, even if a force in the pulling-out direction is applied when the vehicle seat member 4010 of this embodiment is locked on the vehicle through the distal end part 4024a of the front locking portion 4024, the front locking portion 4024 is held by the foamed resin molded body 4030, and resistance against the force in the pulling-out direction can be improved.

Moreover, the rear locking portion 4025 protrudes rearward from a center along the rear edge 4$s$B in the second framework 4022. The distal end part 4025$a$ of the rear locking portion 4025 is curved having a substantial U-shape and is exposed from the foamed resin molded body 4030, and the base end part 4025$b$ is embedded in the foamed resin molded body 4030.

In this embodiment, the distal end parts 4024$a$, 4025$a$ of the front locking portion 4024 and the rear locking portion 4025 are formed by bending a wire rod into a substantial U-shape, respectively, but this structure is not limiting, and it only needs to be a structure capable of locking in accordance with the structure on the vehicle side.

In this embodiment, the front locking portion 4024 is linked with both the first and second frameworks 4021, 4022 through the base 4023. However, the front locking portion 4024 is not limited to this form but may be linked directly with both the first and second frameworks 4021, 4022 not through the base 4023 as the rear locking portion 4025. Moreover, the number of the front locking portions 4024 is not particularly limited but it may be one, or three or more. Either one of the front locking portion 4024 or the rear locking portion 4025 does not have to be present.

4-3. Foamed Resin Molded Body 4030

As illustrated in FIGS. 33 and 34, the foamed resin molded body 4030 is an in-mold foamed molded body of a foamed resin. The foamed resin is not particularly limited, but a foamed thermoplastic resin is usually used, and a foamed polystyrene-based resin, a foamed composite resin containing a polystyrene-based resin and a polyolefin-based resin, a foamed polyolefin-based resin, and the like are suitably used, and the foamed polystyrene-based resin or the foamed composite resin containing the polystyrene-based resin and the polyolefin-based resin is particularly preferable. The foamed polystyrene-based resin or the foamed composite resin containing the polystyrene-based resin and the polyolefin-based resin have small degrees of thermal expansion and thermal contraction and thus, they are particularly preferable from a viewpoint that deformation of the foamed resin molded body and the frame member is suppressed. The expansion rate can be adjusted as appropriate in accordance with the type of the foamed resin, but it is approximately 10 to 50 times in general or approximately 20 to 40 times typically.

In the foamed resin molded body 4030, an upper surface 4031 on which the occupant of the vehicle is seated and a bottom surface 4032 which is a side fastened to the vehicle are formed. The foamed resin molded body 4030 includes a rim part 4035 in which the frame member 4020 is embedded and defining the outer shape 4S of the vehicle seat member 4010 in plan view of the vehicle seat member 4010. The rim part 4035 is constituted by a front part 4035$a$ located on a front of a seat, a pair of side parts 4035$c$. 4035$c$ formed integrally with the front part 4035$a$, located on right and left sides of the seat, extending rearward from both end portions of the front part 4035$a$, and having vicinities of the rear ends inclined, and a rear part 4035$b$ integrally formed with the side parts 4035$c$. 4035$c$ and connecting the rear ends of the pair of side parts 4035$c$, 4035$c$ in a state where the vehicle seat member 4010 is mounted. When the vehicle seat member 4010 is assembled in the vehicle, the front part 4035$a$ in the rim part 4035 supports a thigh part of the occupant, and the rear part 4035$b$ supports a buttock part of the occupant.

Specifically, as illustrated in FIG. 36, the upper surface 4031 of the foamed resin molded body 4030 is formed so as to hold the thigh part and the buttock part of the occupant through the upper seat member 4050 by being a curved surface dented downward. However, the shape and the thickness of the foamed resin molded body 4030 can be changed in various ways in accordance with a shape of the vehicle body side on which the vehicle seat member 4010 is mounted and is not limited to the illustrated embodiment. The upper surface 4031 of the foamed resin molded body 4030 may be substantially a flat shape, for example.

The foamed resin molded body 4030 includes an extension 4036 extending inward from the rim part 4035 so as to bridge the rim part 4035 inside of the rim part 4035. In this embodiment, the extension 4036 is constituted by the first extension part 4036A extending in the longitudinal direction and a second extension part 4036B extending in the transverse direction. The first extension part 4036A and the second extension part 4036B are linked by a linking portion 4036C. In this embodiment, the extension 4036 is constituted by the plurality of extension parts 4036A, 4036B, but this is not limiting, and it may be constituted only by one extension part. The extension 4036 may be constituted only by the first extension part 4036A or may be constituted only by the second extension part 4036B, for example. When the extension 4036 includes a plurality of extension parts extending across the rim part 4035, each of the plurality of extension parts may be provided along a predetermined direction.

In this embodiment, the frame member 4020 has a second framework 4022 (continuous part) in which the opposed parts 4022$a$, 4022$a$ opposed to each other across the space inside the rim part 4035 continue to each other. The first extension part 4036A in the extension 4036 is formed so as to extend between the opposed parts 4022$a$, 4022$a$.

In the foamed resin molded body 4030, the extension 4036 is a part for holding a shape of the vehicle seat member 4010. By forming the extension 4036 in the space inside the rim part 4035 in the foamed resin molded body 4030, a hollow portion 4038$a$ is formed between the rim part 4035 and the extension 4036. The hollow portion 4038$a$ is provided for the purpose of reducing the weight of the foamed resin molded body 4030 or of accommodating the other members (a cushion material which is elastically deformed more easily than the foamed resin molded body 4030, a member of a console box, and the like) constituting the vehicle seat. In the illustrated embodiment, six pieces of the hollow portions 4038$a$ are formed in the foamed resin molded body 4030, but the number of the hollow portions 4038$a$ is not limited.

As illustrated in FIGS. 33 to 35, in the extension 4036 of the foamed resin molded body 4030, the reinforcing portion 4026 of the frame member 4020 extending along an extending direction 4L of the first extension part 4036A is embedded. More specifically, the extending direction 4L in which the first extension part 4036A in the extension 4036 extends is matched with the longitudinal direction of the vehicle seat member 4010, and the reinforcing portion 4026 of the frame member 4020 extends along the first extension part 4036A extending in the extending direction 4L which is the longitudinal direction and is embedded. As in the illustrated embodiment, if the plurality of extension parts is present in the extension 4036, it is only necessary that the reinforcing portion extending along the extending direction is embedded in at least one of the extension parts.

If the first and second frameworks 4021, 4022 of the frame member 4020 are embedded in the rim part 4035 in the foamed resin molded body 4030 but the reinforcing portion 4026 of the frame member 4020 is not embedded in the extension 4036, when a heat is input into the vehicle seat member 4010 (or when the input heat is released), apparent thermal expansion amounts (thermal contraction amounts) are different between the rim part 4035 in the state where the first and second frameworks 4021, 4022 of the frame member 4020 in the foamed resin molded body 4030 are embedded and the extension 4036 extending inside the rim part 4035 where the frame member 4020 is not present. As a result, the compression stress and the tensile stress non-uniformly act as the thermal stress on the extension 4036 surrounded by the rim part 4035, and the center of the extension 4036 is deformed easily so as to be curved upward, for example. Particularly, such phenomenon is remarkable in the first extension part 4036A formed along the longitudinal direction in the extension 4036.

In this embodiment, the frame member 4020 includes not only the first framework 4021 and the second framework 4022 but also the reinforcing portion 4026, and by embedding this reinforcing portion 4026 in the first extension part 4036A extending along the longitudinal direction in the extension 4036 extending inside the rim part 4035, the extension 4036 is reinforced. As a result, even if the extension 4036 is thermally expanded or thermally contracted, deformation of the extension 4036 by the thermal stress can be suppressed, and dimensional accuracy of the vehicle seat member 4010 can be ensured.

Particularly, in this embodiment, the second framework 4022 having the structure in which the pair of opposed parts 4022a. 4022a opposed with each other continues to each other is embedded in the rim part 4035, and the first extension part 4036A of the extension 4036 is formed so as to extend between the opposed parts 4022a, 4022a. In this constitution, since the both sides of the first extension part 4036A of the extension 4036 are restrained, if the reinforcing portion 4026 is not provided, the extension 4036 including the first extension part 4036A is deformed particularly easily by thermal expansion and thermal contraction. In this embodiment, by embedding the reinforcing portion 4026 in the first extension part 4036A, the deformation of the extension 4036 including the first extension part 4036A can be further effectively suppressed.

Moreover, as in this embodiment, if the parts including the first framework 4021 and the second framework 4022 of the frame member 4020 continuously circle around along the outer shape 4S of the vehicle seat member 4010, the deformation by the thermal stress is suppressed over the entire circumference of the rim part 4035. Thus, if the reinforcing portion 4026 is not provided, the extension 4036 formed inside the rim part 4035 is deformed further easily. Even in such a case, in this embodiment, by embedding the reinforcing portion 4026 in the extension 4036 as described above, the deformation of the extension 4036 can be suppressed more effectively.

4-4. Method of Manufacturing Vehicle Seat Member 4010

Figure 37:
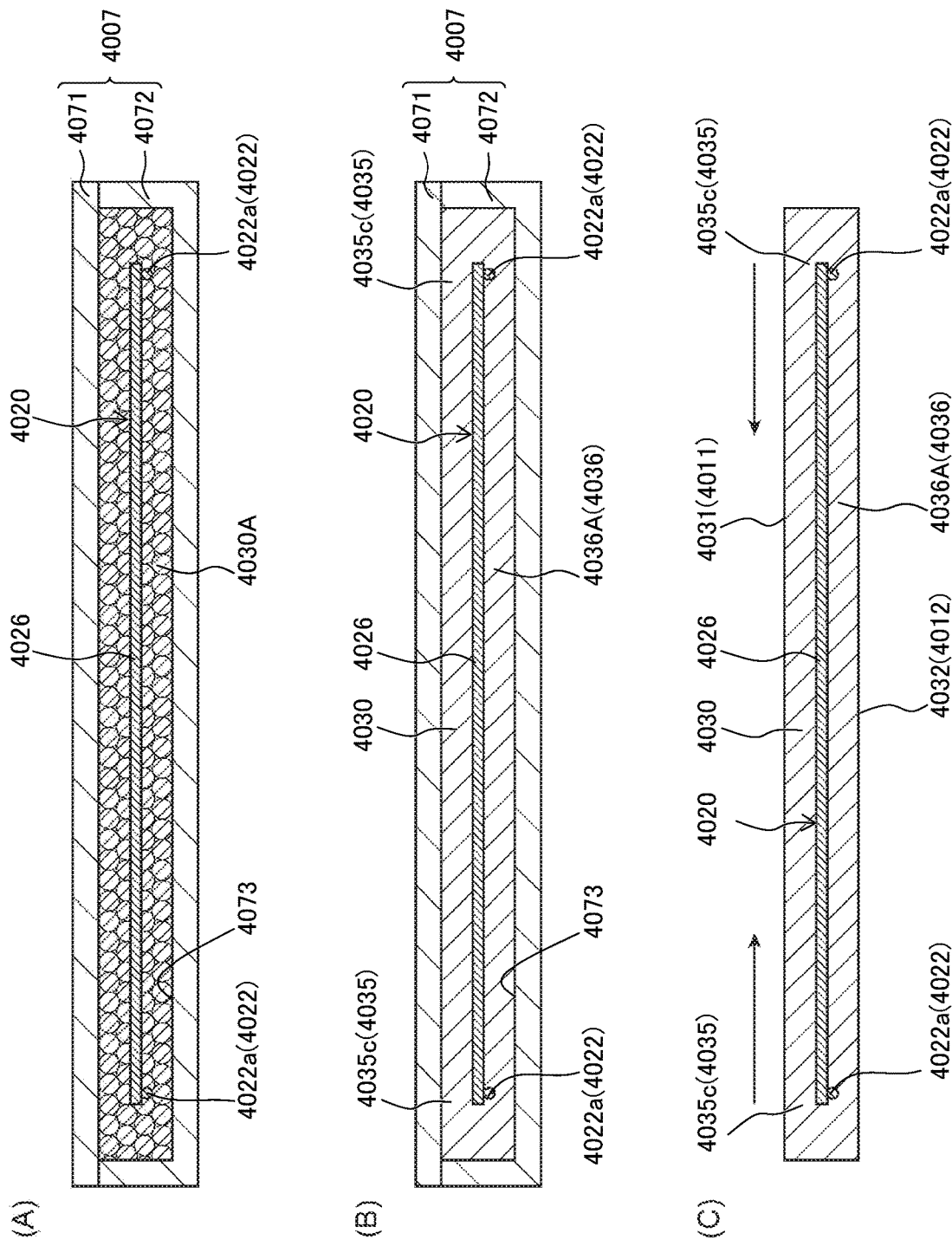
FIG. 37 are schematic sectional views at a position corresponding to a I-I line arrow-view sectional view illustrated in FIG. 36 for explaining a method of manufacturing the vehicle seat member according to the first embodiment of the fourth invention.

The method of manufacturing the vehicle seat member 4010 will be described below by referring to FIG. 37. In FIG. 37, each step of the method of manufacturing will be described by a schematic sectional view at a position corresponding to a I-I line arrow-view sectional view illustrated in FIG. 36.

An outline of the method of manufacturing the vehicle seat member 4010 of this embodiment is as follows. As illustrated in FIG. 37(A), the frame member 4020 is disposed so as to be located in a cavity 4073 of the molding die 4007 and then, pre-expanded resin particles 4030A obtained by pre-expanding the expandable resin particles containing the resin and the foaming agent are filled therein. Subsequently, as illustrated in FIG. 37(B), the pre-expanded resin particles 4030A are expanded by supplying steam into the molding die 4007 so as to mold the foamed resin molded body 4030. After that, as illustrated in FIG. 37 (C), the foamed resin molded body 4030 is removed from the molding die 4007 together with the frame member 4020 and cooled by releasing heat or the like.

The foamed resin molded body 4030 usually has a property of slightly contracting when the remaining heat during the foam molding is released after the molding. On the other hand, the frame member 4020 constituted by a material such as metal is not substantially changed in the dimensions before and after molding of the foamed resin molded body 4030 compared to the foamed resin molded body 4030. Therefore, if the reinforcing portion 4026 of the frame member 4020 is not embedded in the extension 4036, as illustrated in FIG. 38(A), the foamed resin molded body 4030 is molded by the molding die 4007 made of a first die 4071 and a second die 4072, and as illustrated in FIG. 38(B), for a period of time immediately after the molding until the foamed resin molded body 4030 is removed from the molding die 4007 and the foamed resin molded body 4030 releases heat, the foamed resin molded body 4030 thermally contracts. At this time, since the both sides of the extension 4036 where the frame member 4020 is not present is restrained by the rim part 4035 where the second framework 4022 of the frame member 4020 is present, the compression stress and the tensile stress non-uniformly act as the thermal stress on the extension 4036, and the extension 4036 is deformed easily so as to be curved upward from the center. In view of these points, in this embodiment, the vehicle seat member 4010 is manufactured as follows. First, the frame member 4020 is prepared. The structure and the material of the frame member 4020 are as described above. Subsequently, as illustrated in FIG. 37(A), the first framework 4021 and the second framework 4022 are disposed at positions embedded in the rim part 4035 of the foamed resin molded body 4030 along the outer shape 4S of the vehicle seat member 4010 in plan view, and the frame member 4020 is disposed in the molding die 4007 so that the reinforcing portion 4026 is disposed at the position embedded in the extension 4036 along the extending direction 4L in which the extension 4036 of the foamed resin molded body 4030 is extended (placing step). At this time, the frame member 4020 may be disposed in the molding die 4007 by using a robot.

As illustrated in FIG. 37(A), the molding die 4007 is made of the first die 4071 and the second die 4072 and is constituted so that the cavity 4073 according to the foamed resin molded body 4030 is formed in the molding die 4007 when the first die 4071 and the second die 4072 are clamped.

Subsequently, as illustrated in FIG. 37(A), the first die 4071 and the second die 4072 in which the frame member 4020 is disposed therein is temporarily clamped (cracking) and then, the pre-expanded resin particles 4030A obtained by pre-expanding the expandable resin particles containing the resin and the foaming agent are filled and clamped.

Subsequently, as illustrated in FIG. 37(B), the pre-expanded resin particles 4030A are secondarily foamed by heating the inside of the cavity 4073 of the molding die 4007 by steam or the like, the gaps among the pre-expanded resin particles 4030A are filled, and the pre-expanded resin particles 4030A are integrated by fusing them to each other so that the foamed resin molded body 4030 is molded (molding step).

As described above, in the molding die 4007, the foamed resin molded body 4030 including the rim part 4035 and the extension 4036 can be molded. The molded rim part 4035 has the first framework 4021 and the second framework 4022 of the frame member 4020 embedded and forms the outer shape 4S of the vehicle seat member 4010. The molded extension 4036 extends so that the first extension part 4036A extends between the pair of side parts 4035*c*, 4035*c* of the rim part 4035 and the second extension parts 4036B, 4036B extend between the front part 4035*a* and the rear part 4035*b* of the rim part 4035. The first extension part 4036A of the extension 4036 has the reinforcing portion 4026 of the frame member 4020 disposed along the extending direction 4L thereof embedded.

Subsequently, the foamed resin molded body 4030 is removed from the molding die 4007, and the vehicle seat member 4010 of this embodiment in which the foamed resin molded body 4030 and the frame member 4020 are integrated can be obtained. Here, during and after the removal of the foamed resin molded body 4030 from the molding die 4007, remaining heat during the molding is released, and the foamed resin molded body 4030 contracts.

In the embodiment, even if the extension 4036 thermally contracts, since the reinforcing portion 4026 is embedded, deformation of the extension 4036 by the thermal stress can be suppressed. As a result, the vehicle seat member 4010 with high dimensional accuracy can be manufactured.

Figure 38:
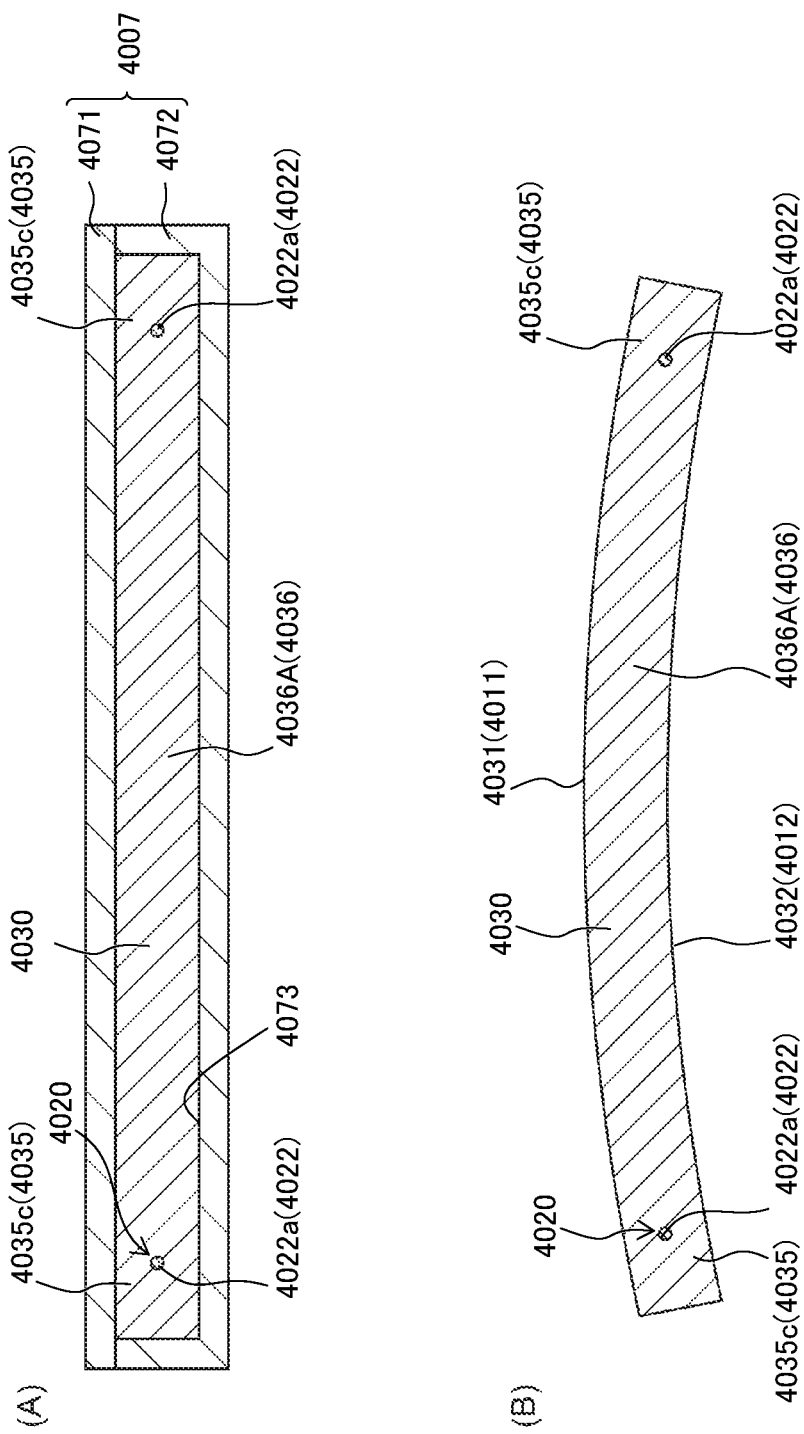
FIG. 38 are schematic sectional views for explaining a method of manufacturing a vehicle seat member which is a comparative example.

In this embodiment, the frame member 4020 has the second framework 4022, and the second framework 4022 has the continuous part in which the opposed parts 4022*a* opposed to each other across the space inside the rim part 4035 continue to each other. When the foamed resin molded body 4030 is molded, the extension 4036 is molded so as to have the first extension part 4036A extending between the opposed parts 4022*a*, 4022*a*. Therefore, since the both sides of the first extension part 4036A of the extension 4036 are restrained by the side parts 4035*c*, 4035*c* of the rim part 4035 in which the opposed parts 4022*a*, 4022*a* of the second framework 4022 of the frame member 4020 are embedded, if the reinforcing portion 4026 of the frame member 4020 is not provided as illustrated in FIG. 38, the extension 4036 is deformed easily by the thermal contraction. Particularly since the parts including the first framework 4021 and the second framework 4022 of the frame member 4020 are made to continuously circle around along the outer shape 4S of the vehicle seat member 4010, such deformation occurs easily. In this embodiment, since the extension 4036 is molded so that the reinforcing portion 4026 of the frame member 4020 is embedded in the first extension part 4036A which is one of the extension parts during the molding step, such deformation can be suppressed.

Fourth Invention/Second Embodiment

Figure 39:
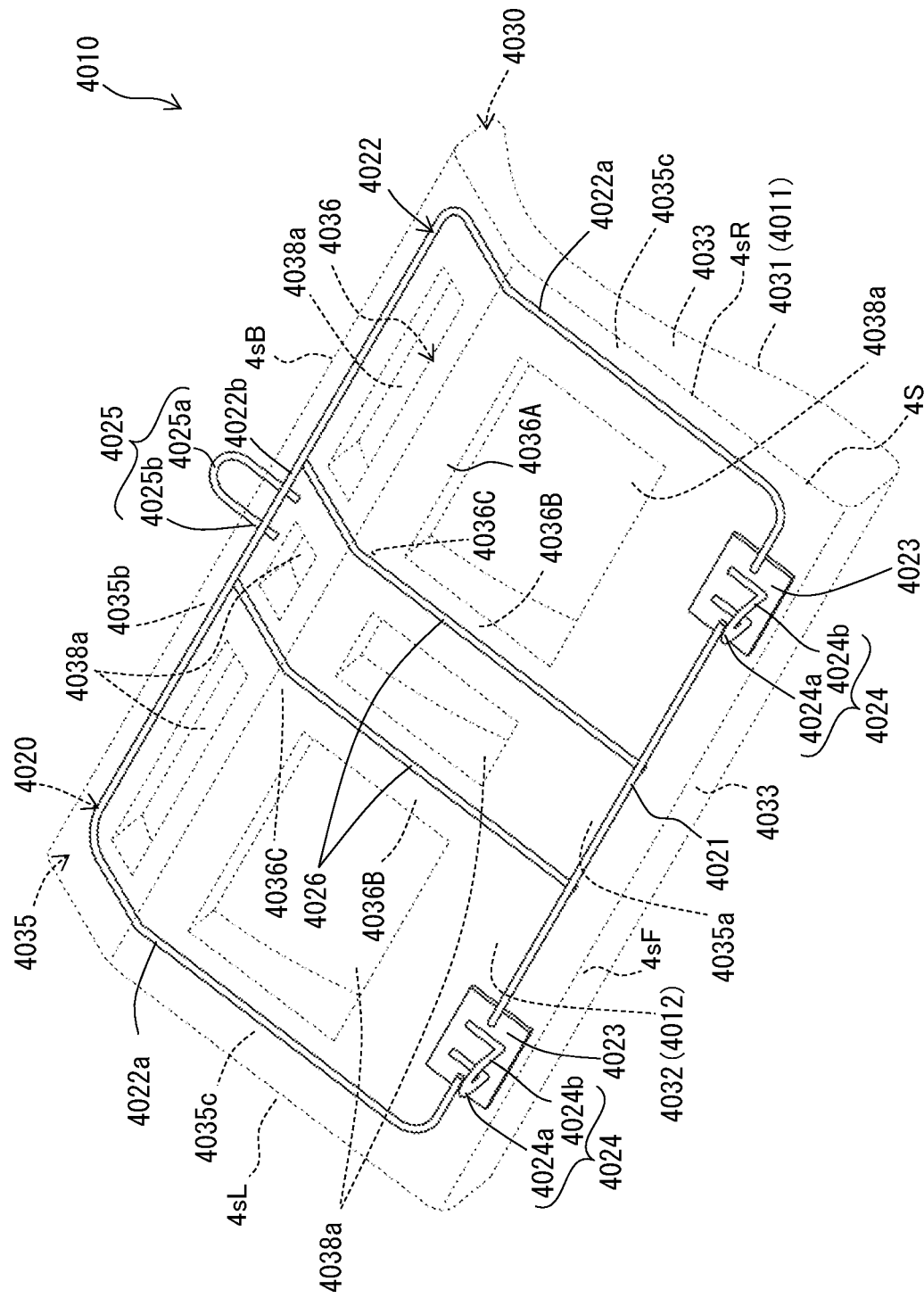
FIG. 39 is a schematic perspective view for explaining a structure of a frame member when a vehicle seat member according to a second embodiment of the fourth invention is seen from below.
Figure 40:
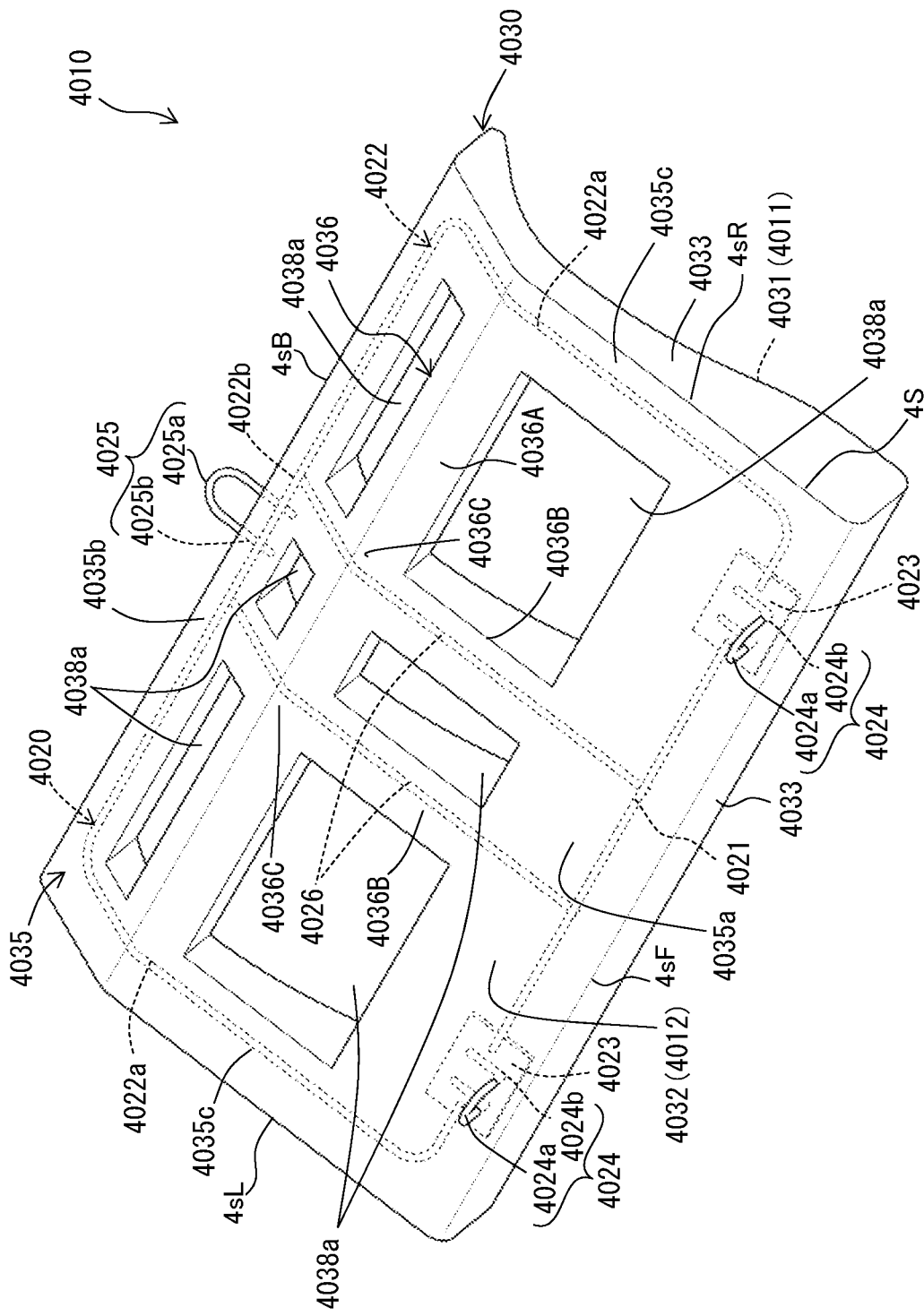
FIG. 40 is a schematic perspective view for explaining a structure of a foamed resin molded body when the vehicle seat member according to the second embodiment of the fourth invention is seen from below.

The vehicle seat member 4010 according to a second embodiment of the fourth invention and the method of manufacturing the same will be described below by referring to FIGS. 39 and 40. A point that the vehicle seat member 4010 according to the second embodiment is different from the vehicle seat member 4010 according to the first embodiment is that, in the second extension parts 4036B, 4036B extending in the transverse direction, the reinforcing portions 4026, 4026 extending along them are embedded, not in the first extension part 4036A extending in the longitudinal direction of the outer shape 4S of the vehicle seat member 4010 in the extension 4036. The same constitutions as those in the first embodiment are given the same reference numerals and detailed description will be omitted.

In this embodiment, by embedding two pieces of the reinforcing portions 4026, 4026 in two pieces of the second extension parts 4036B, 4036B extending along the short side direction in the extension 4036 extending inside the rim part 4035, respectively, the extension 4036 is reinforced. As a result, even if the extension 4036 is thermally expanded or thermally contracted, deformation of the extension 4036 by the thermal stress can be suppressed, and dimensional accuracy of the vehicle seat member 4010 can be ensured.

In this embodiment, the frame member 4020 has a structure in which the first framework 4021 and a part 4022*b* along the rear edge 4sB in the second framework 4022 opposed with the first framework 4021 continue to each other. The first framework 4021 and the part 4022*b* along the rear edge 4sB in the second framework 4022 are embedded in the rim part 4035, and the second extension parts 4036B, 4036B of the extension 4036 are formed so as to extend between the first framework 4021 and the part 4022*b* along the rear edge 4sB in the second framework 4022. In this constitution, since the both sides of the second extension parts 4036B, 4036B of the extension 4036 are restrained, respectively, if the reinforcing portion 4026 is not provided, the extension 4036 including the second extension parts 4036B, 4036B is deformed particularly easily by thermal expansion and thermal contraction. In this embodiment, by embedding the reinforcing portions 4026, 4026 in the second extension parts 4036B, 4036B, the deformation of the extension 4036 including the second extension parts 4036B, 4036B can be effectively suppressed.

Manufacture of the vehicle seat member 4010 according to the second embodiment can be performed by the procedure similar to the first embodiment.

First, the frame member 4020 is disposed in the molding die so that the first framework 4021 and the second framework 4022 are disposed at positions embedded in the rim part 4035 of the foamed resin molded body 4030 along the outer shape 4S of the vehicle seat member 4010 in plan view, and the reinforcing portions 4026, 4026 are disposed at positions embedded in the second extension parts 4036B, 4036B in the extension 4036 of the foamed resin molded body 4030 (placing step). Here, the molding die is made of the first die and the second die and is constituted such that when the first die and the second die are clamped, a cavity according to the foamed resin molded body 4030 is formed in the molding die.

Subsequently, after the first die and the second die in which the frame member 4020 is disposed is temporarily clamped (cracking), the pre-expanded resin particles obtained by pre-expanding the expandable resin particles containing the resin and the foaming agent are filled and clamped.

Subsequently, the pre-expanded resin particles are secondarily foamed by heating the inside of the cavity of the molding die by steam or the like, gaps among the pre-expanded resin particles are filled, and the pre-expanded resin particles are integrated by fusing them to each other so that the foamed resin molded body 4030 is molded (molding step).

As a result, the foamed resin molded body 4030 including the rim part 4035 and the extension 4036 can be molded in the molding die. The molded rim part 4035 has the first framework 4021 and the second framework 4022 in the frame member 4020 embedded therein and forms the outer shape 4S of the vehicle seat member 4010. In the molded extension 4036, the first extension part 4036A extends between the pair of side parts 4035c, 4035c of the rim part 4035, and the second extension parts 4036B, 4036B extend between the front part 4035a and the rear part 4035b of the rim part 4035. The second extension parts 4036B, 4036B of the extension 4036 have the reinforcing portions 4026, 4026 of the frame member 4020 disposed along the extending directions thereof embedded.

Subsequently, the foamed resin molded body 4030 is removed from the molding die, and the vehicle seat member 4010 of this embodiment in which the foamed resin molded body 4030 and the frame member 4020 are integrated can be obtained. Here, during and after the removal of the foamed resin molded body 4030 from the molding die, remaining heat during the molding is released, and the foamed resin molded body 4030 contracts.

In the embodiment, even if the extension 4036 thermally contracts, since the reinforcing portion 4026 is embedded in the second extension parts 4036B, 4036B, deformation of the extension 4036 by the thermal stress can be suppressed. As a result, the vehicle seat member 4010 with high dimensional accuracy can be manufactured In this embodiment, the frame member 4020 is formed so as to have a continuing structure in which the first framework 4021 and the part 4022b along the rear edge 4sB in the second framework 4022 which are a pair of opposed parts continue to each other. And the frame member 4020 having this continuing structure is embedded in the rim part 4035, and the second extension parts 4036B, 4036B of the extension 4036 are formed so as to extend between the first framework 4021 and the part 4022b along the rear edge 4sB in the second framework 4022, respectively. Thus, one ends of the second extension parts 4036B, 4036B of the extension 4036 are restrained by the front part 4035a of the rim part 4035 in which the first framework 4021 of the frame member 4020 is embedded, and the other ends of the second extension parts 4036B, 4036B of the extension 4036 are restrained by the rear part 4035b of the rim part 4035 in which the part 4022b along the rear edge 4sB in the second framework 4022 of the frame member 4020 is embedded and thus, if the reinforcing portions 4026, 4026 of the frame member 4020 are not provided, the extension 4036 is deformed easily by thermal contraction. Moreover, in this embodiment, the parts including the first framework 4021 and the second framework 4022 of the frame member 4020 are made to continuously circle around along the outer shape 4S of the vehicle seat member 4010 and thus, such deformation can occur particularly easily. In this embodiment, by molding the extension 4036 so that the reinforcing portions 4026, 4026 of the frame member 4020 are embedded in the second extension parts 4036B, 4036B, one of the extension parts, during the molding step, respectively, such deformation can be suppressed.

Some embodiments of the fourth invention have been described in detail, but the fourth invention is not limited to the aforementioned embodiments but is capable of various design changes within a range not departing from the scope of the fourth invention described in "Solution to Problem".

EXAMPLES

<First Invention>

First Invention Example 1

The vehicle seat member 1 of the first embodiment of the first invention illustrated in FIGS. 1 to 7 was manufactured by in-mold foam molding.

The used molding die 70 was formed so that dimensions of a part of the foamed resin molded body 100 of the vehicle seat member 1 to be manufactured had a width in the longitudinal direction of 1260 mm, a width in the transverse direction of 550 mm, and a thickness of 160 mm.

For the first framework 250 and the second framework 260 of the frame member 200, an iron % ire (SWM-B) with a diameter of 4.5 mm was used.

The gaps 101, 102 formed in the front part 120 (see FIG. 2) of the foamed resin molded body 100 were grooves each having a width of 10 mm and a length of 200 mm and were formed as the grooves each having such a depth that the second framework right part 201 or the second framework left part 202 was located on bottom surfaces thereof.

The gaps 101, 102 formed in the rear part 130 (see FIG. 2) of the foamed resin molded body 100 were grooves each having a width of 10 mm and a length of 100 mm and were formed as the grooves having such a depth that the second framework right part 201 or the second framework left part 202 are located on bottom surfaces thereof.

The second framework right part 201 was disposed so as to extend through the centers of the gaps 101, 101 in the width direction.

Similarly, the second framework left part 202 was disposed so as to extend through the centers of the gaps 102, 102 in the width direction.

The foamed resin molded body 100 was molded by a composite resin containing the polystyrene-based resin and the polyolefin-based resin with the expansion ratio of 30 times.

The manufacture of the vehicle seat member 1 was performed by the procedure described in the description related to the first embodiment of the first invention. The formation of the gaps 101, 101, 102, 102 was performed at the same time as the molding step of the foamed resin molded body 100 by the in-mold foam molding by the procedure described by referring to FIG. 7.

After the molding step, the molding die 70 was removed, and cooling by releasing heat was sufficiently performed to a room temperature.

After the cooling, the first extension part 182A of the extension 182 of the foamed resin molded body 100 had its center part curved upward and protruded (a case of a Comparative Example 1 which will be described later is illustrated in FIG. 15(B)). How much it protruded (a maximum deformation amount) from a position of the center part of the first extension part 182A assuming that the first extension part 182A is not curved at all was measured, and the maximum deformation amount was 3.2 mm.

An allowable maximum deformation amount of the vehicle seat member 1 is 6 mm. The maximum deformation amount (3.2 mm) of the vehicle seat member 1 of the Example 1 of the first invention was within an allowable range.

First Invention Example 2

The vehicle seat member 1 of the first embodiment of the first invention illustrated in FIGS. 1 to 7 was manufactured by in-mold foam molding.

The vehicle seat member 1 of the Example 2 of the first invention was manufactured under the conditions similar to those of the Example 1 of the first invention except that the second framework right part 201 was disposed so as to extend through the innermost side in the width direction of the gaps 101, 101, and the second framework left part 202 was disposed so as to extend through the innermost side in the width direction of the gaps 102, 102.

The maximum deformation amount of the vehicle seat member 1 of the Example 2 of the first invention was 3.0 mm and was within the allowable range.

First Invention Example 3

Figure 12:
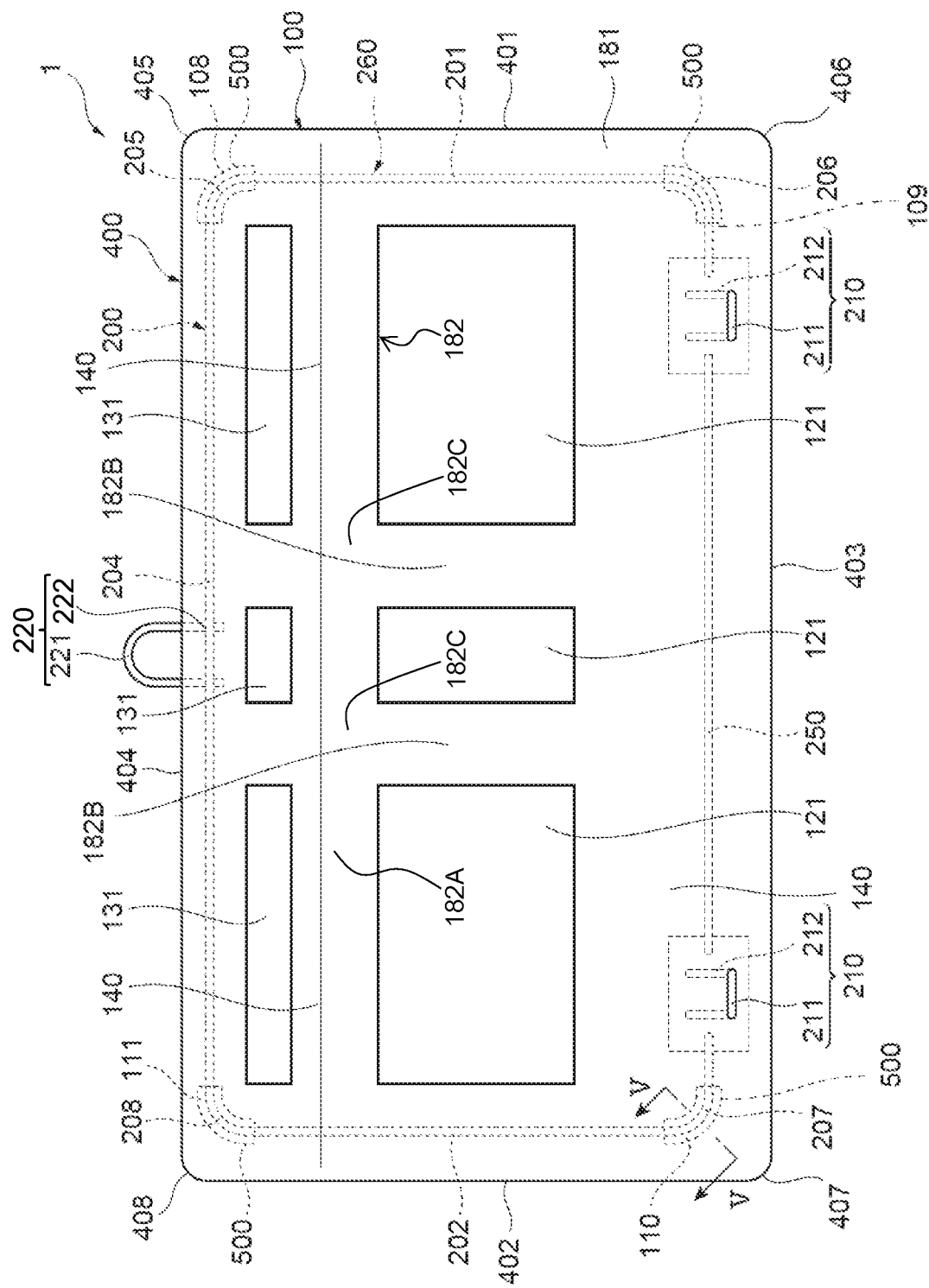
FIG. 12 is a plan view (bottom view) of the vehicle seat member according to a third embodiment of the first invention when seen from the bottom surface (vehicle fastened surface).
Figure 14:
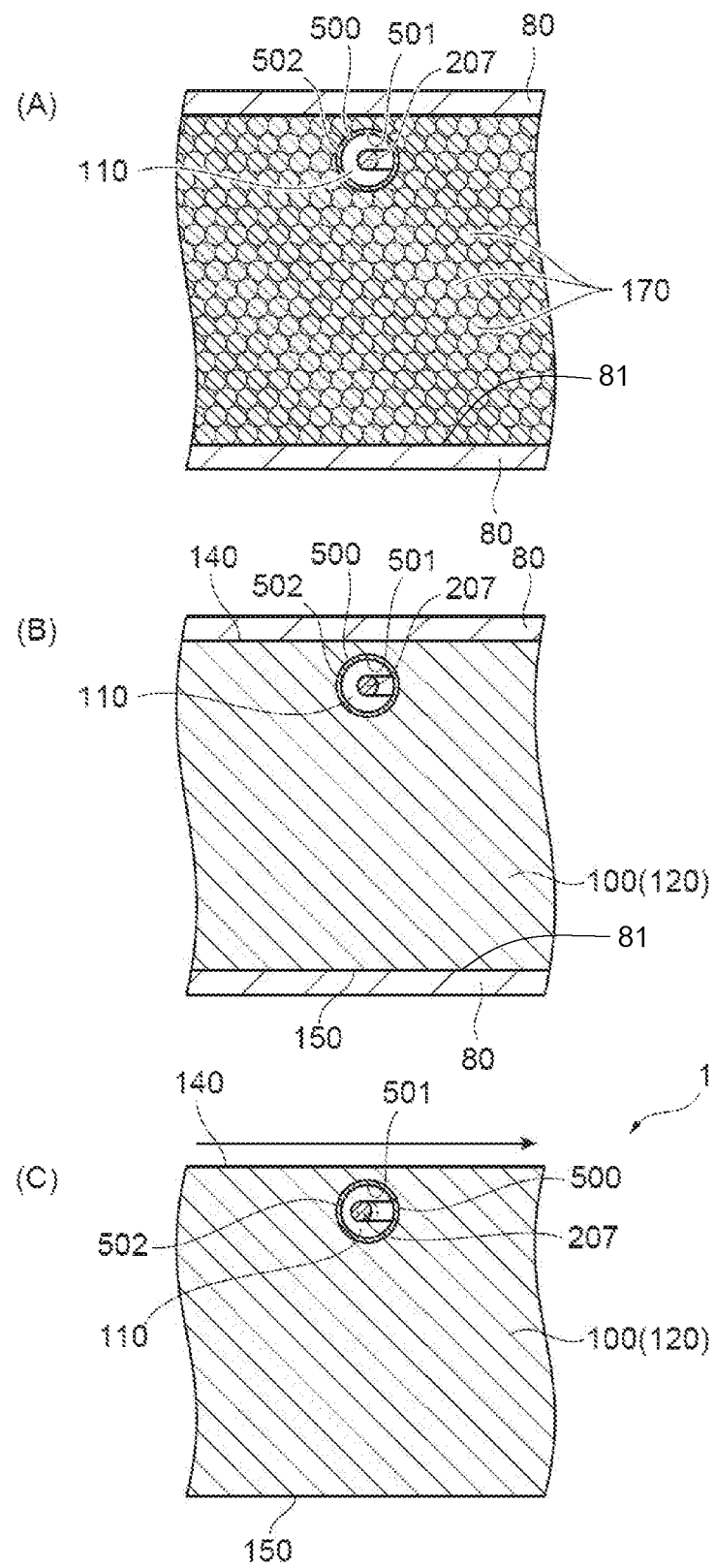
FIG. 14 is a schematic sectional view for explaining a method of manufacturing the vehicle seat member according to the third embodiment of the first invention.

The vehicle seat member 1 of the third embodiment of the first invention illustrated in FIGS. 12 to 14 was manufactured by in-mold foam molding.

As the four tubular bodies 500, a tubular body having an inner diameter of 10 mm and a length of 40 mm was used.

The used molding die 80 was formed so that dimensions of a part of the foamed resin molded body 100 of the vehicle seat member 1 to be manufactured had a width in the longitudinal direction of 1260 mm, a width in the transverse direction of 550 mm, and a thickness of 160 mm.

As the foamed resin molded body 100 and the frame member 200, those similar to the Example 1 of the first invention were used.

The second framework first corner part 205, the second framework second corner part 206, the second framework third corner part 207, and the second framework fourth corner part 208 were disposed so as to go through the center of the internal space of the tubular body 500, respectively.

The manufacture of the vehicle seat member 1 was performed by the procedure described in the description related to the third embodiment of the first invention. The formation of the gaps 108 to 111 was performed at the same time as the molding step of the foamed resin molded body 100 by the in-mold foam molding by the procedure described by referring to FIG. 14.

After the molding step, the molding die 80 was removed, and cooling by releasing heat was sufficiently performed to a room temperature.

The maximum deformation amount of the vehicle seat member 1 of the Example 3 of the first invention measured similarly to the Example 1 of the first invention was 5.1 mm and was within the allowable range.

First Invention Comparative Example 1

The vehicle seat member of the Comparative Example 1 of the first invention was manufactured with conditions and procedures similar to those in the Example 1 of the first invention except that the gaps 101, 101, 102, 102 are not formed.

The maximum deformation amount of the vehicle seat member 1 of the Comparative Example 1 of the first invention measured similarly to the Example 1 of the first invention was 8.5 mm and exceeded the allowable range (6 mm).

First Invention Comparative Example 2

Instead of the gaps 101, 101 extending along the second framework right part 201 in the Example 1 of the first invention, a groove with a width of 10 mm and a length of 100 mm extending in the direction perpendicular to the second framework right part 201 and formed so that the second framework right part 201 passed through the center in the extending direction and having a depth in which the second framework right part 201 was located on a bottom surface thereof was formed on the bottom surface 140 of the foamed resin molded body 100.

Furthermore, instead of the gaps 102, 102 extending along the second framework left part 202 in the Example 1 of the first invention, a groove with a width of 10 mm and a length of 100 mm extending in the direction perpendicular to the second framework left part 202 and formed so that the second framework left part 202 passed through the center in the extending direction and having a depth in which the second framework left part 202 was located on a bottom surface thereof was formed on the bottom surface 140 of the foamed resin molded body 100.

The vehicle seat member of the Comparative Example 2 of the first invention was manufactured with the conditions and procedures similar to those in the Example 1 of the first invention except the aforementioned points.

The maximum deformation amount of the vehicle seat member of the Comparative Example 2 of the first invention measured similarly to the Example 1 of the first invention was 7.5 mm and exceeded the allowable range (6 mm).

<Third Invention>

Third Invention Example 1

The vehicle seat member 3010 of the first embodiment of the third invention illustrated in FIGS. 24 to 29 was manufactured by in-mold foam molding.

The used molding die 3007 was formed so that dimensions of a part of the foamed resin molded body 3030 of the vehicle seat member 3010 to be manufactured had a width in the longitudinal direction of 1260 mm, a width in the transverse direction of 550 mm, and a thickness of 160 mm.

For the first framework 3021 and the second framework 3022 of the frame member 3020, an iron wire (SWM-B) with a diameter of 4.5 mm was used.

The foamed resin molded body 3030 was molded by a composite resin containing the polystyrene-based resin and the polyolefin-based resin.

In the foamed resin molded body 3030, the first extension part 3036A of the extension 3036 and the connecting part 3035' connected to the first extension part 3036A in the rim part 3035 were molded by a foamed resin having the expansion ratio of 20 times and the maximum point stress by bending measured under the aforementioned conditions of 592 kPa.

On the other hand, in the foamed resin molded body 3030, the first extension part 3036A of the extension 3036 and the part other than the connecting part 3035' connected to the first extension part 3036A in the rim part 3035 (including the not-connecting part 3036" of the rim part 3035) were molded by a foamed resin having the expansion ratio of 30 times and the maximum point stress by bending measured under the aforementioned conditions of 354 kPa.

The manufacture of the vehicle seat member 3010 was performed by the procedure described in the description related to the first embodiment of the third invention.

After the molding step, the molding die 3007 was removed, and radiational cooling was sufficiently performed to a room temperature.

After the cooling, the first extension part 3036A of the extension 3036 in the foamed resin molded body 3030 had its center part curved upward and protruded (a case of the Comparative Example 1 of the third invention which will be described later is illustrated in FIG. 30(B)). How much it protruded (the maximum deformation amount) from a position of the center part of the first extension part 3036A assuming that the first extension part 3036A is not curved at all was measured, and the maximum deformation amount was 6.0 mm.

The allowable maximum deformation amount of the vehicle seat member 3010 is 6 mm. The maximum deformation amount (6.0 mm) of the vehicle seat member 3010 of the Example 1 of the third invention was within the allowable range.

Third Invention Example 2

The vehicle seat member 1 of the first embodiment of the third invention illustrated in FIGS. 24 to 29 was manufactured by in-mold foam molding.

The vehicle seat member 1 of the Example 2 of the third invention was manufactured by the conditions similar to those in the Example 1 of the third invention except that in the foamed resin molded body 3030, the first extension part 3036A of the extension 3036 and the connecting part 3035' connected to the first extension part 3036A in the rim part 3035 were molded by a foamed resin having the expansion ratio of 15 times and the maximum point stress by bending measured under the aforementioned conditions of 774 kPa.

The maximum deformation amount of the vehicle seat member 1 of the Example 2 of the third invention was 5.1 mm and was within the allowable range.

Third Invention Example 3

The vehicle seat member 1 of the first embodiment of the third invention illustrated in FIGS. 24 to 29 was manufactured by in-mold foam molding.

The vehicle seat member 1 of the Example 3 of the third invention was manufactured by the conditions similar to those in the Example 1 of the third invention except that in the foamed resin molded body 3030, the first extension part 3036A of the extension 3036 and the connecting part 3035' connected to the first extension part 3036A in the rim part 3035 were molded by a foamed resin having the expansion ratio of 10 times and the maximum point stress by bending measured under the aforementioned conditions of 873 kPa.

The maximum deformation amount of the vehicle seat member 1 of the Example 3 of the third invention was 3.9 mm and was within the allowable range.

Third Invention Example 4

The vehicle seat member 1 of the first embodiment of the third invention illustrated in FIGS. 24 to 29 was manufactured by in-mold foam molding.

The vehicle seat member 1 of the Example 4 of the third invention was manufactured by the conditions similar to those in the Example 1 of the third invention except that in the foamed resin molded body 3030, the first extension part 3036A of the extension 3036 and the connecting part 3035' connected to the first extension part 3036A in the rim part 3035 were molded by a foamed resin having the expansion ratio of 5 times and the maximum point stress by bending measured under the aforementioned conditions of 1008 kPa.

The maximum deformation amount of the vehicle seat member 1 of the Example 4 of the third invention was 2.8 mm and was within the allowable range.

Third Invention Comparative Example 1

The vehicle seat member of the Comparative Example 1 of the third invention was manufactured by the conditions similar to those in the Example 1 of the third invention except that the entire foamed resin molded body 3030 was molded by the foamed resin having the expansion ratio of 30 times and the maximum point stress by bending measured under the aforementioned conditions of 354 kPa.

The maximum deformation amount of the vehicle seat member of the Comparative Example 1 of the third invention was 8.5 mm and largely exceeded the allowable maximum deformation amount of 6 mm.

REFERENCE SIGNS LIST

<First Invention>

1 vehicle seat member, 100 foamed resin molded body. 101, 102, 105, 106, 108, 109, 110, 111 gap, 200 frame member. 250 first framework, 260 second framework, 201 second framework right part, 202 second framework left part, 204 second framework rear part, 205 second framework first corner part, 206 second framework second corner part, 207 second framework third corner part, 208 second framework fourth corner part, 400 outer shape of vehicle seat member, 401 right edge, 402 left edge, 403 front edge, 404 rear edge, 405 first corner, 406 second corner, 407 third corner, 408 fourth corner, 500 tubular body. 501 inner peripheral surface of tubular body, 502 outer peripheral surface of tubular body, 70, 80 molding die <Second Invention>

2001: vehicle seat, 2007: molding die, 2010: vehicle seat member, 2020: frame member, 2022: framework, 2022-1: framework first section, 2201: first part, 2202: second part. 2201a: one end of first part, 2202a: one end of second part, 2201b: another end of first part, 2202b: another end of second part, 2201c: side of the other end of first part, 2202c: side of the other end of second part, 2023A: first plate-shaped member, 2023B: second plate-shaped member, 2024A: first locking fixture, 2024B: second locking fixture, 2241A, 2241B: base. 2242A. 2242B: column portion, 2243A, 2243B: locking portion, 2030: foamed resin molded body, 2035: rim part, 2036: extension Third Embodiment

3001: vehicle seat, 3007: molding die, 3010: vehicle seat member, 3020: frame member, 3021: first framework, 3022: second framework, 3030: foamed resin molded body, 3035: rim part. 3036: extension. 3036A: first extension part, 3036B: second extension part <Fourth Invention>

4001: vehicle seat, 4007: molding die, 4010: vehicle seat member, 4020: frame member, 4021: first framework, 4022: second framework, 4026: reinforcing portion, 4030: foamed resin molded body, 4035: rim part, 4036: extension, 4036A: first extension part, 4036B: second extension part All the publications, patents, and patent applications cited in the description are incorporated in the description as they are by reference.

The invention claimed is:

1. A method of manufacturing a vehicle seat member including a foamed resin molded body and a frame member at least a part of which is embedded in the foamed resin molded body, wherein
    the frame member includes a framework extending along an outer shape of the vehicle seat member in plan view, the method of manufacturing a vehicle seat member comprising:
    a placing step of placing the frame member in a molding die so that the framework extends along the outer shape of the vehicle seat member in plan view;

a molding step of molding the foamed resin molded body in the molding die so that at least a part of the frame member is embedded; and a gap forming step of forming a gap between at least a part of the framework and a part of the foamed resin molded body located closer to an outer side and/or an inner side of the vehicle seat member in plan view than the at least a part of the framework, the gap extending along the extending direction of the framework, the gap forming step being performed in the molding step or after the molding step, wherein the outer shape of the vehicle seat member has a rectangular shape;

the framework of the frame member includes two or more framework corner parts connected to each other and extending along each of two or more corners selected from four corners of the outer shape, wherein the two or more corners are selected so as to constitute one or more pairs of corners opposed in a direction of any one side of the outer shape; and the gap forming step includes formation of the gap along the extending direction of each of the framework corner parts between each of the framework corner parts and a part of the foamed resin molded body located closer to an outer side and/or an inner side of the vehicle seat member in plan view than each of the framework corner parts, the gap forming step being performed during molding or after molding of the foamed resin molded body.

2. The method according to claim 1, wherein
the framework of the frame member includes a pair of framework opposed parts disposed in the vicinity of a pair of opposed edges in the outer shape of the vehicle seat member so as to oppose to each other and connected to each other; and
the gap forming step includes formation of the gap between each of the framework opposed parts and the part of the foamed resin molded body located closer to the outer side of the vehicle seat member in plan view than each of the framework opposed parts.

3. The method according to claim 1, wherein the gap forming step includes, for a portion of the framework, formation of the gap around an entire circumference of the framework on a section perpendicular to the extending direction of the framework.

4. The method according to claim 1, wherein
the frame member further includes a locking portion fixed to the framework and having a distal end part protruding to an outside from the foamed resin molded body; and
in the vehicle seat member, the entire periphery of a base end part of the locking portion of the frame member is embedded in the foamed resin molded body.

5. The method according to claim 1, wherein
the foamed resin molded body is a molded body containing a foamed polystyrene-based resin or a foamed composite resin comprising a polystyrene-based resin and a polyolefin-based resin.

6. The method according to claim 1, wherein
in the vehicle seat member, at least a part of the framework is disposed in the vicinity of one of end surfaces of the foamed resin molded body in a thickness direction; and
the gap forming step is a step of forming a groove with a bottom in the foamed resin molded body, wherein the groove extends along the at least a part of the framework, is opened to the one of end surfaces, and accommodates the at least a part of the framework.

7. A method of manufacturing a vehicle seat member including a foamed resin molded body and a frame member at least a part of which is embedded in the foamed resin molded body, wherein
the frame member includes a framework extending along an outer shape of the vehicle seat member in plan view, the method of manufacturing a vehicle seat member comprising:
a placing step of placing the frame member in a molding die so that the framework extends along the outer shape of the vehicle seat member in plan view;
a molding step of molding the foamed resin molded body in the molding die so that at least a part of the frame member is embedded; and
a gap forming step of forming a gap between at least a part of the framework and a part of the foamed resin molded body located closer to an outer side and/or an inner side of the vehicle seat member in plan view than the at least a part of the framework, the gap extending along the extending direction of the framework, the gap forming step being performed in the molding step or after the molding step, wherein
the vehicle seat member further includes a tubular body embedded in the foamed resin molded body in a state where at least a part of the framework of the frame member is inserted through the tubular body;
the placing step includes placing the frame member and the tubular body in the molding die in a state where at least a part of the framework of the frame member is inserted through the tubular body so that a gap is formed between at least a part of the framework of the frame member and an inner peripheral surface of the tubular body; and
the gap forming step includes molding of the foamed resin molded body in the molding die in the molding step.

8. The method according to claim 7, wherein
the framework of the frame member includes a pair of framework opposed parts disposed in the vicinity of a pair of opposed edges in the outer shape of the vehicle seat member so as to oppose to each other and connected to each other; and
the gap forming step includes formation of the gap between each of the framework opposed parts and the part of the foamed resin molded body located closer to the outer side of the vehicle seat member in plan view than each of the framework opposed parts.

9. The method according to claim 7, wherein
the gap forming step includes, for a portion of the framework, formation of the gap around an entire circumference of the framework on a section perpendicular to the extending direction of the framework.

10. A vehicle seat member, comprising:
a foamed resin molded body and a frame member at least a part of which is embedded in the foamed resin molded body, wherein
the frame member includes a framework extending inside the foamed resin molded body along an outer shape of the vehicle seat member in plan view; and
a gap is formed along the extending direction of the framework between at least a part of the framework and a part of the foamed resin molded body located closer to an outer side and/or an inner side of the vehicle seat member in plan view than the at least a part of the framework, wherein
the outer shape of the vehicle seat member has a rectangular shape;
the framework of the frame member includes two or more framework corner parts connected to each other and extending along each of two or more corners selected from four corners of the outer shape, wherein the two or more corners are selected so as to constitute one or more pairs of corners opposed in a direction of any one side of the outer shape; and
the gap is arcuate along its length and is formed along the extending direction throughout each of the framework corner parts between each of the framework corner parts and a part of the foamed resin molded body located closer to an outer side and/or an inner side of the vehicle seat member in plan view than each of the framework corner parts.

11. The vehicle seat member according to claim 10, wherein
the framework of the frame member includes a pair of framework opposed parts disposed so as to oppose to each other in the vicinity of a pair of opposed edges of the outer shape of the vehicle seat member and connected to each other; and
the gap is formed between each of the framework opposed parts and the part of the foamed resin molded body located closer to the outer side of the vehicle seat member in plan view than each of the framework opposed parts.

12. The vehicle seat member according to claim 10, wherein for a portion of the framework, on a section perpendicular to the extending direction of the framework, the gap is formed around an entire circumference of the framework.

13. The vehicle seat member according to claim 10, wherein
the frame member further includes a locking portion fixed to the framework and having a distal end part protruding to an outside from the foamed resin molded body; and
the entire periphery of a base end part of the locking portion is embedded in the foamed resin molded body.

14. The vehicle seat member according to claim 10, wherein
the foamed resin molded body is a molded body containing a foamed polystyrene-based resin or a foamed composite resin comprising a polystyrene-based resin and a polyolefin-based resin.

15. The vehicle seat member according to claim 10, wherein
at least a part of the framework is disposed in the vicinity of one of end surfaces of the foamed resin molded body in a thickness direction; and
the gap is a space in a groove with a bottom formed in the foamed resin molded body so as to extend along the at least a part of the framework, opened to the one of end surfaces and accommodating the at least a part of the framework.

16. A vehicle seat member, comprising:
a foamed resin molded body and a frame member at least a part of which is embedded in the foamed resin molded body, wherein
the frame member includes a framework extending inside the foamed resin molded body along an outer shape of the vehicle seat member in plan view; and
a gap is formed along the extending direction of the framework between at least a part of the framework and a part of the foamed resin molded body located closer to an outer side and/or an inner side of the vehicle seat member in plan view than the at least a part of the framework,
wherein
the vehicle seat member further includes a tubular body embedded in the foamed resin molded body in a state where at least a part of the framework of the frame member is inserted through the tubular body; and
the gap is formed between at least a part of the framework of the frame member and an inner peripheral surface of the tubular body.

17. The vehicle seat member according to claim 16, wherein
the framework of the frame member includes a pair of framework opposed parts disposed so as to oppose to each other in the vicinity of a pair of opposed edges of the outer shape of the vehicle seat member and connected to each other; and
the gap is formed between each of the framework opposed parts and the part of the foamed resin molded body located closer to the outer side of the vehicle seat member in plan view than each of the framework opposed parts.

18. The vehicle seat member according to claim 16, wherein for a portion of the framework, on a section perpendicular to the extending direction of the framework, the gap is formed around an entire circumference of the framework.

19. The vehicle seat member according to claim 16, wherein
the frame member further includes a locking portion fixed to the framework and having a distal end part protruding to an outside from the foamed resin molded body; and
the entire periphery of a base end part of the locking portion is embedded in the foamed resin molded body.

20. The vehicle seat member according to claim 16, wherein
the foamed resin molded body is a molded body containing a foamed polystyrene-based resin or a foamed composite resin comprising a polystyrene-based resin and a polyolefin-based resin.

* * * * *